US005487603A

United States Patent [19]
Hoff et al.

[11] Patent Number: 5,487,603
[45] Date of Patent: Jan. 30, 1996

[54] INTELLIGENT SYSTEM AND PROCESS FOR AUTOMATED MONITORING OF MICROINGREDIENT INVENTORY USED IN THE MANUFACTURE OF MEDICATED FEED RATIONS

[75] Inventors: Charles H. Hoff, Ault, Colo.; Bernard J. Bergen, Encinitas, Calif.

[73] Assignee: Lextron, Inc., Greeley, Colo.

[21] Appl. No.: 203,017

[22] Filed: Feb. 28, 1994

[51] Int. Cl.$^6$ .................................................. B01F 15/04
[52] U.S. Cl. ........................ 366/141; 222/58; 364/502; 364/567
[58] Field of Search ................................... 366/141, 142, 366/140, 151, 152, 160, 161, 162, 17, 18, 19, 20, 21, 603; 222/57, 58, 59, 77; 141/83; 119/72, 51.01; 364/502, 567

[56] References Cited

U.S. PATENT DOCUMENTS

| | | |
|---|---|---|
| 2,587,531 | 2/1952 | Saxe . |
| 2,608,394 | 8/1952 | Williamson . |
| 2,873,955 | 2/1959 | Sauer . |
| 2,877,524 | 3/1959 | Bishop . |
| 2,893,602 | 7/1959 | Barber et al. . |
| 3,203,591 | 8/1965 | Daulton et al. . |
| 3,437,075 | 4/1969 | Hawes . |
| 3,498,311 | 3/1970 | Hawes . |
| 3,595,328 | 7/1971 | Griem . |
| 3,670,923 | 6/1972 | Hawes, Jr. et al. . |
| 3,720,185 | 3/1973 | Aldous et al. . |
| 3,806,001 | 4/1974 | Pratt . |
| 3,822,056 | 7/1974 | Hawes, Jr. et al. . |
| 3,959,636 | 5/1976 | Johnson et al. . |
| 4,117,954 | 10/1978 | Pelletier . |
| 4,181,097 | 1/1980 | Betsuno . |
| 4,635,819 | 1/1987 | Wilson ..................................... 222/58 |
| 4,712,511 | 12/1987 | Zamzow et al. . |
| 4,733,971 | 3/1988 | Pratt . |

(List continued on next page.)

OTHER PUBLICATIONS

Lextron Brochure entitled "Step Into The Lextron Advantage," 1993 (no month).
Schematic diagram entitled "6 Bin Weight Ass'y" by WAB shown in Lextron Brochure entitled "Step Into The Lextron Advantage" 1993 (no month).
Schematic Diagm for Great Plains Chemical volume–based microingredient dispensing/mixing system (2 sheets), 1980.
Article entitled "Micro systems *Revolutionizing proportioning*", by Robert R. McEllhiney, published in the Mill Management Section of *Feed Management*, vol. 36, No. 3, Mar. 1985, pp. 54 & 55.

*Primary Examiner*—Robert W. Jenkins
*Attorney, Agent, or Firm*—Hopgood, Calimafde, Kalil & Judlowe

[57] ABSTRACT

A computer-based microingredient inventory accounting system and process for use with programmable microingredient dispensing and mixing machinery. In the illustrative embodiment, the computer-based microingredient inventory accounting system is coupled with a programmable microingredient dispensing and mixing system. The programmable microingredient dispensing and mixing system includes weight measuring mechanisms that are interfaced with a computer system programmed to continuously monitor the weight of microingredients stored on a plurality of inventory storage scales, as well as in a plurality of dispensing bins and tanks. The computer-based microingredient inventory accounting system is programmed to perform a number of inventory monitoring functions including: automated detection of microingredient loss (e.g., spillage) after each inventory receiving operation and each dispensing bin and tank refilling operation; automated detection of microingredient-usage errors after each micro-batch production run; automated production of inventory reports when arbitrarily requested; and automated tracking of microingredients using the lot numbers of the microingredient supplier. In the preferred embodiment, the computer-based microingredient inventory accounting system cooperates with a portable auxiliary computer and bar code symbol reader in order execute interactive routines which facilitate system configuration, inventory receiving operations, and dispensing bin and tank refilling operations.

36 Claims, 42 Drawing Sheets

U.S. PATENT DOCUMENTS

| | | | |
|---|---|---|---|
| 4,830,508 | 5/1989 | Higuchi | 366/141 |
| 5,008,821 | 4/1991 | Pratt et al. | |
| 5,069,165 | 12/1991 | Rousseau | |
| 5,105,767 | 4/1992 | Gordon et al. | |
| 5,174,244 | 12/1992 | Gaalswyk | |
| 5,205,240 | 4/1993 | Colas et al. | |
| 5,219,224 | 6/1993 | Pratt | |
| 5,240,324 | 8/1993 | Phillips | 364/502 |
| 5,315,505 | 5/1994 | Pratt et al. | |
| 5,332,311 | 7/1994 | Volk | 366/141 |
| 5,340,211 | 11/1994 | Pratt | |

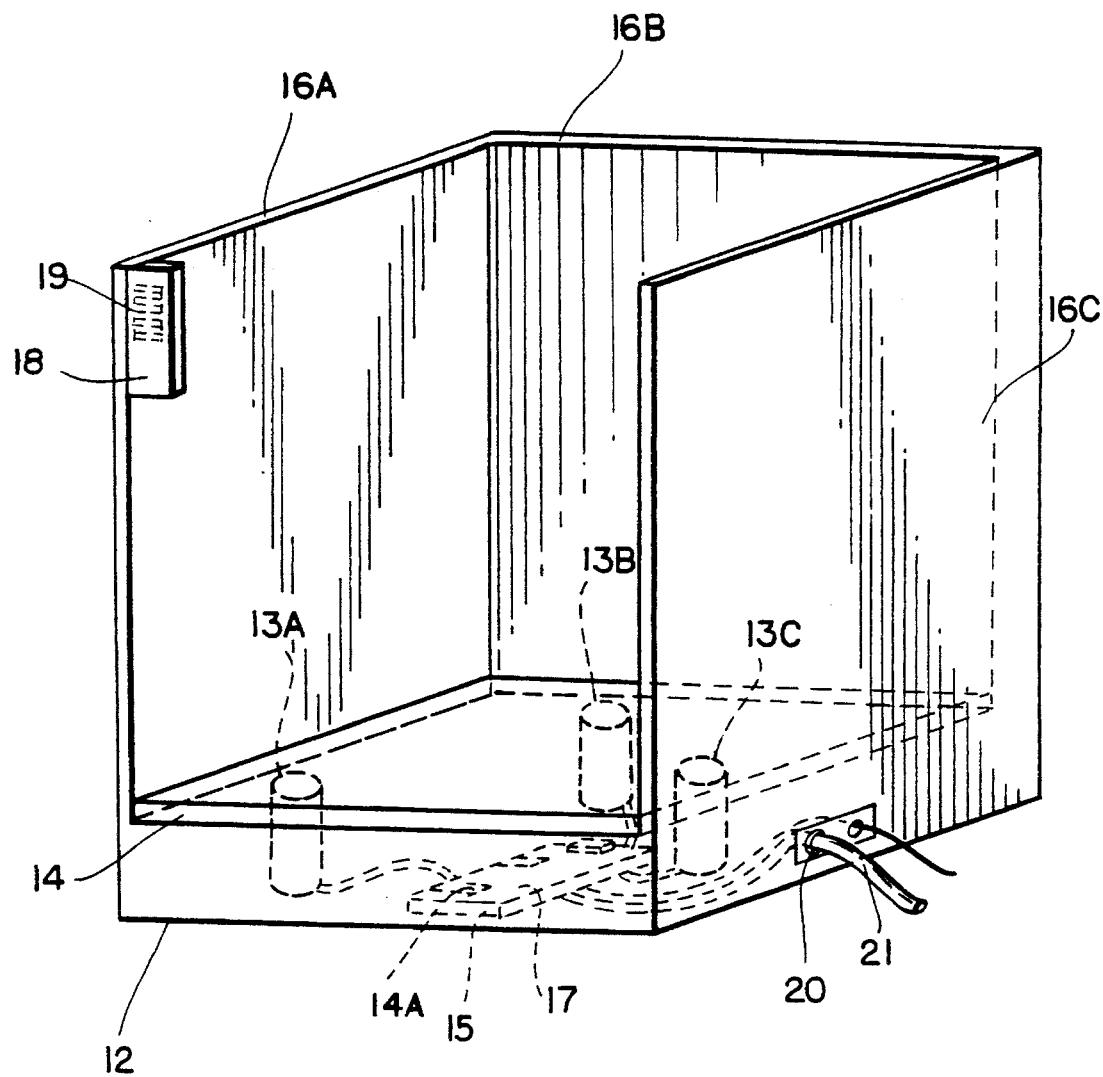
F I G. 2

| INGREDIENT CODE | q = 1 | q = 2 | q = 3 | ... | q = Q |
|---|---|---|---|---|---|
| PRIMARY DISPENSING BIN / TANK SCALE IDENTIFICATION | | | | | |
| PRIMARY DISPENSING BIN / TANK SCALE TARE WEIGHT | | | | | |
| SECONDARY DISPENSING BIN / TANK SCALE IDENTIFICATION | | | | | |
| SECONDARY DISPENSING BIN / TANK SCALE TARE WEIGHT | | | | | |
| PRIMARY STORAGE SCALE IDENTIFICATION | | | | | |
| PRIMARY STORAGE SCALE TARE WEIGHT | | | | | |
| SECONDARY STORAGE SCALE IDENTIFICATION | | | | | |
| SECONDARY STORAGE SCALE TARE WEIGHT | | | | | |
| ASSIGN COLOR CODE TO RESPECTIVE SCALE | | | | | |

FIG. 9

| INGREDIENT CODE | q = 1 | q = 2 | q = 3 | ... | q = Q |
|---|---|---|---|---|---|
| IDENTIFICATION OF MICRO INGREDIENT SUPPLIER-LOT NO. K | | | | | |
| SUPPLIER LOT NUMBER K | | | | | |
| DELIVERY DATE | | | | | |
| NUMBER OF PACKAGES OF LOT NUMBER K | | | | | |
| NET WEIGHT OF LOT NUMBER K PACKAGE | | | | | |
| IDENTIFICATION OF MICRO INGREDIENT SUPPLIER-LOT NO. K+1 | | | | | |
| SUPPLIER LOT NUMBER K+1 | | | | | |
| DELIVERY DATE | | | | | |
| NUMBER OF PACKAGES OF LOT NUMBER K+1 | | | | | |
| NET WEIGHT OF LOT NO. K+1 PACKAGE | | | | | |
| ⋮ | | | | | |
| ... | | | | | |

FIG. 10

| INGREDIENT CODE | q = 1 | q = 2 | q = 3 | ... | q = Q |
|---|---|---|---|---|---|
| STORAGE SCALE NUMBER | | | | | |
| SUPPLIER LOT NUMBER K | | | | | |
| IDENTIFICATION OF MICRO INGREDIENT SUPPLIER-LOT NO. K | | | | | |
| NET WEIGHT OF SINGLE PACKAGE OF LOT NUMBER K | | | | | |
| NET WEIGHT OF ALL PACKAGE OF LOT NUMBER K | | | | | |
| SUPPLIER LOT NUMBER K+1 | | | | | |
| IDENTIFICATION OF MICRO INGREDIENT SUPPLIER-LOT NO. K+1 | | | | | |
| NET WEIGHT OF SINGLE PACKAGE OF LOT NUMBER K+1 | | | | | |
| NET WEIGHT OF ALL PACKAGE OF LOT NUMBER K+1 | | | | | |
| ... | | | | | |
| ... | | | | | |

FIG. 11

| INGREDIENT CODE | q = 1 | q = 2 | q = 3 | ... | q = Q |
|---|---|---|---|---|---|
| DISPENSING BIN / TANK NUMBER | | | | | |
| SUPPLIER LOT NUMBER K | | | | | |
| IDENTIFICATION OF MICRO INGREDIENT SUPPLIER-LOT NO. K | | | | | |
| NET WEIGHT OF MICRO INGREDIENT FROM SUPPLIER-LOT NO. K | | | | | |
| SUPPLIER LOT NUMBER K+1 | | | | | |
| IDENTIFICATION OF MICRO INGREDIENT SUPPLIER-LOT NO. K+1 | | | | | |
| NET WEIGHT OF MICRO INGREDIENT FROM SUPPLIER-LOT NO. K+1 | | | | | |
| ⋮ | | | | | |
| ... | | | | | |

FIG. 12

| INGREDIENT CODE | q = 1 | q = 2 | q = 3 | ... | q = Q |
|---|---|---|---|---|---|
| DISPENSING BIN / TANK NUMBER | | | | | |
| SUPPLIER LOT NUMBER K | | | | | |
| IDENTIFICATION OF MICRO INGREDIENT SUPPLIER-LOT NO. K | | | | | |
| NET WEIGHT OF MICRO INGREDIENT LOT NUMBER K | | | | | |
| SUPPLIER LOT NUMBER K+1 | | | | | |
| IDENTIFICATION OF MICRO INGREDIENT SUPPLIER-LOT NO. K+1 | | | | | |
| NET WEIGHT OF MICRO INGREDIENT LOT NUMBER K+1 | | | | | |
| ⋮ | | | | | |
| ... | | | | | |

FIG. 13

Events column headers (top):
- RECEIVE EVENT
- REFILL EVENT
- USAGE EVENT
- USAGE EVENT
- INVENTORY EVENT
- NEXT EVENT

| MICRO INGREDIENT CODE | | | | | | | |
|---|---|---|---|---|---|---|---|
| q | IRB i=0 | IRB i=1 | IRB i=2 | IRB i=3 | IRB i=4 | IRB i=5 | IRB i=... |
| | IRDB j=0 | IRDB j=1 | IRDB j=1 | IRDB j=1 | IRDB j=1 | IRDB j=1 | IRDB j=... |
| | DRDB k=0 | DRDB k=0 | DRDB k=1 | DRDB k=1 | DRDB k=1 | DRDB k=1 | DRDB k=... |
| | IUDB l=0 | IUDB l=0 | IUDB l=0 | IUDB l=1 | IUDB l=2 | IUDB l=2 | IUDB l=... |
| | IRDB m=0 | IRDB m=0 | IRDB m=0 | IRDB m=0 | IRDB m=0 | IRDB m=1 | IRDB m=... |
| q + 1 | IRB i=0 | IRB i=1 | IRB i=2 | IRB i=3 | IRB i=4 | IRB i=5 | IRB i=... |
| | IRDB j=0 | IRDB j=1 | IRDB j=1 | IRDB j=1 | IRDB j=1 | IRDB j=1 | IRDB j=... |
| | DRDB k=0 | DRDB k=0 | DRDB k=1 | DRDB k=1 | DRDB k=1 | DRDB k=1 | DRDB k=... |
| | IUDB l=0 | IUDB l=0 | IUDB l=0 | IUDB l=1 | IUDB l=2 | IUDB l=2 | IUDB l=... |
| | IRDB m=0 | IRDB m=0 | IRDB m=0 | IRDB m=0 | IRDB m=0 | IRDB m=1 | IRDB m=... |
| q = Q | IRB i=0 | IRB i=1 | IRB i=2 | IRB i=3 | IRB i=4 | IRB i=5 | IRB i=... |
| | IRDB j=0 | IRDB j=1 | IRDB j=1 | IRDB j=1 | IRDB j=1 | IRDB j=1 | IRDB j=... |
| | DRDB k=0 | DRDB k=0 | DRDB k=1 | DRDB k=1 | DRDB k=1 | DRDB k=1 | DRDB k=... |
| | IUDB l=0 | IUDB l=0 | IUDB l=0 | IUDB l=1 | IUDB l=2 | IUDB l=2 | IUDB l=... |
| | IRDB m=0 | IRDB m=0 | IRDB m=0 | IRDB m=0 | IRDB m=0 | IRDB m=1 | IRDB m=... |

IRB  =  INVENTORY RECORD BLOCK
IRDB =  INVENTORY RECEIVED DISCREPANCY BLOCK
DRDB =  DISPENSER REFILL DISCREPANCY BLOCK
IUDB =  INVENTORY USAGE DISCREPANCY BLOCK
IRDB =  INVENTORY DISCREPANCY REPORT BLOCK

FIG. 14

| INGREDIENT CODE | q = 1 | q = 2 | q = 3 | ... | q = Q |
|---|---|---|---|---|---|
| PRIMARY DISPENSER'S TARE WEIGHT | | | | | |
| PRIMARY DISPENSER'S GROSS WEIGHT | | | | | |
| PRIMARY DISPENSER'S NET WEIGHT | | | | | |
| SECONDARY DISPENSER'S TARE WEIGHT | | | | | |
| SECONDARY DISPENSER'S GROSS WEIGHT | | | | | |
| SECONDARY DISPENSER'S NET WEIGHT | | | | | |
| PRIMARY STORAGE SCALE'S TARE WEIGHT | | | | | |
| PRIMARY STORAGE SCALE'S GROSS WEIGHT | | | | | |
| PRIMARY STORAGE SCALE'S NET WEIGHT | | | | | |
| SECONDARY STORAGE SCALE'S TARE WEIGHT | | | | | |
| SECONDARY STORAGE SCALE'S GROSS WEIGHT | | | | | |
| SECONDARY STORAGE SCALE'S NET WEIGHT | | | | | |

FIG. 14A

| INGREDIENT CODE | q = 1 | q = 2 | q = 3 | ... | q = Q |
|---|---|---|---|---|---|
| STORAGE SCALE NUMBER | | | | | |
| NET STORAGE SCALE WEIGHT RECORDED IN (i-1)th INVENTORY RECORD BLOCK | | | | | |
| NET STORAGE SCALE WEIGHT RECORDED IN i-th INVENTORY RECORD BLOCK | | | | | |
| NET STORAGE SCALE WEIGHT DIFFERENCE | | | | | |
| COMPUTED NET WEIGHT OF RECEIVED PACKAGES | | | | | |
| COMPUTED NET WEIGHT DISCREPANCY | | | | | |
| | | | | | |
| | | | | | |

FIG. 14B

| INGREDIENT CODE | q = 1 | q = 2 | q = 3 | ... | q = Q |
|---|---|---|---|---|---|
| BIN / TANK NUMBER | | | | | |
| STORAGE SCALE GROSS WEIGHT RECORDED IN ( i - 1 ) th INVENTORY RECORD BLOCK | | | | | |
| STORAGE SCALE GROSS WEIGHT RECORDED IN i - th INVENTORY RECORD BLOCK | | | | | |
| STORAGE SCALE GROSS WEIGHT DIFFERENCE | | | | | |
| COMPUTED TARE WEIGHT OF PACKAGES REMOVED FROM STORAGE SCALES | | | | | |
| STORAGE SCALE NET WEIGHT DIFFERENCE | | | | | |
| DISPENSING BIN / TANK GROSS WEIGHT RECORDED IN ( i - 1 ) th INVENTORY RECORD BLOCK | | | | | |
| DISPENSING BIN / TANK GROSS WEIGHT RECORDED IN i - th INVENTORY RECORD BLOCK | | | | | |
| DISPENSING BIN / TANK GROSS WEIGHT DIFFERENCE | | | | | |
| DISPENSING BIN / TANK TAKE WEIGHT | | | | | |
| DISPENSING BIN / TANK NET WEIGHT DIFFERENCE | | | | | |
| REFILL NET WEIGHT DISCREPANCY | | | | | |

FIG. 14C

| INGREDIENT CODE | q = 1 | q = 2 | q = 3 | ... | q = Q |
|---|---|---|---|---|---|
| TOTAL NET WEIGHT OF MICRO INGREDIENT IN DISPENSERS RECORDED IN ( i -1 ) th INVENTORY RECORD BLOCK | | | | | |
| TOTAL NET WEIGHT OF MICRO INGREDIENT IN ON STORAGE SCALES RECORDED IN ( i -1 ) th INVENTORY RECORD BLOCK | | | | | |
| TOTAL NET WEIGHT OF MICRO INGREDIENT IN DISPENSERS RECORDED IN i - th INVENTORY RECORD BLOCK | | | | | |
| TOTAL NET WEIGHT OF MICRO INGREDIENT IN ON STORAGE SCALES RECORDED IN ( i -1 ) th INVENTORY RECORD BLOCK | | | | | |
| TOTAL NET WEIGHT OF MACRO FEED RATION OBTAINED FROM DISPENSING/MIXING/ FLUSHING ROUTINE | | | | | |
| COMPUTED THEORETICAL USAGE DURING I - th PRODUCTION RUN | | | | | |
| USAGE NET WEIGHT DISCREPANCY FOR I - th PRODUCTION RUN | | | | | |

FIG. 14D

| INGREDIENT CODE | q = 1 | q = 2 | q = 3 | ... | q = Q |
|---|---|---|---|---|---|
| TOTAL NET WEIGHT OF MICRO INGREDIENT IN DISPENSERS RECORDED IN (i-1)th INVENTORY RECORD BLOCK | | | | | |
| TOTAL NET WEIGHT OF MICRO INGREDIENT ON STORAGE SCALES (i-1)th RECORDED IN INVENTORY RECORD BLOCK | | | | | |
| TOTAL NET WEIGHT OF MICRO INGREDIENT IN DISPENSERS RECORDED IN i-th INVENTORY RECORD BLOCK | | | | | |
| TOTAL NET WEIGHT OF MICRO INGREDIENT ON STORAGE SCALES RECORDED IN i-th INVENTORY RECORD BLOCK | | | | | |
| TOTAL NET WEIGHT OF MACRO FEED RATION OBTAINED FROM DISPENSING/MIXING/FLUSHING ROUTINE | | | | | |
| SUM OF COMPUTED THEORETICAL USAGE OF MICRO INGREDIENT IN PRODUCTION RUNS DURING (i-r)th THROUGH i-th INVENTORY RECORDING PERIODS | | | | | |
| TOTAL NET WEIGHT OF MICRO INGREDIENT RECEIVED DURING (i-r)th THROUGH i-th INVENTORY RECORDING PERIODS | | | | | |
| INVENTORY DISCREPANCY FOR (i-r)th THROUGH i-th INVENTORY RECORDING PERIODS | | | | | |

FIG. 14E

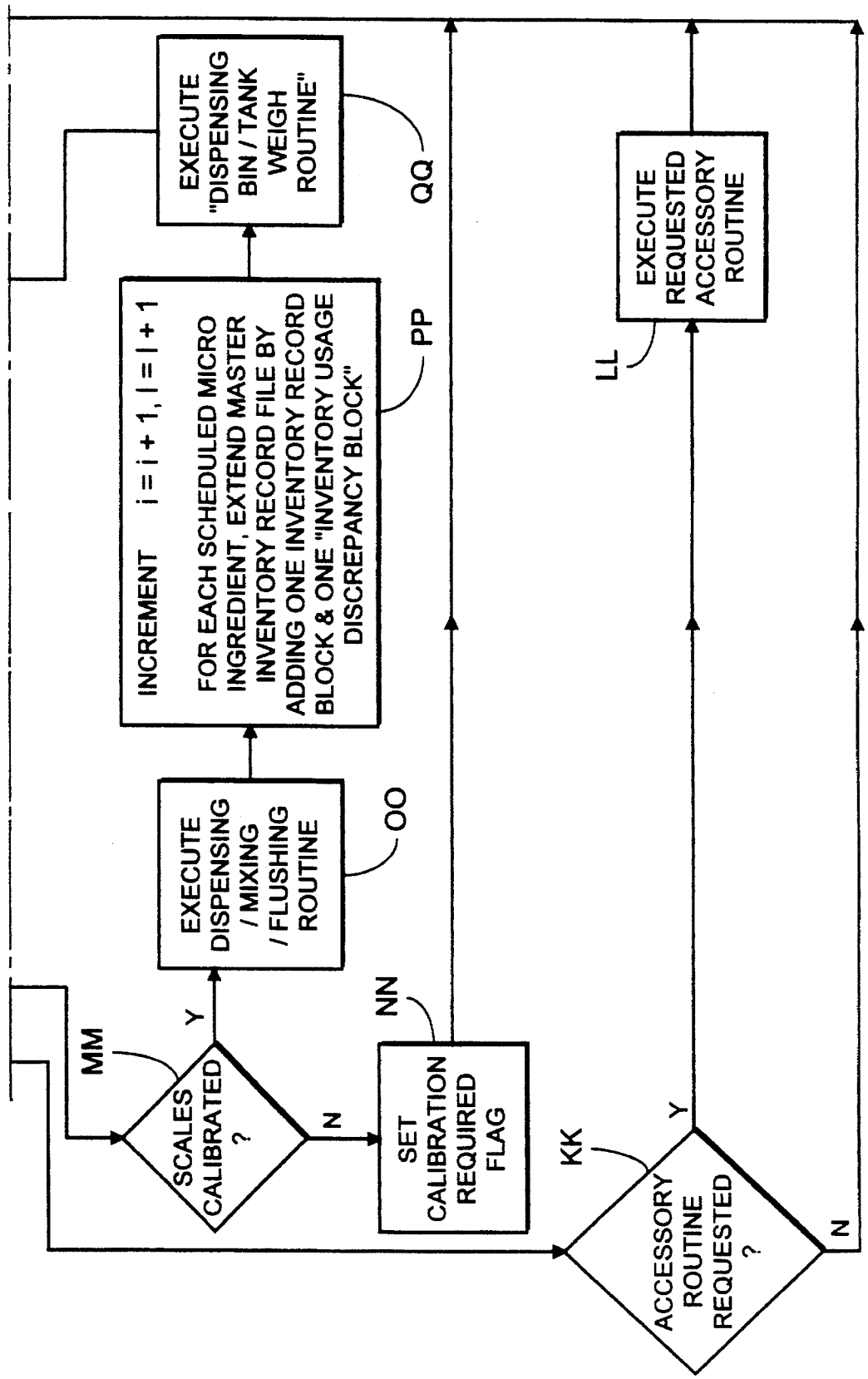
FIG. 18₂

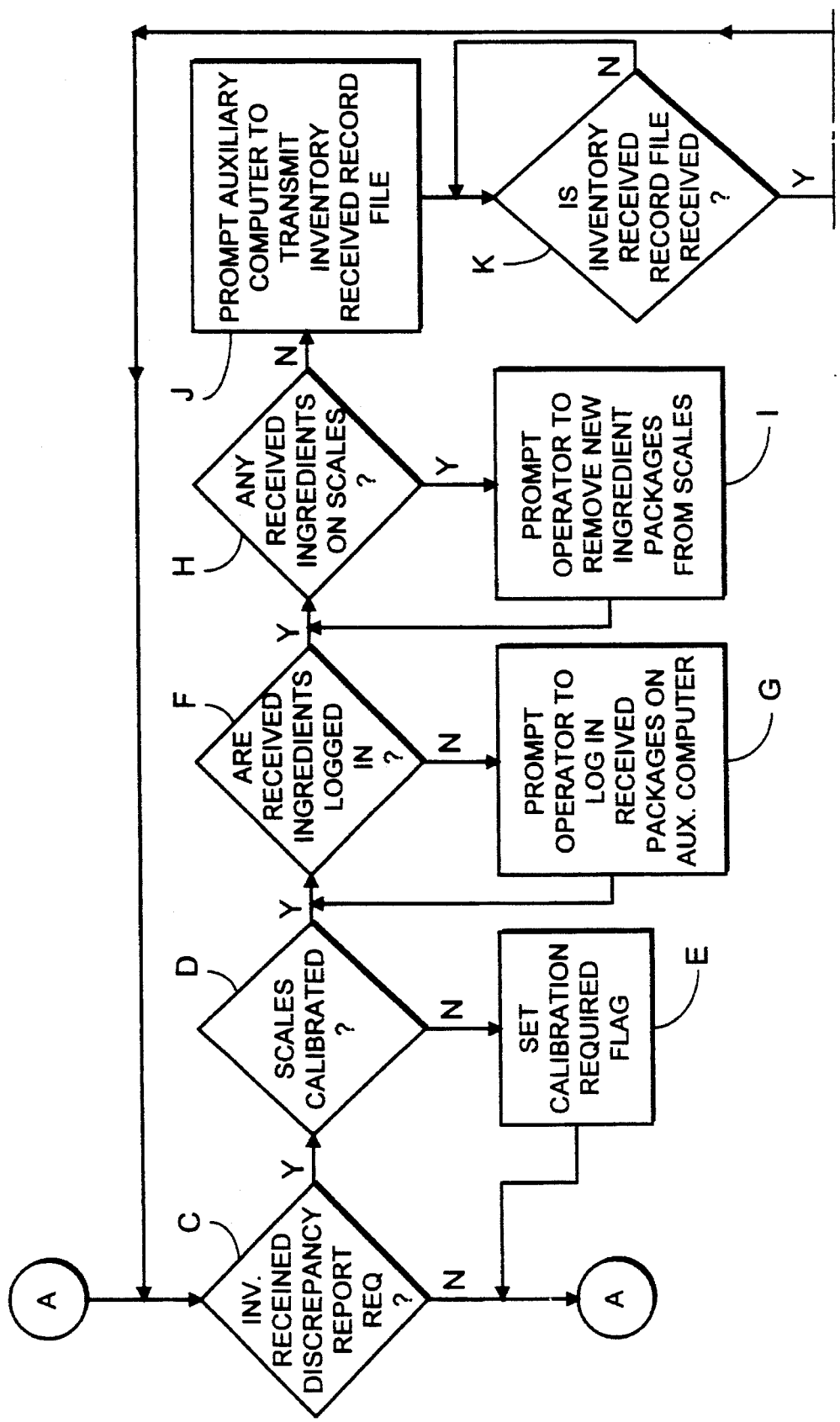
FIG. 18A1

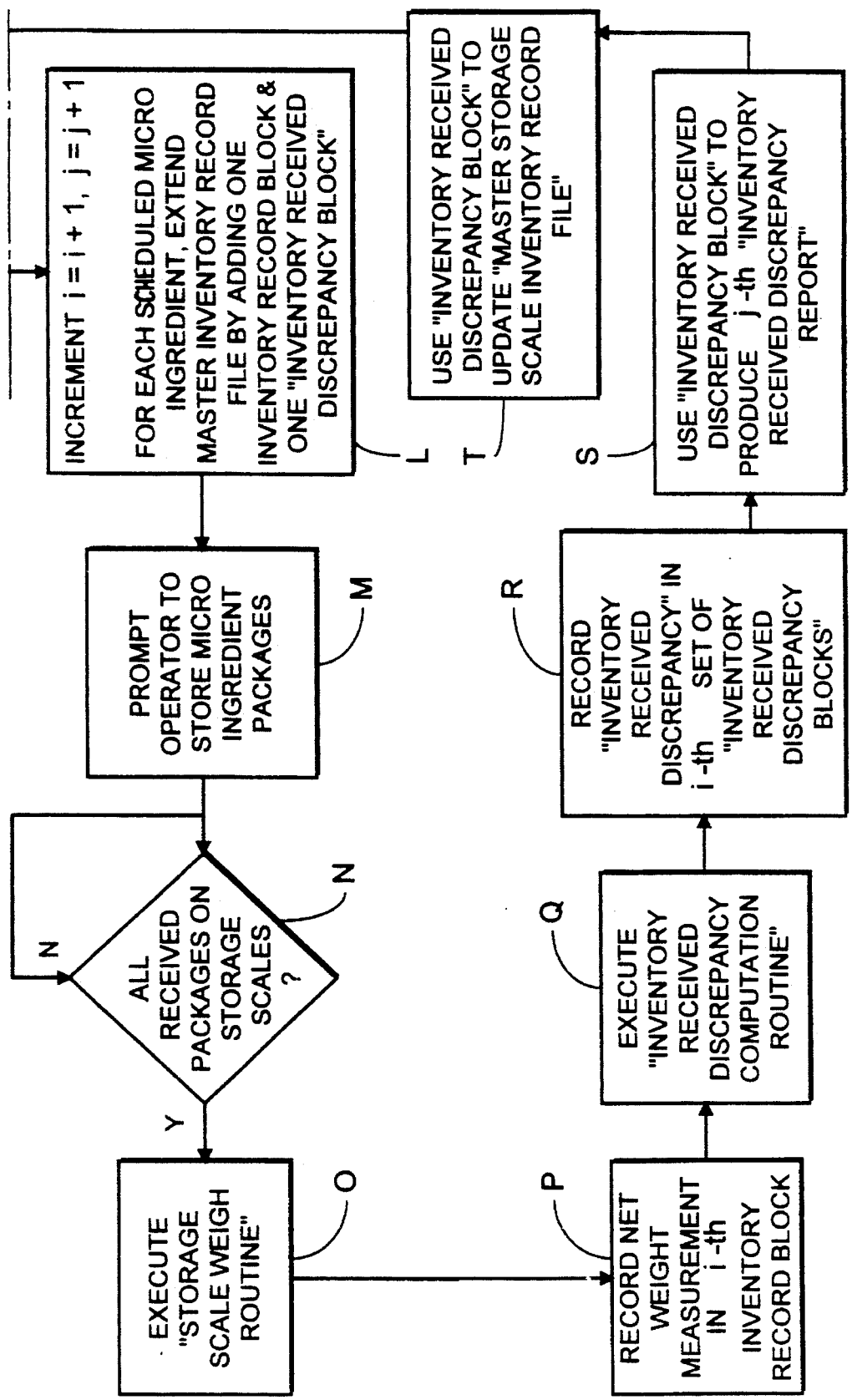
FIG. 18A₂

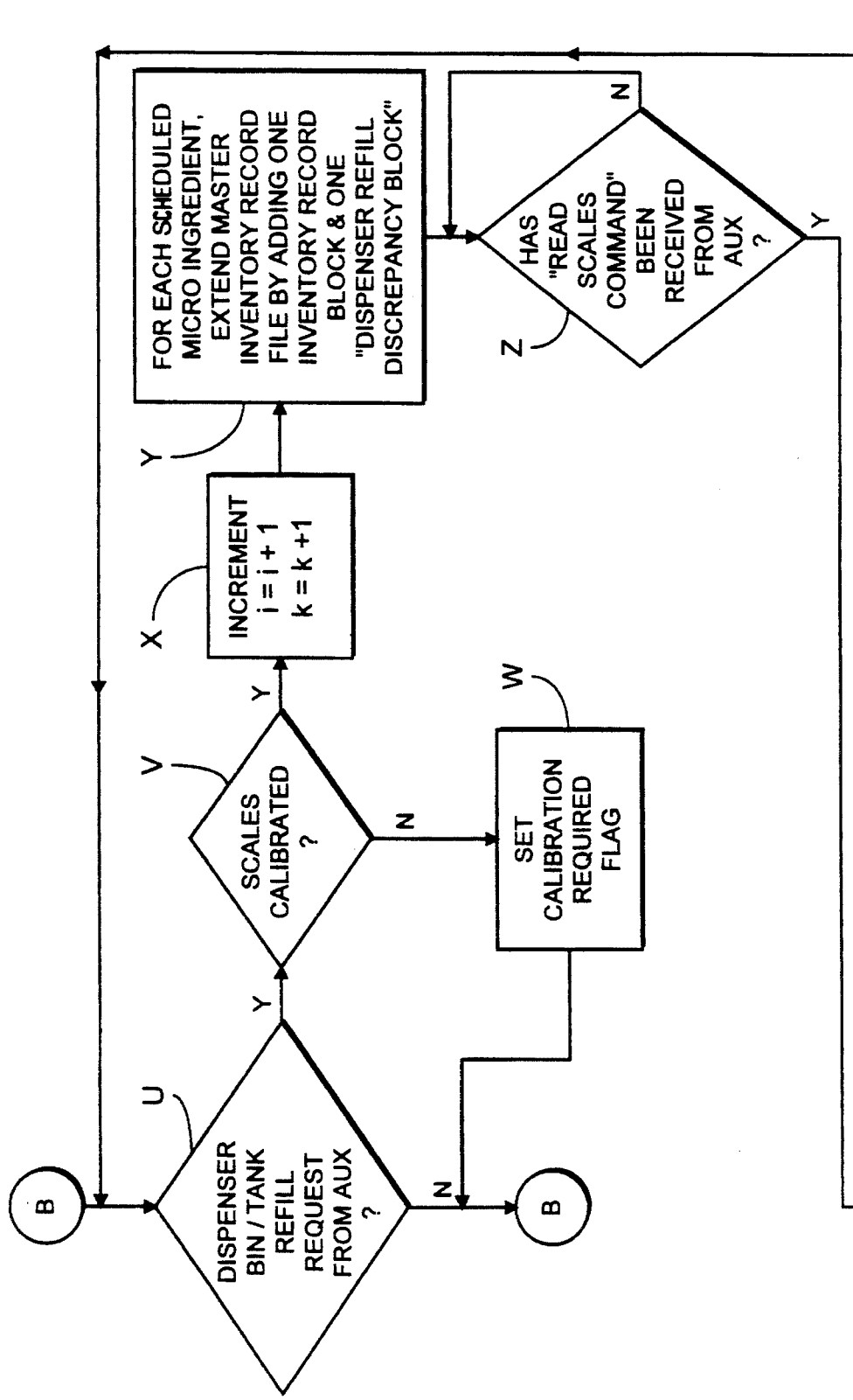
FIG. 18B1

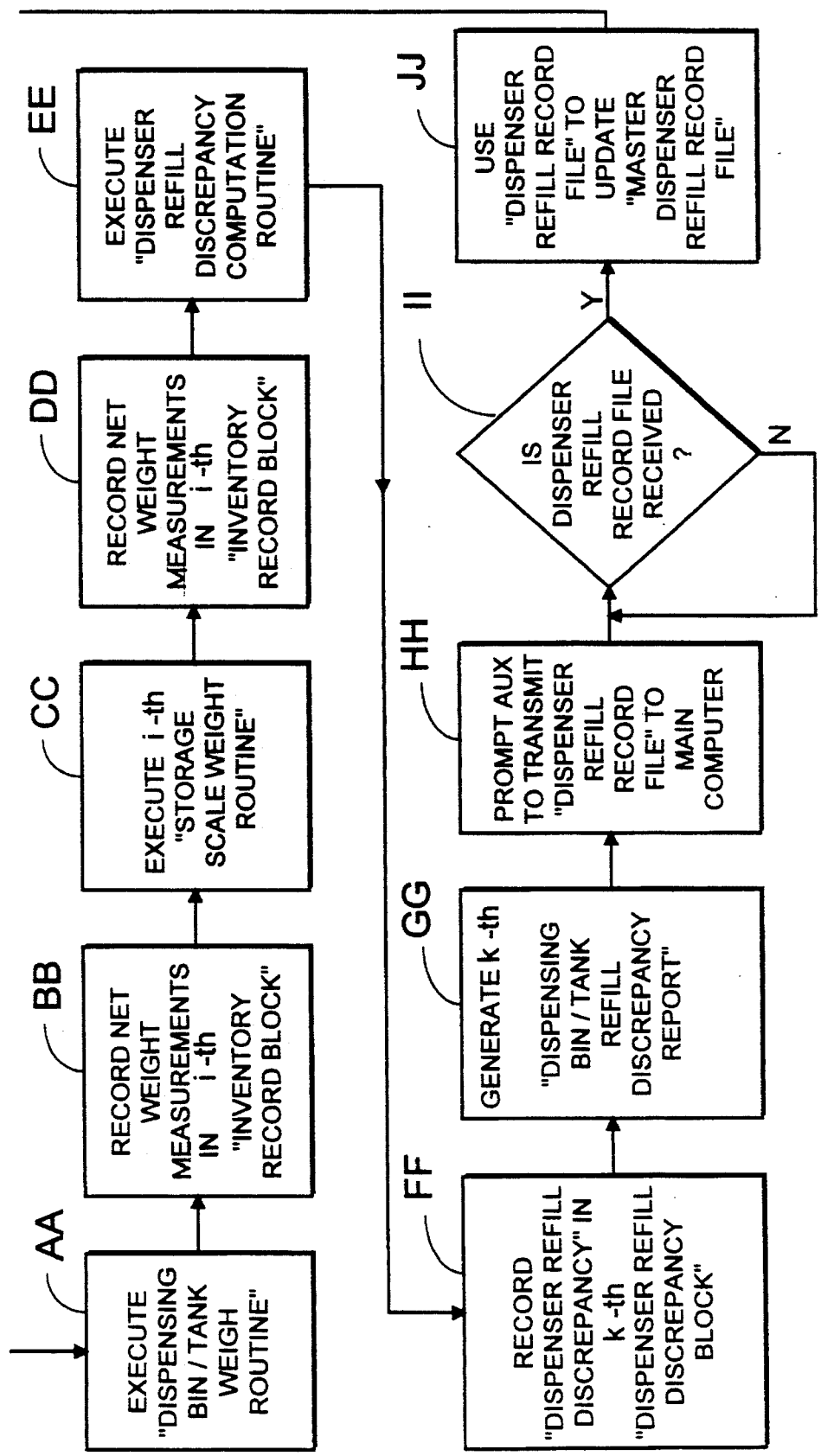
FIG. 18B2

1-30-94 SUN
CHKD: _____

ANIMAL FEEDING FACILITY
RECEIVED INVENTORY REPORT
MICRO INGREDIENT INVENTORY

PAGE 1
3:59 PM

| INGREDIENT CODE | STORAGE SCALE BEGINNING NET WT. | INVENTORY RECEIVED NET WEIGHT | DISP. REFILL NET WEIGHT | STORAGE SCALE CURRENT NET WT. | INVENTORY RECEIVED DISCREP. NET WT. |
|---|---|---|---|---|---|
| MGA 500 | 58.400 | 0.000 | 0.000 | 58.259 | -0.141 |
| RUMENSIN 60 | 528.265 | 500.500 | 23.965 | 1008.900 | 4.100 |
| TYLAN 100 | 87.000 | 0.000 | 12.091 | 74.909 | 0.000 |
| VITAMIN E 40% | 120.405 | 50.100 | 0.000 | 175.905 | 5.400 |
| VITAMIN A 500 | 74.800 | 0.000 | 0.000 | 74.800 | 0.000 |

RECONCILE INVENTORY DISCREPANCIES:

FIG. 25

1-30-94 SUN
CHKD: _____

ANIMAL FEEDING FACILITY
DISPENSER REFILL REPORT
MICRO INGREDIENT INVENTORY

PAGE 1
3:59 PM

| INGREDIENT CODE | STORAGE SCALE BEGINNING NET WT. | INVENTORY RECEIVED NET WEIGHT | DISPR. REFILL NET WEIGHT | DISPD. NET WEIGHT | STORAGE SCALE CURRENT. NET WT. | INVENTORY RECEIVED DISCREP. NET WT. |
|---|---|---|---|---|---|---|
| MGA 500 | 58.400 | 0.000 | 40.050 | 8.159 | 10.000 | -0.141 |
| RUMENSIN 60 | 528.265 | 500.500 | 23.965 | 78.900 | 924.100 | 4.100 |
| TYLAN 100 | 87.000 | 0.000 | 12.091 | 76.909 | 0.000 | 0.000 |
| VITAMIN E 40% | 120.405 | 50.100 | 0.000 | 5.905 | 165.003 | 5.400 |
| VITAMIN A 500 | 74.800 | 0.000 | 0.000 | 0.000 | 74.800 | 0.000 |

RECONCILE INVENTORY DISCREPANCIES:

FIG. 26

1-30-94 SUN
FORMULA: 12A

ANIMAL FEEDING FACILITY
END-OF-PRODUCTION RUN REPORT
MICRO INGREDIENT INVENTORY

START: 7:00 AM  STOP: 7:38 AM  PAGE 1  3:59 PM  CHKD: ____

| INGREDIENT CODE | TOTAL BEGINNING NET WT. | THEO. NET WEIGHT | DISPR. NET WEIGHT | DELTA NET WEIGHT | RECEIVED NET WEIGHT | TOTAL CURRENT NET WT. |
|---|---|---|---|---|---|---|
| MGA 500 | 58.400 | 1.409 | 1.410 | 0.009 | 0.000 | 57.000 |
| RUMENSIN 60 | 528.265 | 34.074 | 33.965 | -0.091 | 500.000 | 994.100 |
| TYLAN 100 | 87.000 | 2.099 | 2.091 | 0.099 | 0.000 | 85.000 |
| VITAMIN E 40% | 120.405 | 0.312 | 0.405 | -0.093 | 50.000 | 170.000 |
| VITAMIN A 500 | 74.800 | 2.882 | 2.810 | 0.082 | 0.000 | 72.000 |

RECONCILE INVENTORY DISCREPANCIES:

FIG. 27

ANIMAL FEEDING FACILITY
END-OF-PRODUCTION-PERIOD RUN REPORT
MICRO INGREDIENT INVENTORY 1-30-94 SUN  
START: 7:00 AM  STOP: 3:38 PM  CHKD: _____  PAGE 1  3:59 PM

| INGREDIENT CODE | TOTAL BEGINNING NET WT. | RECEIVED NET WEIGHT | REFILL DISC. NET WT. | DISP. NET WEIGHT | TOTAL CURRENT NET WT. | TOTAL DISC. NET WT. |
|---|---|---|---|---|---|---|
| MGA 500 | 58.400 | 0.000 | 0.410 | 1.810 | 58.140 | 1.140 |
| RUMENSIN 60 | 528.265 | 500.500 | -3.965 | 50.100 | 994.100 | -19.400 |
| TYLAN 100 | 87.000 | 0.000 | 2.091 | 9.900 | 80.000 | -0.809 |
| VITAMIN E 40% | 120.405 | 50.100 | -0.405 | 5.500 | 165.400 | -0.800 |
| VITAMIN A 500 | 74.800 | 0.000 | 0.810 | 1.110 | 72.000 | 2.500 |

RECONCILE INVENTORY DISCREPANCIES:

FIG. 28

INTELLIGENT SYSTEM AND PROCESS FOR AUTOMATED MONITORING OF MICROINGREDIENT INVENTORY USED IN THE MANUFACTURE OF MEDICATED FEED RATIONS

BACKGROUND OF THE INVENTION

1. Field of the Invention

The present invention relates generally to an improved way of accurately and continuously accounting for the identity, quantity, supplier and supplier's lot number of microingredients used in the manufacture of medicated feed rations provided to animals in a feedlot.

2. Brief Description of the Prior Art

The need to provide animals with vitamins, minerals, proteins, enzymes, hormones, antibiotics, worm medicines, and other nutritional supplements and medications is well recognized in the livestock and poultry industries. The manner in which these supplements are mixed together and added to a consumptive fluid carrier such as water is disclosed in great detail in U.S. Pat. No. 4,733,971 to Pratt, and is incorporated herein by reference.

In particular, it is well known to use computer-controlled machinery to dispense metered amounts of micro-ingredients into a mixing tank and thereafter mix these microingredients with water to form a slurry mixture. In a conventional manner, the prepared slurry is fed directly to animals or is applied to animal feed rations using mixing or spraying technology well known in the art.

As most animal feed supplements include pharmaceutical substances, the production of these "medicated feeds" are subject to the regulations of the Food and Drug Administration (FDA), 21 CFR Ch.1, Part 225 "Current Good Manufacturing Practice for Medicated Feeds", incorporated herein by reference in its entirety. Consequently, the equipment and procedures used at particular feedlots to produce "medicated feed" rations are routinely inspected by FDA officials to ensure compliance with the above-cited FDA regulations. In order to monitor compliance with FDA regulations, feedlots producing medicated feeds on location are required to maintain written records documenting the types and amounts of microingredients dispensed and mixed together to prepare batches of medicated feed during the course of each day.

While prior art machinery is capable of precisely metering, dispensing and mixing metered quantities of microingredients to form slurry supplements having diverse nutritional and medicinal properties, prior art microingredient machines nevertheless suffer from a number of significant shortcomings and drawbacks.

In particular, prior art microingredient dispensing and mixing machines by their very design do not permit the operators thereof to accurately account for the total amounts of microingredients contained within the various components of the system. Consequently, it has been quite difficult to accurately comply with preexisting FDA regulations.

Also, prior art microingredient dispensing and mixing machines by their very design have required that feedmill operators manually create microingredient inventory records and reports. As such, feedmill operators and managers alike have not been provided opportunities to easily and accurately satisfy FDA regulations when preparing microingredient inventory records and reports. In addition, the use of prior art machinery and processes have made it very difficult to accurately account for losses in microingredient inventory during inventory receiving operations, dispensing bin and tank refilling operations, and dispensing and mixing operations.

Thus, there is a great need in the art for improved equipment and techniques that facilitate the accurate accounting of microingredients supplied to programmed microingredient machines for dispensing and mixing, while overcoming the shortcomings and drawbacks of prior art equipment and methodologies.

OBJECTS AND SUMMARY OF THE INVENTION

Accordingly, it is a primary object of the present invention to provide a method and apparatus for accounting for both the types and quantities of microingredients stored in inventory and also within a programmable microingredient dispensing and mixing machine, while overcoming the shortcomings and drawbacks of prior art devices and techniques.

A further object of the present invention is to provide such apparatus in the form of an improved programmable microingredient dispensing and mixing system which automatically measures and records the amount of microingredient contained within each of a plurality of microingredient dispensing bins and tanks after each inventory receiving operation, dispensing bin and tank filling/refilling operation, micro-batch production run, and arbitrary inventory report request.

A further object of the present invention is to provide such a programmable microingredient and dispensing system, in which the inventory of microingredients contained in the dispensing bins and tanks of the machine are continually cross-checked against the inventory of microingredients stored on corresponding platform storage scales, during all phases of the production process. As a result of this monitoring process, automated detection of microingredient spillage (i.e., loss or gain) is possible.

Another object of the present invention is to provide an improved machine for dispensing and mixing microingredients, while accurately accounting for all microingredients stored in the dispensing bins and tanks of the machine.

A further object of the present invention is to provide a programmable microingredient dispensing and mixing system, in which computer-controlled weight measuring mechanisms are provided for each platform storage scale, dispensing bin and dispensing tank in the system.

A further object of the present invention is to provide such a programmable microingredient dispensing and mixing system, in which computer-controlled weight measuring mechanisms are interfaced with a main computer system in order to continuously monitor (i) the auxiliary inventory of solid and liquid microingredients stored on a plurality of platform storage scales, (ii) the inventory of solid microingredients stored in active dispensing bins, and (iii) the inventory of liquid microingredients stored in the dispensing tanks of the machine of the present invention.

A further object of the present invention is to provide a computerized inventory process using such a system, in which the weight value of each platform storage scale is compared against the weight value of each corresponding dispensing bin in order to detect the occurrence of microingredient loss which oftentimes is caused by spillage occasioned during dispensing bin filling operations, theft, or undetected system calibration errors.

Another object of the present invention is to provided a novel method of logging-in containers of microingredients into the inventory of a novel microingredient dispensing and mixing system, using portable computers and bar code symbol reading equipment.

Another object of the present invention is to provide a novel method of continuously accounting for the inventory of microingredients logged-in with a programmable microingredient dispensing and mixing system.

An even further object of the present invention is to provide a novel method of producing microingredient reports from a programmable microingredient dispensing and mixing machine.

An even further object of the present invention is to provide a novel arrangement of apparatus for logging-in and managing an inventory of microingredient packages using a computer-based microingredient inventory management system.

An even further object of the present invention is to provide a novel method for logging-in and managing an inventory of microingredient packages using a computer-based microingredient inventory management system.

An even further object of the present invention is to provide a novel method for storing an inventory of microingredient packages that have been logged-in with a computer-based ingredient inventory management system.

An even further object of the present invention is to provide a novel method for detecting microingredient inventory loss in a programmable microingredient dispensing and mixing system.

An even further object of the present invention is to provide apparatus for detecting microingredient inventory loss in a programmable microingredient dispensing and mixing system.

These and other objects of invention will become apparent hereinafter and in the claims to invention.

BRIEF DESCRIPTION OF THE DRAWINGS

For a more complete understanding of the present invention, the following Description of the Illustrative Embodiment should be read in conjunction with the following drawings, wherein:

FIG. 2 is a partially fragmented, perspective view of a platform storage scale adapted to measure the weight of microingredient contained in a shipping package or container, such as a bag, logged in with the system using the auxiliary computer and interfaced portable bar code symbol reader;

FIG. 9 is a graphical representation of a System Configuration File created by the auxiliary computer system and used by the main computer system of the present invention;

FIG. 10 is a graphical representation of an Inventory Received Record File created by the auxiliary computer and used by the main computer system of the present invention;

FIG. 11 is a graphical representation of the Master Storage Scale Inventory Record File created and managed by the main computer system of the present invention;

FIG. 12 is a graphical representation of a Dispenser Refill Record File created by the auxiliary computer and used by the main computer system;

FIG. 13 is a graphical representation of the Master Dispensing Bin/Tank Inventory Record File created and managed by the main computer system of the present invention;

FIG. 14 is a graphical representation of the Master Inventory Record File created and managed by the main programmed computer system of the present invention;

FIG. 14A is graphical representation of an Inventory Record Block in the Master Inventory Record File of FIG. 14;

FIG. 14B is a graphical representation of a Inventory Received Discrepancy Block in the Master Inventory Record File of FIG. 14;

FIG. 14C is a graphical representation of a Dispenser Refill Discrepancy Block in the Master Inventory Record File of FIG. 14;

FIG. 14D is a graphical representation of a Microingredient Usage Discrepancy Block in the Master Inventory Record File of FIG. 14;

FIG. 14E is an Inventory Record Block in the Master Inventory Record File of FIG. 14;

Figure 19:
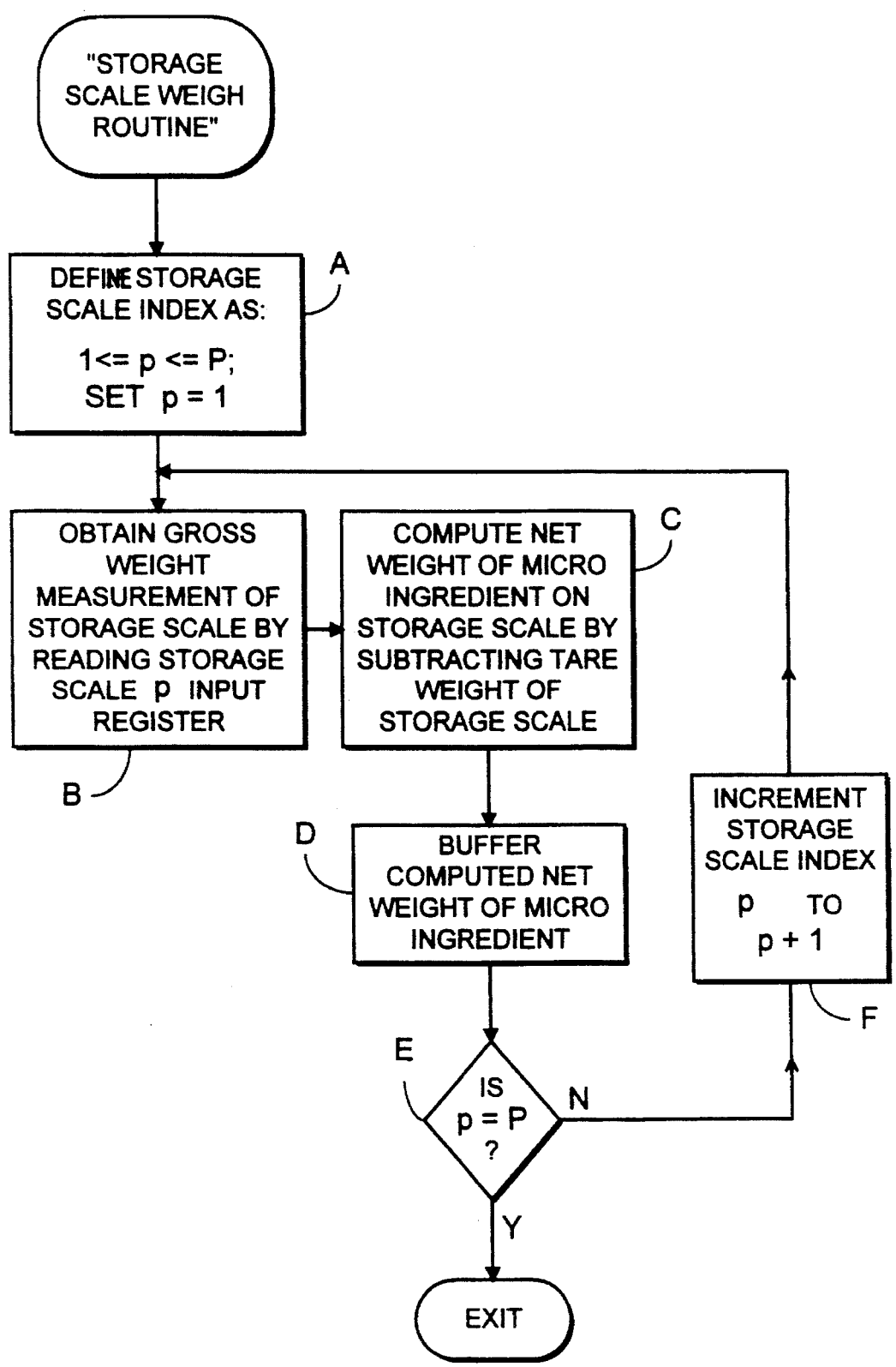
Figure 20:
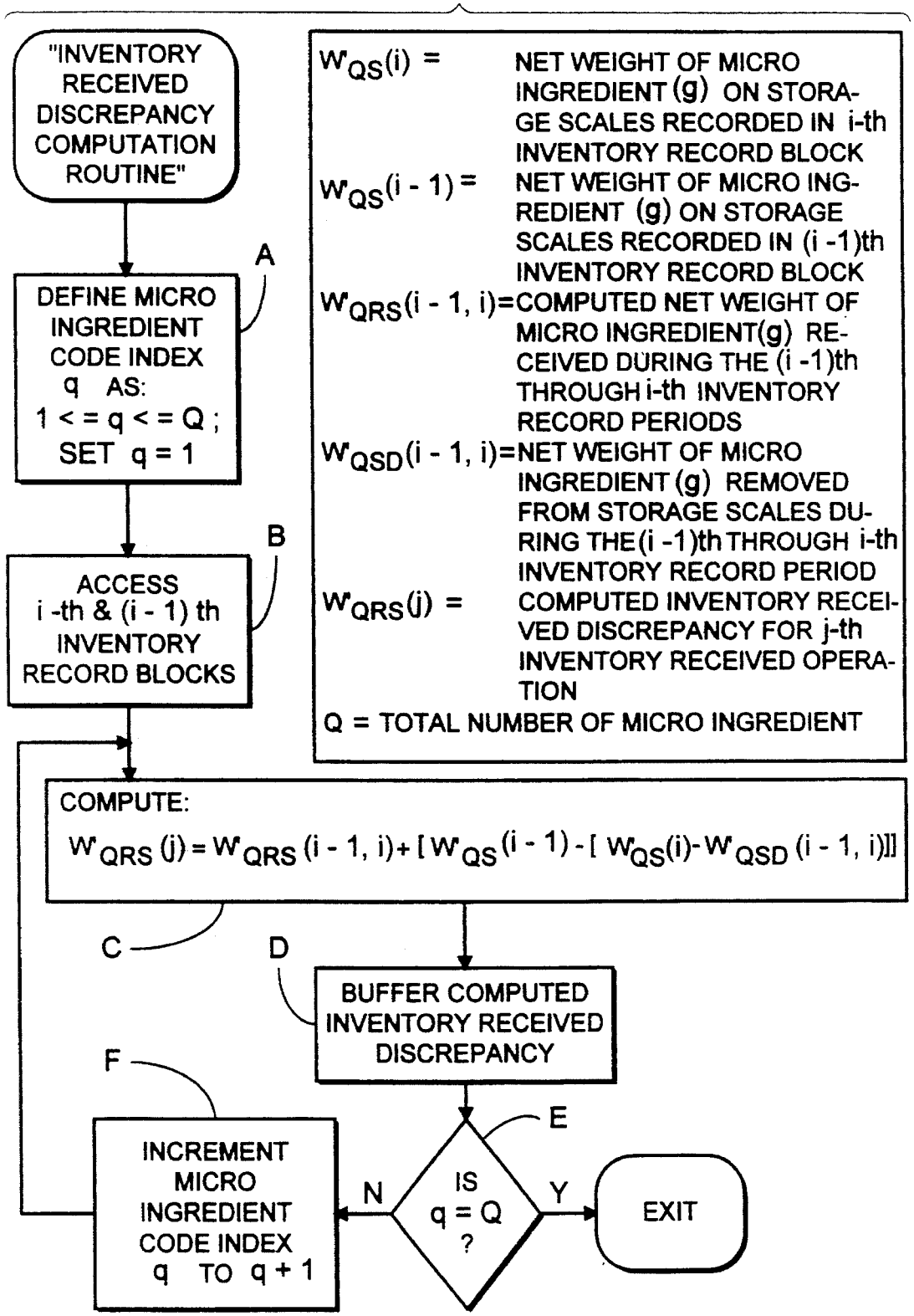
Figure 21A:
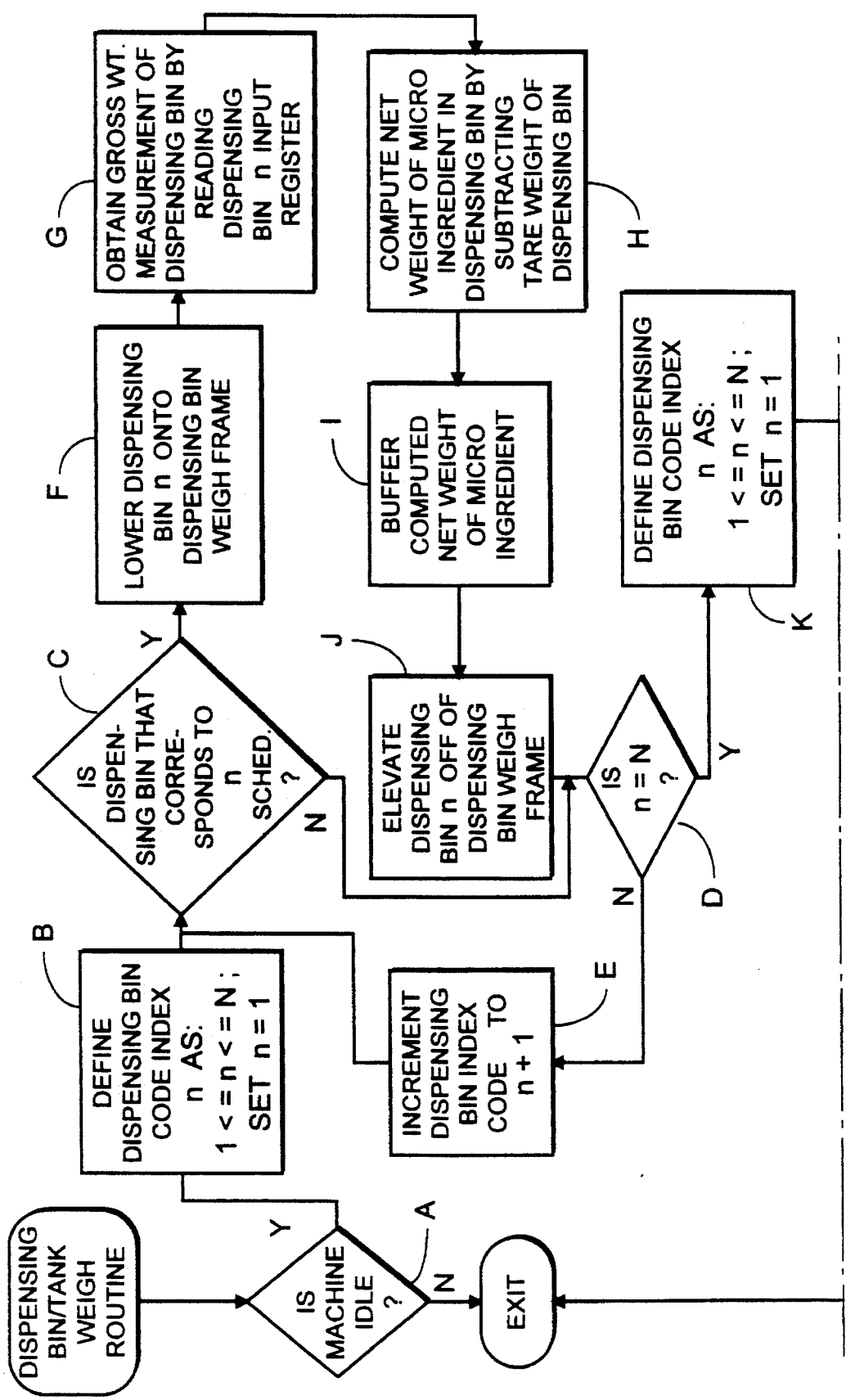
Figure 21B:
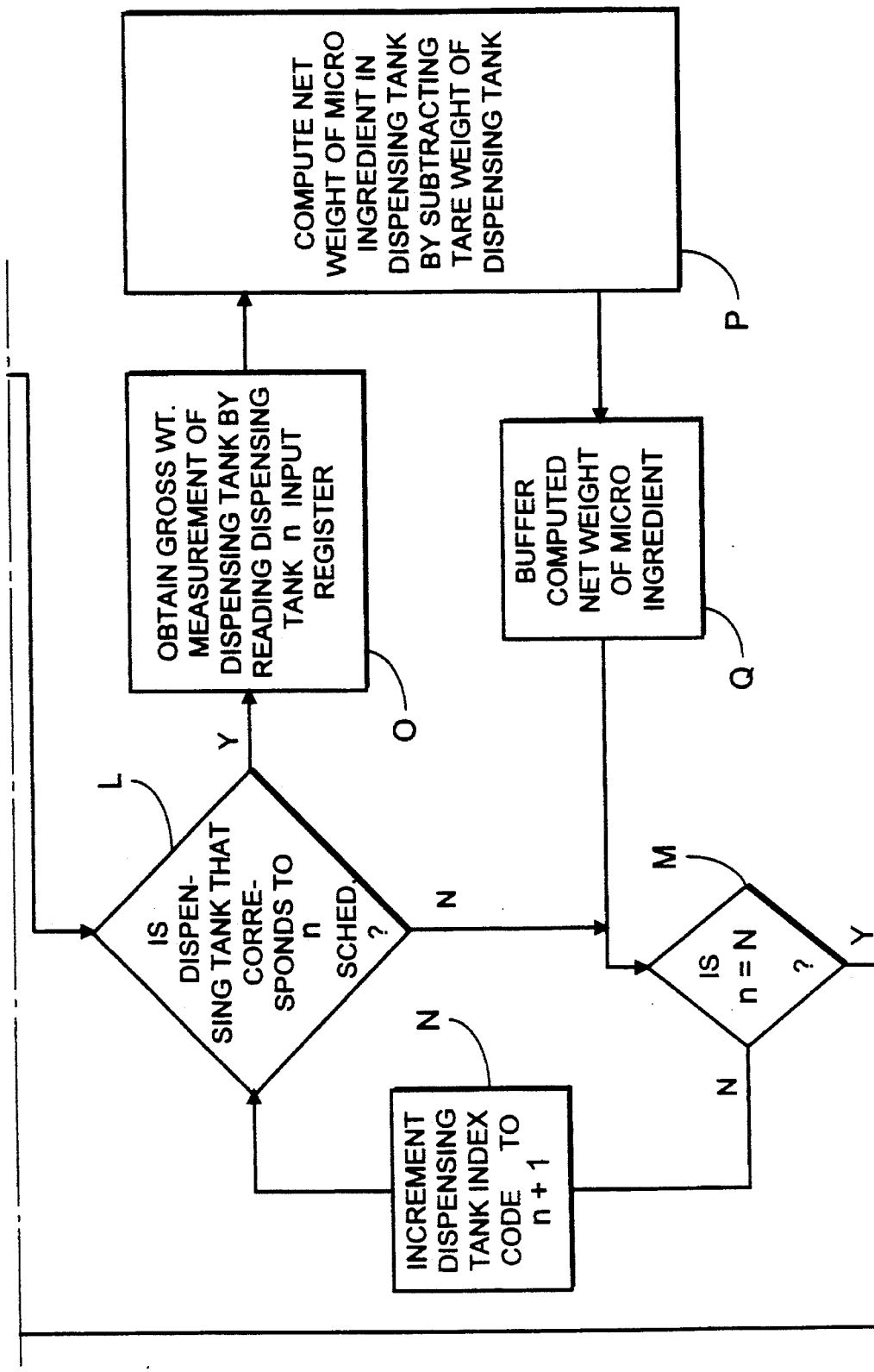
Figure 22:
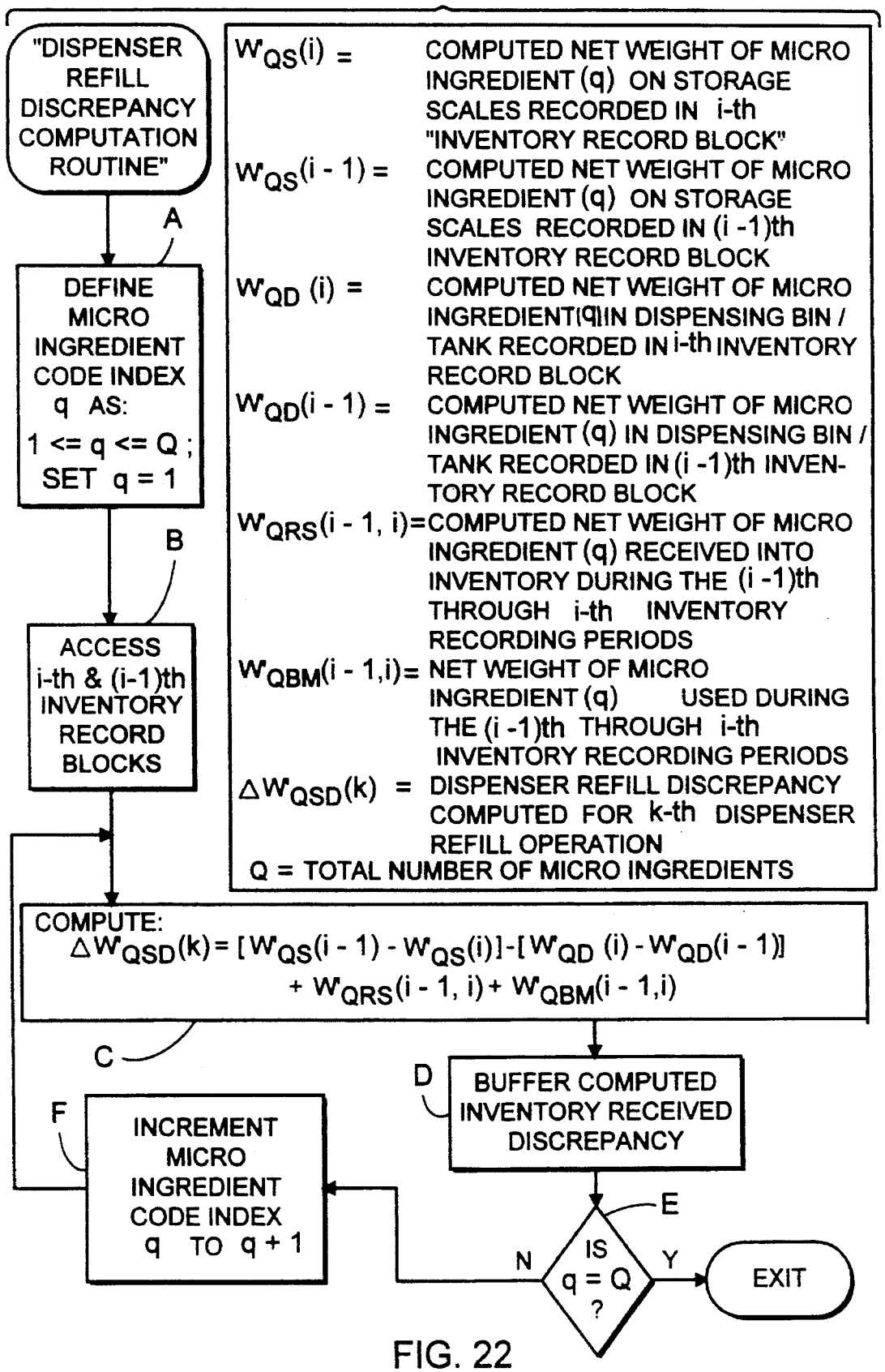
Figure 23:
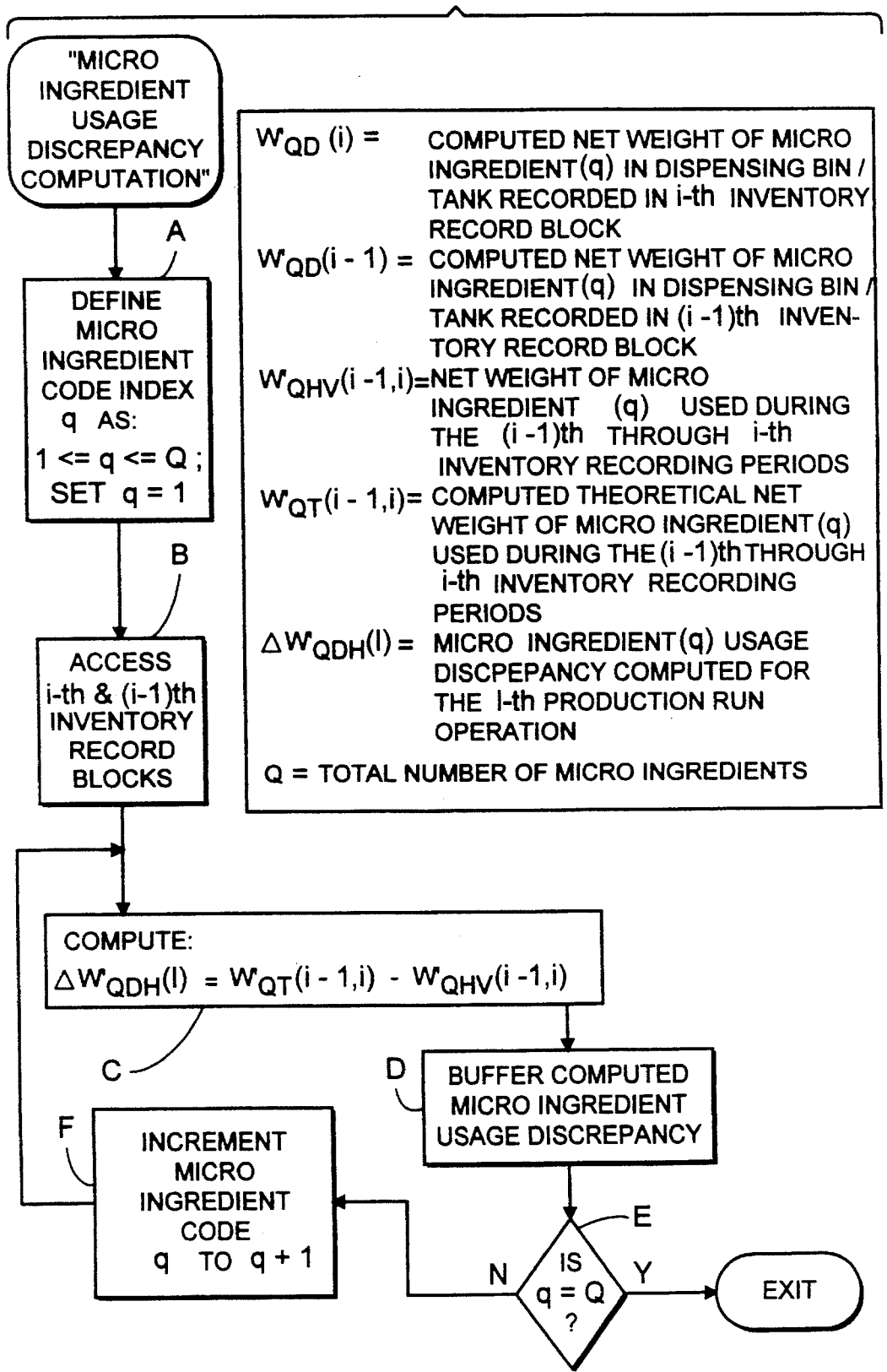
Figure 24A:
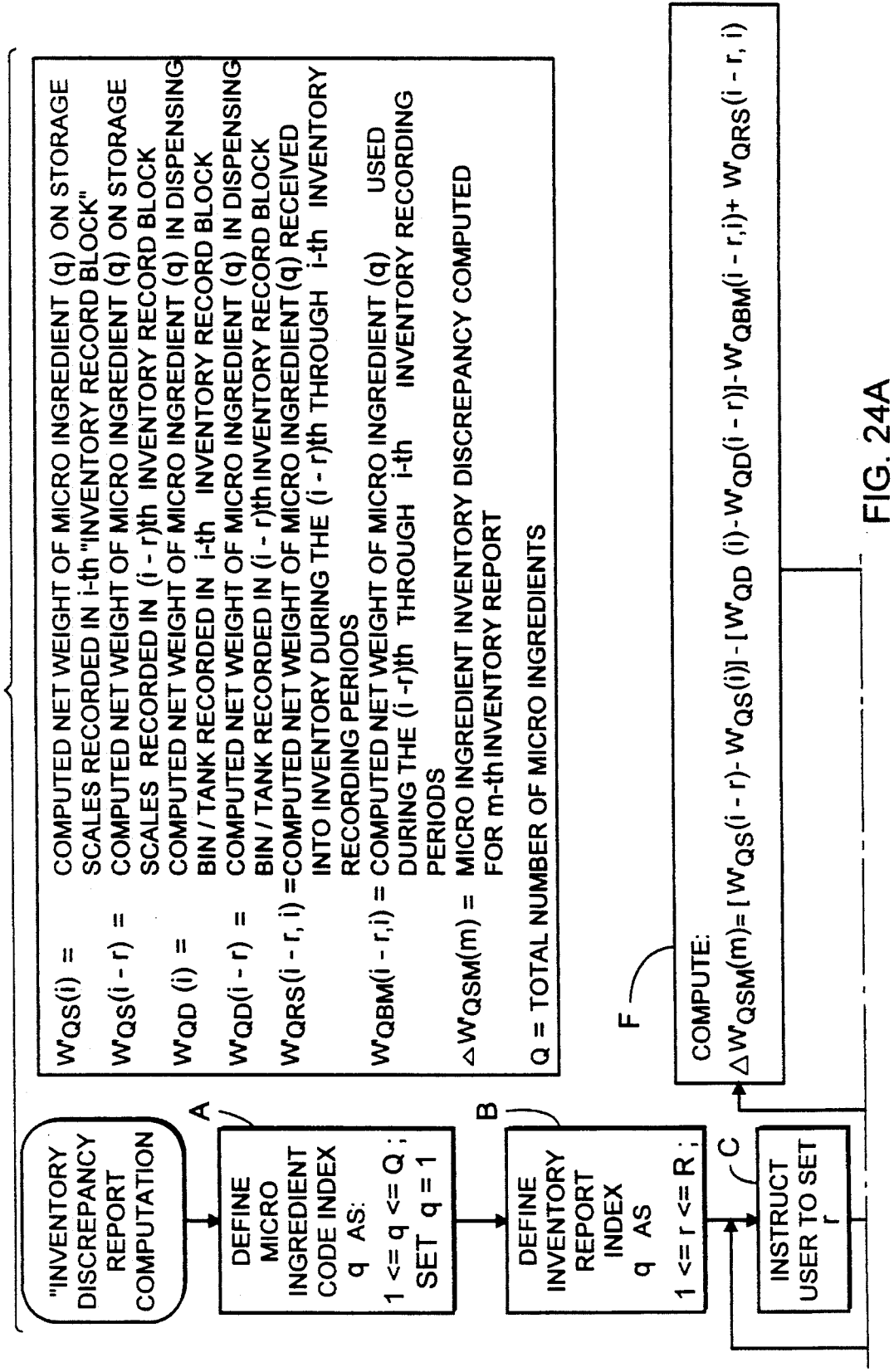
Figure 24B:
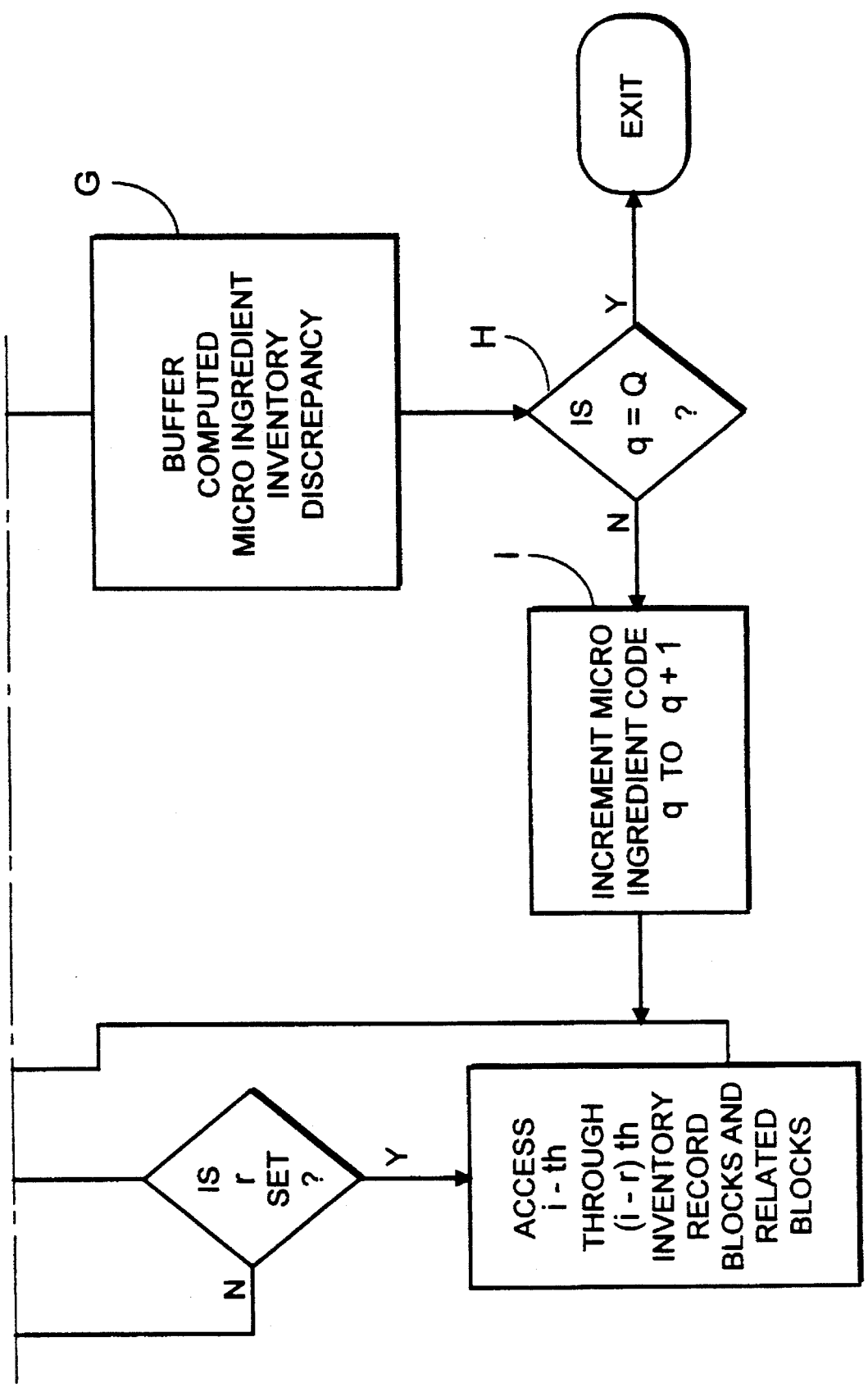

FIGS. $18_1$ to 18C, taken together, set forth a flow chart illustrating the steps performed during the execution of the Main System Control Routine by the main programmed computer system of the present invention;

FIG. 19 is a flow chart illustrating the steps performed during the execution of the Storage Scale Weigh Routine by the main programmed computer system of the present invention;

FIG. 20 is a flow chart illustrating the steps performed during the execution of the Inventory Received Discrepancy Computation Routine by the main programmed computer system of the present invention;

FIGS. 21A and 21B are a flow chart illustrating the steps performed during the execution of the Dispensing Bin/Tank Weigh Routine by the main programmed computer system of the present invention;

FIG. 22 is a flow chart illustrating the steps performed during the execution of the Dispenser Refill Discrepancy Computation Routine by the main programmed computer system of the present invention;

FIG. 23 is a flow chart illustrating the steps performed during the execution of the Microingredient Usage Discrepancy Computation Routine by the main programmed computer system of the present invention;

FIG. 24A and 24B is a flow chart illustrating the steps performed during the execution of the Inventory Discrepancy Computation Routine by the main programmed computer system of the present invention;

FIG. 25 is a graphical representation of an exemplary received inventory report produced for the system of the present invention;

FIG. 26 is a graphical representation of an exemplary dispenser refill report produced for the system of the present invention;

FIG. 27 is a graphical representation of an exemplary end-of-production run report produced for the system of the present invention; and FIG. 28 is a graphical representation of an exemplary end-of-production-period run report produced for the system of the present invention.

DETAILED DESCRIPTION OF THE ILLUSTRATIVE EMBODIMENT OF THE PRESENT INVENTION

The method and apparatus of the present invention will now be described with reference to the above described figure drawings, throughout which like figures shall be indicated with like reference numbers.

For purposes of illustration, the apparatus of the present invention is realized in the form of a novel computer-controlled microingredient dispensing, mixing and inventory accounting system 1, shown in FIGS. 1 to 8. As will become apparent hereinafter, this system is particularly designed for carrying out "batch-type" production processes, while providing an unprecedented degree of automated control over microingredient inventory monitoring functions. Exemplary information files utilized by the main and auxiliary computer systems of the present invention are schematically illustrated in FIGS. 9 to 14E. Novel methods for configuring the system, receiving inventory shipments, and (re)filling dispensing bins and tanks in the system are illustrated in the high-level flow charts set forth in FIGS. 15, 16A, 16B and 17 respectively. The continuous inventory accounting process of the present invention, along with its subordinate control subprocesses, are schematically illustrated in the flow charts set forth in FIGS. 18₁ to 24.

Figure 1:
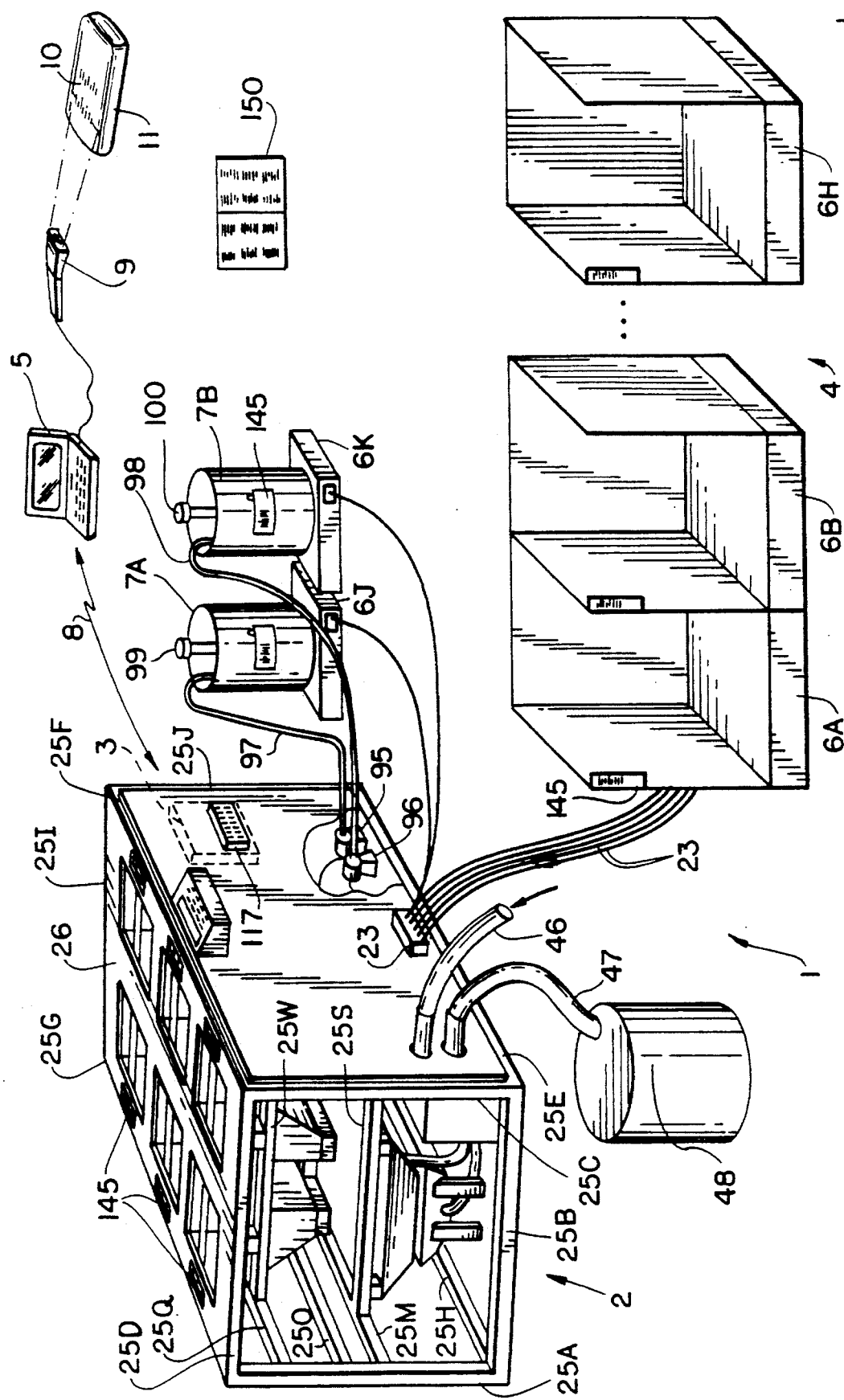
FIG. 1 is a perspective view of the programmable microingredient dispensing, mixing and inventory system of the present invention, including computer-controlled machinery for measuring, dispensing and mixing microingredients, a plurality of platform storage scales for measuring the weight of microingredients contained in packaged bags thereof, and a portable auxiliary computer having a bar code symbol reader interfaced therewith for identifying packaged bags of microingredients to be logged into the inventory of the system.

As shown in FIG. 1, the microingredient dispensing, mixing and inventory accounting system 1 of the illustrative embodiment comprises a number of components, namely: programmable machinery 2 for dispensing, measuring and mixing microingredients and performing flushing operations well known in the art; a main programmed computer system 3 for performing intelligent control and inventory monitoring functions to be described in great detail hereinafter; an inventory storage scale system 4 interfaced with the main computer system, and particularly designed for storing and weighing an inventory of microingredients; and a portable auxiliary computer system 5 interfaced with the main computer system, and programmed for entering information regarding the identity, weight, supplier, supplier lot number, and expiration date of sealed packages of microingredients as they are received into inventory at the feedmill.

As shown in FIG. 1, the inventory storage scale system 4 comprises an assembly of subcomponents, namely: six platform-type inventory storage scales 6A, 6B, 6C, 6D, 6E, 6F, and 6H, for storing and measuring the weight of "solid" microingredient inventory contained in the logged-in bags thereof; two platform-type inventory storage scales 6H and 6I, for storing and measuring the weight of "liquid" microingredient inventory contained in the logged-in containers thereof; and two platform-type inventory storage scales 6J and 6K, interfaced with the main computer system, for measuring the weight of liquid microingredient contained in dispensing tanks 7A and 7B supported thereon.

In general, auxiliary computer 5 is interfaced with the main computer system by a flexible communication cable or by a wireless data communication channel 8 established using RF or cellular data communication techniques known in the mobile computing art. Preferably, the auxiliary computer system is realized as a rugged notebook computer. In the illustrative embodiment, the auxiliary computer has suitable interface circuitry within its housing in order to interconnect with an portable bar code symbol reader 9 capable of reading self-clocking type bar code symbols 10 affixed to packages 11 of microingredients. As will become apparent hereinafter, these bar code symbols are used to facilitate logging (i.e., registering) received packages of microingredients into the inventory of the microingredient dispensing and mixing system of the present invention. A suitable bar code symbol reader is the MS950 Automatic Laser-Based Hand-Held Laser Scanner commercially available from Metrologic Instruments, Inc., of Blackwood, N.J. Preferably, the auxiliary computer is interfaced with an animal feedlot management computer network of the type generally disclosed in copending U.S. application Ser. No. 07/973,450 entitled "Computer Network and Method for Feeding Animals in An Feedlot Using the Same" filed Nov. 9, 1992, and incorporated herein by reference in its entirety. As will become apparent hereinafter, the auxiliary computer is programmed to perform a number of functions, including the importation of information files from, and the exportation of information files to, other computers integrated within the animal feedlot management computer network referenced above.

As best shown in FIG. 2, each platform storage scale comprises an assembly of subcomponents, namely: a base portion 12 made of rugged construction; three compression-type load cell 13A, 13B, and 13C mounted upon the base portion; and a weighing platform 14 supported upon the load cells, and capable of supporting the weight (e.g., several tons) of microingredient packages maintained in inventory. As shown, electronic signal processing circuitry 14, realized on a printed circuit board 15, is mounted within the base portion. Side support panels 16A, 16B, and 16C, vertically extend from the base portion and define an inventory storage area for storing "logged-in" packages (e.g., bags, containers, etc.) of microingredients upon the weighing surface of the underlying storage scale. A conventional power supply circuitry 17 is provided for supplying sufficient supply voltages to printed circuit board 15. Mounted to the upper portion of side support panel 16A is a plate 18 for supporting a bar code symbol 19 uniquely assigned to the platform storage scale by the main computer system. As will become apparent hereinafter, the purpose of this bar code symbol is to identify the scale in the continuous inventory accounting system of the present invention.

Figure 8:
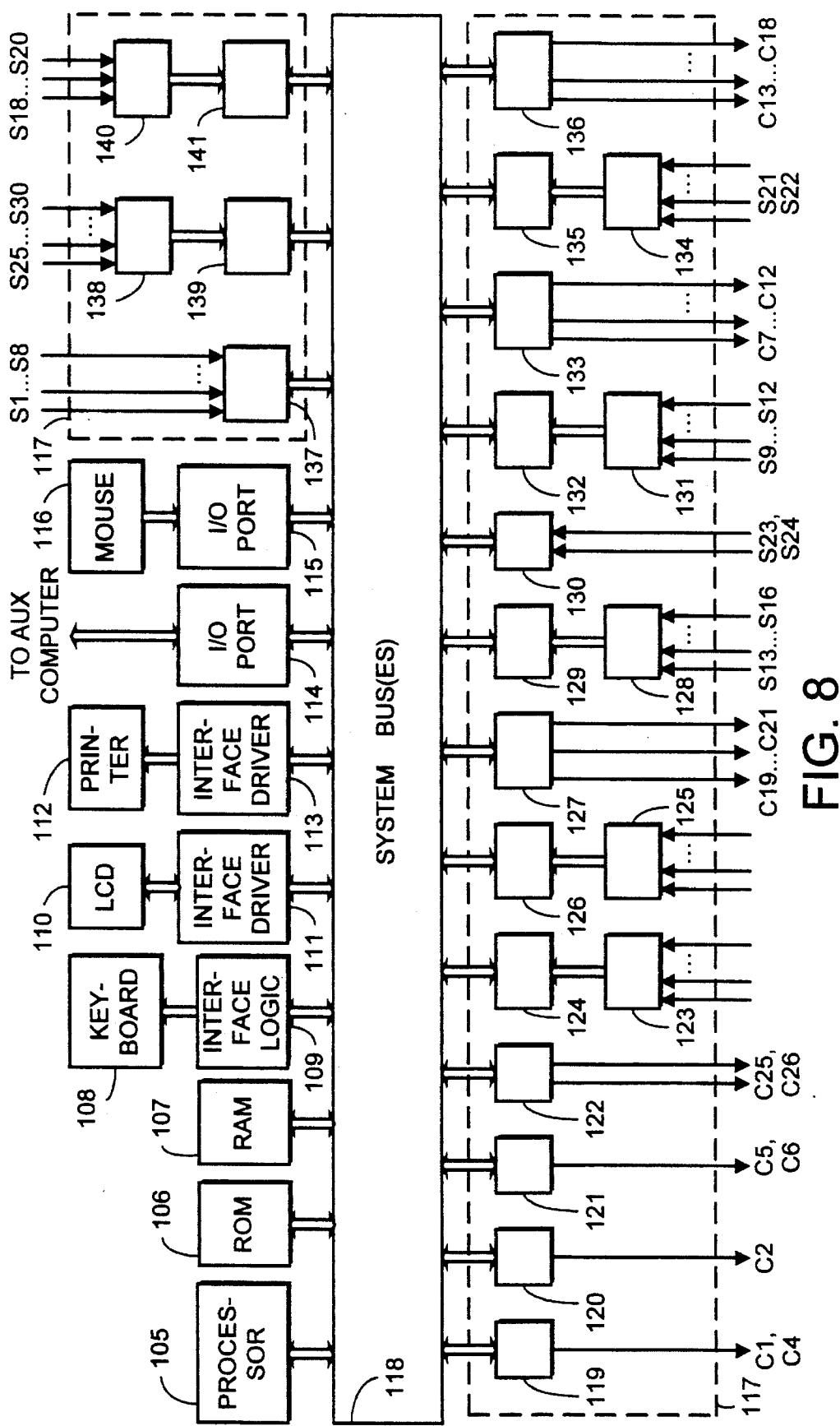
FIG. 8 is a schematic representation of the main programmed computer system of the present invention.

As shown in FIG. 1, the plurality of inventory storage scales can be connected together at their base portions, so that they form an arrangement of inventory storage areas, each having a storage scale 12 as its flooring surface. Preferably, the microingredient dispensing and mixing machine is closely situated to the inventory storage area. Alternatively, these storage scales can be arranged in any other arbitrary configuration which satisfies the requirements of the particular feedmill in which the storage scales are installed. On a side panel of each base portion, an output signal connector 20 is provided for transmitting the digital platform weight signals over a flexible shielded cable 21 to an input signal connector 23 on the machine housing. In turn, input signal connector 23 is connected to a preassigned storage scale input register located on input/output(I/O) board 117 operably associated with the main computer system, as shown in FIG. 8.

In general, the operation of each inventory storage scale is as follows. Each load cell supporting the platform upon which microingredient package(s) are stored, produces an analog electrical signal proportional to the load experienced by the load cell. Each of these analog electrical signals is provided to signal processing circuitry 14 on PC board 15 for processing. Typically, the signal processing circuitry includes summing amplifiers which amplify and combine the individual load cell signals to produce a resultant analog weight signal. Conventional analog-to-digital (A/D) signal conversion circuitry is provided on the PC board to convert the resultant analog weight signal into a digital weight signal representative thereof. The digital weight signals S1 to S8 produced from storage scales 6A to 6F are provided to designated input registers on the I/O board. Suitable storage scales of the above-described type are sold under the tradename 37 SURVIVOR SP Series Mild Steel Electronic Floor Scale", by Rice Lake Weighing Systems, of Rice Lake, Wisc.

As best illustrated in FIGS. 3 to 8, machine 2 contains a number of components contained within a rugged housing 24. In the illustrative embodiment, the housing has a frame portion (the substructures of which are identified by reference numerals including "25") and a removal covering portion 26. As shown, the frame portion of the illustrative embodiment is constructed from tubular members 25A to 25Z welded together in a conventional manner. The primary function of the frame portion is to provide structural support to various subcomponents that must be maintained in a particular physical relationship during the operation of the machinery. In the preferred embodiment, removable covering portion 26 is realized by a number of wall panels fabricated from sheet metal, fiberglass, or functionally equivalent material. The primary function of the covering portion is to enclose the internal components of the machinery to satisfy safety and maintenance concerns.

Figure 4:
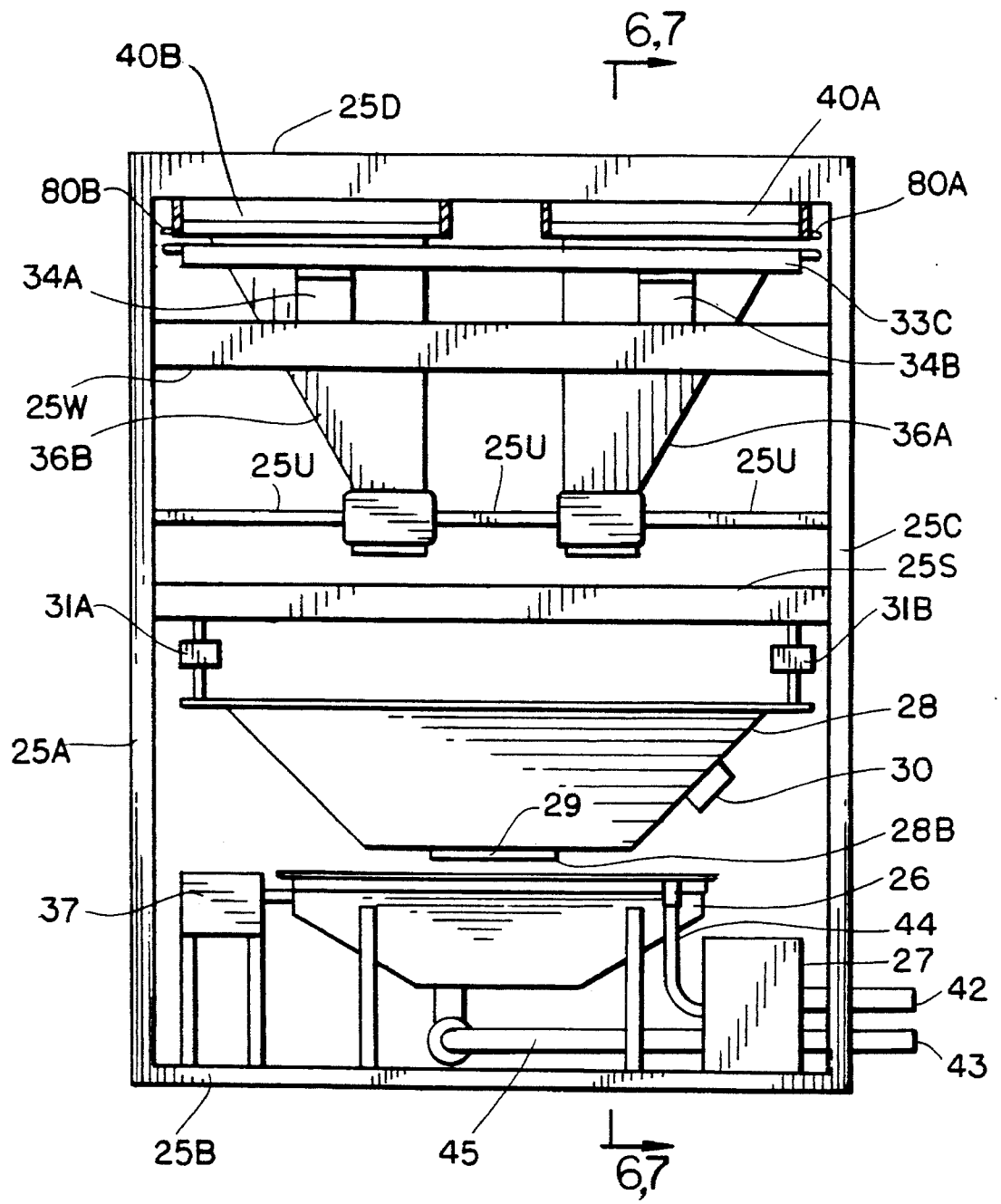
FIG. 4 is a partially fragmented, perspective view of the programmable machinery of the present invention.
Figure 5:
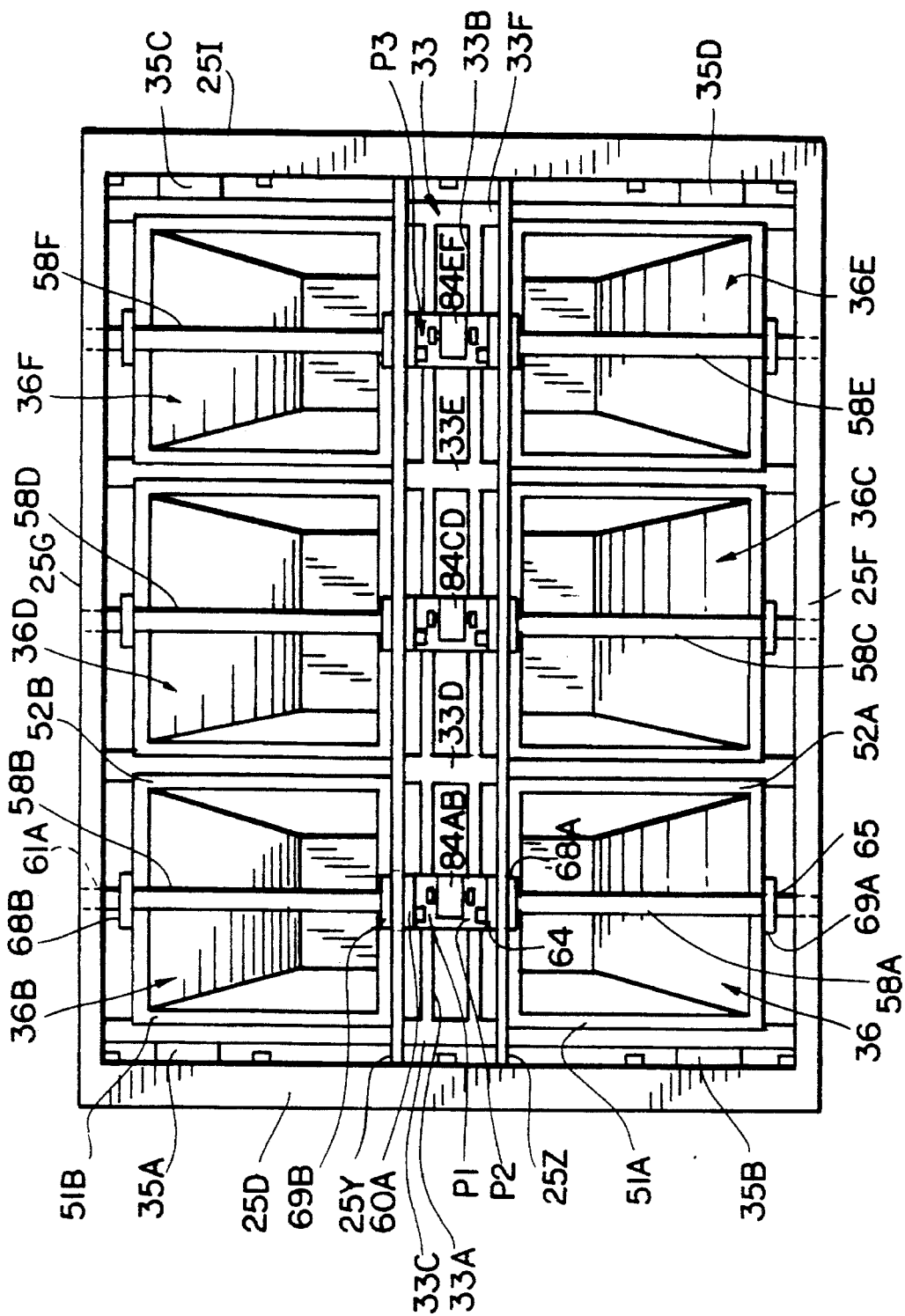
FIG. 5 is a plan view of the programmable machinery of the present invention, shown with its top housing panel removed to reveal internal components housed therewithin.

As best shown in FIGS. 1, 4, and 5, there are a number of subcomponents mounted within the machine housing, namely: main computer system 3; mixing tank 26; electronically-controlled pump 27; weigh hopper 28; actuatable microingredient dispensing valve 29; vibration-type motor 30; tension-type load cells 31A, 31B and 31C, 31D; dispensing-bin weigh frame 33; compression-type load cells 34A, 34B and 34C, 34D; extension-plate members 35A to 35D; microingredient dispensing bins 36A to 36F; mixing motor 37 and associated mixing blades installed in mixing tank 26; and dispensing-bin elevation mechanisms 40A to 40F.

As schematically illustrated in FIG. 8, I/O board 117 is interfaced with main computer system 3 and carries various types of circuitry necessary to support the flow of data and control signals between the main computer system and the peripheral components in the overall system. The details of the main computer system will be described hereinafter.

As shown in FIG. 4, weigh hopper 28 has microingredient retaining area 28A and discharge outlet 28B. Actuatable microingredient dispensing valve 29 is mounted across dispensing outlet 28B and is controlled by control signal C1, generated by circuitry on the I/O board under the control of the main computer system. Vibration-type motor 30 is eccentricity mounted to a side wall of the weigh hopper and is controlled by control signal C2, also generated on the I/O board under the control of by the main computer system.

The function of the weigh hopper is to weigh the amount of microingredient discharged from a dispensing bin into the weigh hopper and to subsequently discharge the measured amount of microingredient into the mixing tank for admixture with water and other microingredients. When driven by control signal C2 from the I/O board, motor 30 vibrates the weigh hopper and causes microingredients contained therein to fall to the bottom of the hopper for eventual discharge into the mixing tank.

As shown in FIGS. 4 and 5, tension-type load cells 31A to 31D are supported from frame support members 25S and 25T. Weigh hopper 28 is supported from these tension-type load cells in a conventional manner. In response to the load in the weigh hopper, analog signals S13 to S16 are produced from these load cells and provided to the I/O board for signal processing, similar to that performed on the PC board of each storage scale described above. Suitable tension-type load cells suitable for use in the illustrative embodiment are commercially available from Tedea, of Conoga Park, Calif.

As illustrated in FIG. 4, mixing tank 26 has a reservoir portion 26A for holding a predetermined amount of "microingredient slurry" made by mixing microingredients and a fluent carrier, such as water, in amounts typically specified by nutritional and/or medical formulas. In a conventional manner, mixing blades (not shown) are rotatably mounted in the mixing tank and are caused to rotate at a desired speed when motor 37 is driven by control signal C4 generated on the I/O board. Typically, mixing tank 26 is fabricated from a non-corrosive material such as stainless steel or fiberglass. As shown in FIG. 4, electronically-controlled pump 27 has both water-inlet and a slurry-outlet ports 42 and 43 which are in fluid communication with the reservoir portion of the mixing tank by way of hoses 44 and 45, respectively. As shown in FIG. 1, each opened container of liquid microingredient is stored upon a preassigned dispensing scale 6J, 6K of the type described above. Typically, hose 46 is used to supply water to inlet port 42, and hose 47 is used to transport produced slurry from mixing tank 26 to an external storage container, (or feed mixer) 48 from which amounts are used for admixture with animal feed in a manner well known in the art. The operation of pump 27 is controlled by control signals C5 and C6 generated on the I/O board.

Figure 6:
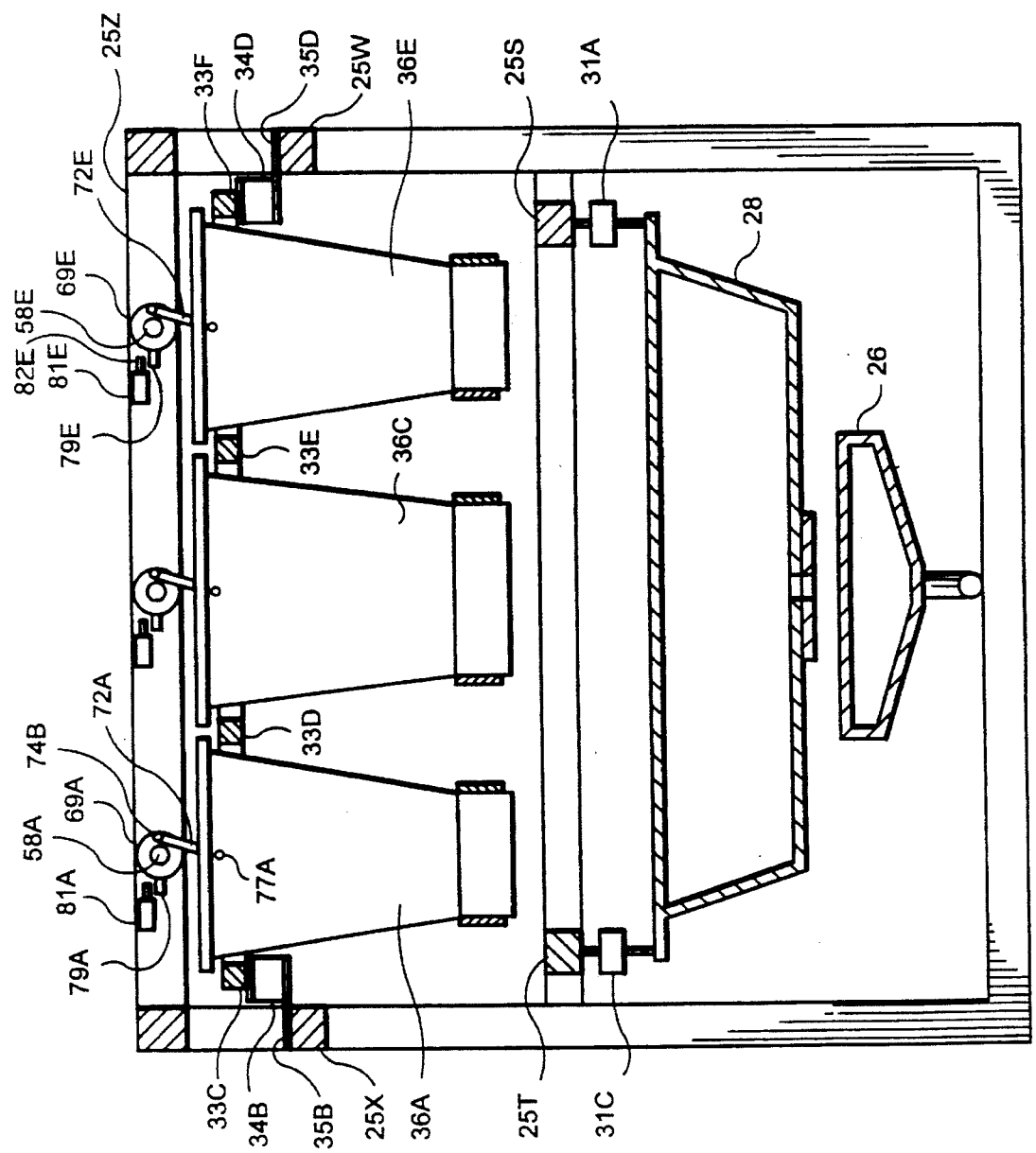
FIG. 6 is a cross-sectional view of the programmable machinery of the present invention, taken along line 6—6 of FIG. 4, showing all microingredient dispensing bins elevated off the dispensing-bin weigh frame.

As shown in FIGS. 5 and 6, extension-plate members 35A to 35D are mounted to frame support members 25W to 25X, and are used to support compression-type load cells 34A, 34B and 34C, 34D, respectively. Dispensing-bin weigh frame 33, in turn, is supported upon these compression-type load cells, which in response to the loads sensed by the individual load cells, produce analog signals S9 to S12 proportional thereto. Analog signals S9 to S12 are provided to signal processing circuitry on the I/O board for conversion into a digital weight signal that is representative of the gross weight of the selected dispensing bin lowered onto weigh frame 33. The manner in which a selected dispensing bin is lowered onto the weigh frame for weighing will be described in greater detail hereinafter.

Figure 3:
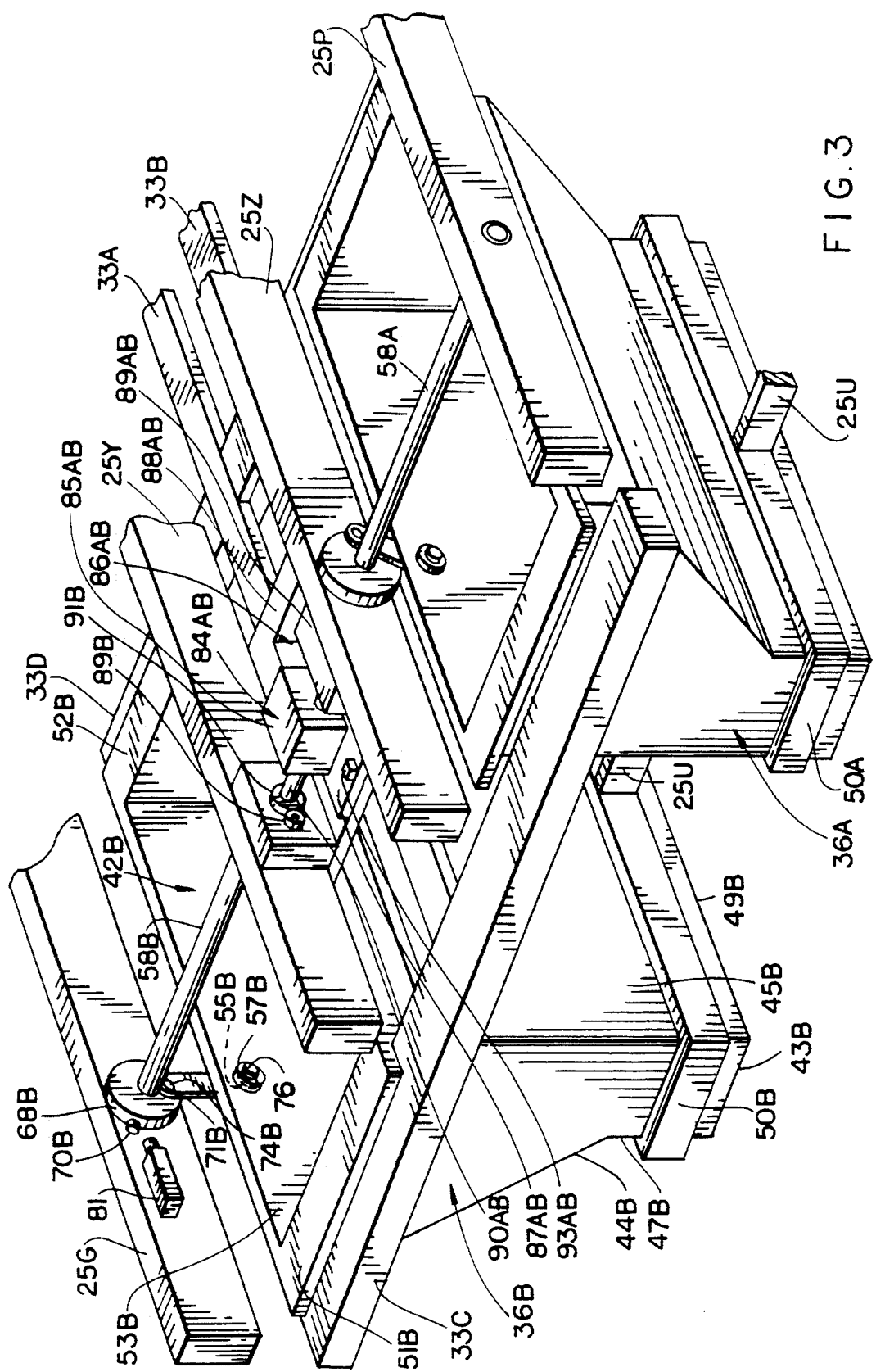
FIG. 3 is an end view of the programmable machinery of the present invention, shown with its side-end housing panel removed to reveal internal components housed therewithin.

As best illustrated in FIG. 5, dispensing-bin weigh frame 33 comprises a two longitudinally extending support members 33A and 33B, and four transversely extending support members 33C, 33D, 33E, and 33F. As shown, these structural members are welded together to form a substantially planar structure of unitary construction. As such, the dispensing-bin weigh frame of the illustrative embodiment has six open cells, or openings, through which dispensing bins 36A to 36F are freely supported when not being weighed. As shown in FIG. 5, the interspacing between adjacent pairs of transverse support members is selected so that the upper portion of each dispensing bin can be positioned therebetween without frictional engagement, as shown in FIG. 3.

As shown in FIG. 4, actuatable dispensing valve 38A is mounted across the dispensing outlet of each dispensing bin and is controlled by control signal C7, generated on the I/O board under the control of by the main computer system. In order to elevate a selected dispensing bin onto the dispensing-bin weigh frame for weighing the microingredient contained therein, each dispensing bin is supported by an independent bin elevation mechanism. The details of each dispensing bin and associated elevation mechanism will be described in great detail below.

As best shown in FIGS. 4 to 7, a dispensing-bin elevation mechanism is used to support each dispensing bin above the weigh hopper, while passing through a pair of transversely extending support members associated with the dispensing-bin weigh frame. In the illustrative embodiment, each dispensing bin 36A to 36F is constructed in a substantially similar manner. Also, the construction and function of each dispensing-bin elevation mechanism 40A to 40F is substantially similar. Thus, for purposes of clarity, the details of these structures will be described with reference to dispensing bin 36B and bin elevation mechanism 40B. Throughout the drawings, characters A, B, C, D, E, F, and G shall be used in conjunction with like reference numbers to indicate with which dispensing bin or dispensing-bin elevation mechanism each subcomponent is associated.

In general, each dispensing bin has two basic functions. The first function is to store a sufficient quantity of microingredient of a particular type in the machine. The second function is to dispense a precisely metered amount of microingredient into the weigh hopper for weight measurement. In order to perform these functions, each dispensing bin 36B has a filling opening 42B, a dispensing outlet 43B, and rigid side wall panels 44B, 45B, 46B, and 47B extending therebetween, as shown in FIG. 3. Preferably, the aperture dimensions of the filling opening of each dispensing bin are substantially larger that the aperture dimensions of the discharge outlet thereof, as this facilitates the filling of each dispensing bin with a specified type of packaged microingredient. As shown in FIG. 3, the side wall panels are joined to form an irregular storage volume. This structural feature facilitates controlled dispensing of metered microingredient from the dispensing bin.

At the end of each dispensing outlet 43B, which in the illustrative embodiment has rectangular cross-sectional dimensions, electrically controllable discharge valve 49B controls the discharge of microingredient from its associated dispensing bin. Dispensing valve 49B is controlled by control signal C8 produced on the I/O board under the control of the main computer system. The dispensing valves for the other dispensing bins are controlled by signals C7 to C12, respectively. About the perimeter of dispensing outlet 43B, there is provided a stationary discharge outlet guide 50B having an aperture with cross-sectional dimensions only slightly larger than the cross-sectional dimensions of the discharge outlet itself. As shown in FIG. 3, dispensing outlet guides 50A and 50B are joined together by horizontal frame support member 25U. As will become apparent hereinafter, the function of this guide is to constrain the movement of its associated dispensing bin along a predetermined vertical axis.

As shown in FIGS. 3 to 6, dispensing bin 36B has a pair of support flanges 51A and 52B which extend about opposite sides of its top opening perimeter 53B. The function of these support flanges is best appreciated by reference to FIG. 3. As shown, when a selected dispensing bin 36B is lowered onto dispensing-bin weigh frame 33 by its elevation mechanism 40B under the control of the main computer system, support flanges 51B and 52b engage the top surface of spaced apart transverse support members 33C and 33D of the dispensing-bin weigh frame. The load presented by the selected dispensing bin upon dispensing-bin weigh frame 33 is sensed by load cells 34A to 34D, to produce analog signals, as described above, which are processed upon the I/O board to produce a digital weight signal representative of the gross weight of the selected dispensing bin and microingredient contained therein. By lowering only one dispensing bin at a time onto the dispensing-bin weigh frame, the main computer system is capable of measuring the gross weight of each of the dispensing bins at any arbitrarily selected inventory recording period. The support flanges on the other five dispensing bins of the machine function in essentially the same manner as that described above.

It will be helpful to describe below the structural subcomponents comprising each dispensing bin elevation mechanism.

As shown in FIG. 3, a pair of coaxially aligned suspension holes 54B and 55B are formed through the upper portion of side wall panels 45B and 47B in each dispensing bin. As shown, a pair of suitable bushings 56B and 57B are mounted through these holes in a conventional manner. Notably, suspension holes 54 B and 55B are located along an imaginary axis that passes through the centers thereof, and which is co-parallel with rotatable support shaft 58B from which dispensing bin 36B is ultimately suspended.

As shown in FIGS. 3 to 7, the top portion of the housing frame includes a pair of support members 25Y and 25Z that are spaced apart from, and extend parallel to frame members 25F and 25G, along the longitudinal extent of the machine housing. As best shown in FIG. 5, the spacing between parallel support members 25G and 25Y and 25F and 25Z is substantially equal to the width dimension of the filling opening of the dispensing bins. Along the left side of the machine, a pair of coaxially aligned holes 60A and 61B are formed through support members 25Y and 25G, and a pair of suitable bushings are mounted through these holes in a conventional manner. For each dispensing bin 36A along the right side of the machine, a pair of coaxially aligned holes 64A and 65A are formed through support members 25Z and 25F, and a pair of suitable bushings are mounted through these holes.

As shown in FIG. 3, support shaft 58B is rotatably mounted along coaxially aligned bushings mounted within support members 25Z and 25F. Closely adjacent to the inside surfaces of support members 25G and 25Y, circular plates 68B and 69B are welded to rotatable shaft 58B. As best shown in FIGS. 3 and 6, each circular plate 68B and 69B has a projection 79B, and a suspension hole 70B formed at a radial distance away from the axis of rotation of the shaft. Notably, the suspension holes formed in each associated pair of circular plates are formed at radial distances of equal measure, and are located on the circular plates so that an imaginary axis passing through these holes is co-parallel with the axis of rotation of the associated support shaft.

As shown in FIG. 3, dispensing bin 36B is suspended from rotatable support shaft 58B by a pair of equal length suspension elements 71B and 72B which extend from the support shaft, to radially displaced holes 55B and 56B formed in bin side panels 47B and 45B, respectively. These suspension elements can be constructed from cable, chain or any other suitable structures capable of bearing the weight of a dispensing bin filled to its capacity with an expected microingredient. One suitable technique for suspending each dispensing bin from its rotatable shaft is by providing eye-type connectors at each end of the suspension elements. Below is a description of how dispensing bin 36B is suspended from its rotatable shaft using such a suspension element.

As shown in FIG. 3, a first cotter pin 74B is passed through suspension hole 70B formed in outer circular plate 68B of the support shaft and the eye-hole of the first end of first suspension element 71B. Then, a second cotter pin 75B is passed through suspension hole 70B formed in inner circular plate 69B and the eye-hole of the first end of second suspension element 72B. Thereafter, dispensing bin 36B is moved into place beneath its support shaft 58B. Then, a third cotter pin 76 is passed through suspension hole 55B formed in outer side wall panel 47B of the dispensing bin and the eye-hole of the second end of first suspension element 71B, as shown. Finally, a fourth cotter pin 77 is passed through suspension hole 70B of the dispensing bin and the eye-hole of the second end of second suspension element 72B. Upon completion of the above connections, dispensing bin 36B is suspended from its rotatable shaft. The above procedure is repeated for each of the other dispensing bins in the machine.

As best shown in FIGS. 3 and 4, stationary guides 50A and 50B are maintained in a fixed relationship with respect to the machine frame by way of horizontal support members 25U. The provision of this dispensing bin guide mechanism substantially fixes the horizontal movement of the dispensing outlet 43B of dispensing bin 36B, while the dispensing bin is permitted to freely move along a fixed vertical axis as its elevation mechanism 40B lowers support flanges 51B and 52B onto the dispensing-bin weigh frame.

As shown in FIG. 4, dispensing bin 36B is provided with an electro-optical proximity sensor 80B in order to detect (1) when its support flanges 51B and 52B physically engage support members 33C and 33D of the dispensing-bin weigh frame, and (2) when these support flanges are elevated a predetermined distance off from support members 33C and 33D of the dispensing-bin weigh frame. In the illustrative embodiment, sensor 80 B is mounted onto a portion of the dispensing-bin support flange. The output signal S26 from this sensor is provided to a preamplifier on the I/O board of the main computer system, for conventional processing in a manner known in the art. Using this sensor signal, the main computer system controls the elevation of its associated dispensing bin in a preprogrammed manner.

The bin suspension arrangement described above provides the system of the present invention with two basic functions. The first function is to enable each dispensing bin (when filled to capacity) to be elevated off the dispensing-bin weigh frame during microingredient dispensing operations. The second function is to enable each selected dispensing bin to be independently lowered onto its designated portion of the dispensing-bin weigh frame, while the remaining (i.e., unselected) dispensing bins are maintained in an elevated position off the dispensing-bin weigh frame. As used hereinafter, the term "elevated position" shall be understood to mean that the dispensing bin is elevated off the dispensing-bin weigh frame. This position is realized by rotating the support shaft of the selected dispensing bin in the counter-clockwise direction to an angular position indicated in FIG. 6.

Figure 7:
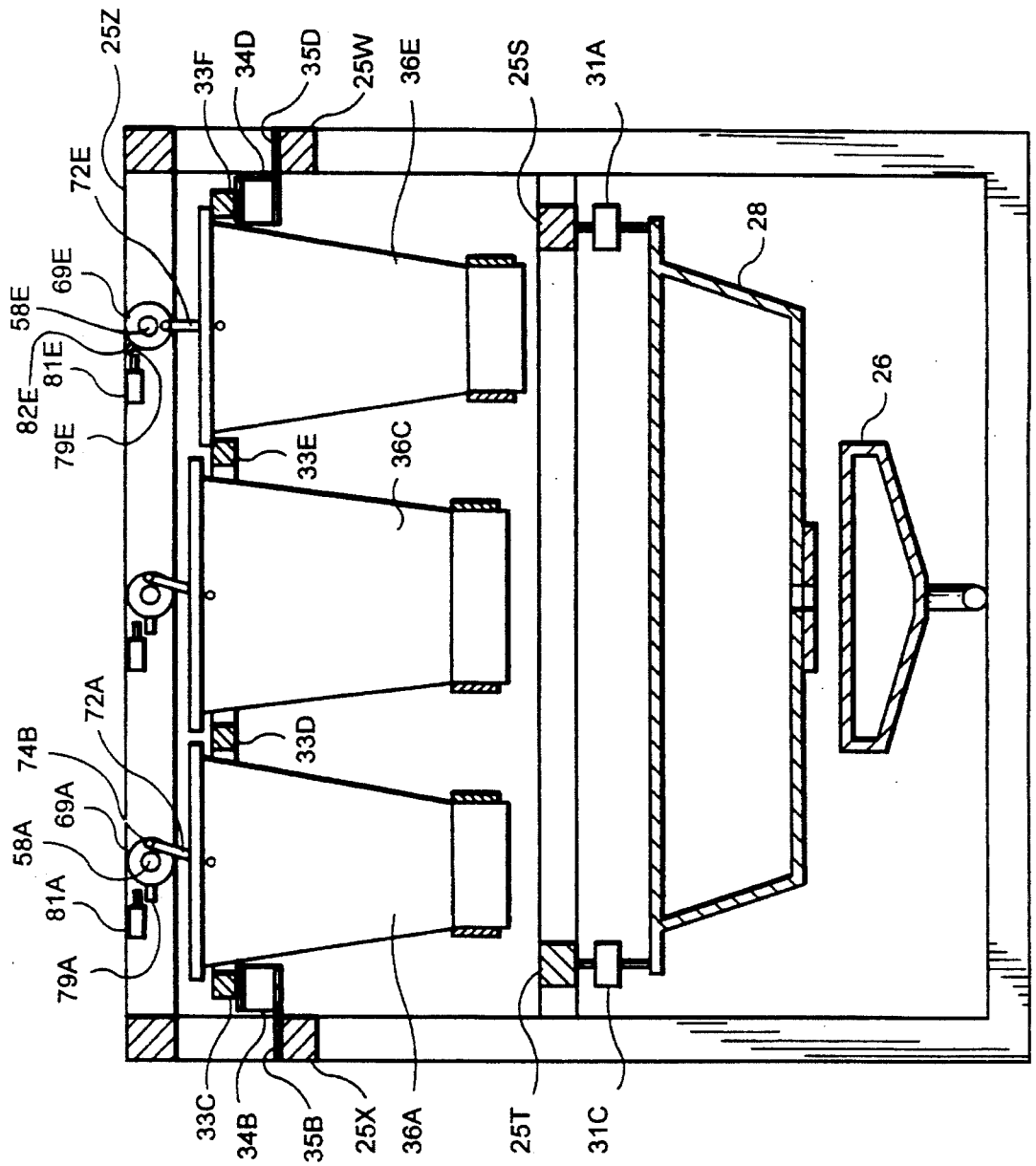
FIG. 7 is a cross-sectional view of the programmable machinery of the present invention, taken along line 7—7 of FIG. 4, showing a selected microingredient dispensing bin lowered onto the dispensing-bin weigh frame for weighing the microingredient remaining therein.

As shown in FIG. 6, each dispensing bin is maintained in its elevated position by anti-rotation solenoid 81 which has a shaft 82 that is adapted to prevent rotation of the support shaft 58. In the elevated bin position shown in FIG. 6, shaft 82A is normally biased to extend outwardly, above projection 79A on cylindrical plate 69A, thereby preventing support shaft 58A from rotating in a clockwise direction. When dispensing bin 36E, for example, is to be lowered onto the weigh frame, the I/O board provides a control signal C17 to anti-rotation solenoid 81E under the control of the main computer system. This causes shaft 82E to retract inwardly, away from projection 79E on cylindrical plate 69A, thereby permitting support shaft 58 E to rotate clock-wise. With bin support shaft free to rotate clockwise, dispensing bin 36E can be lowered onto the dispensing-bin weigh frame, as shown in FIG. 7, which hereinafter shall be referred to as the "weighing position".

In order that the main computer system of the present invention can place a selected dispensing bin onto the dispensing-bin weigh frame, one at a time and in a preprogrammed sequence, each dispensing-bin elevation mechanism is operated by an electronically-controlled motor. In the illustrative embodiment, a single shaft rotating unit is operably connected between the support shafts of axially aligned bin elevation mechanisms disposed on opposite sides of the support members 25Y and 25Z. As shown in FIG. 5, these shaft rotating units are designated by characters 84AB, 84CD, and 84EF to indicate the dispensing bins with which they associated. In addition, the subcomponents of these shaft rotating units are also indexed by AB, CD or DE to indicate the dispensing bins with which they are associated. As each rotating unit is identically constructed, shaft rotating unit 84AB will be below for clarity of exposition.

As best shown in FIGS. 3 and 5, shaft rotating unit 84AB comprises a number of components, namely: an electronically-controlled motor 85 AB controlled by control signal C19 generated by the I/O board under the control of the main computer system; and a motor carriage assembly 86AB for supporting and horizontally translating motor 85AB towards the support shaft 58A on the left side of the motor, or towards support shaft 58B on the right side of the motor. As illustrated, motor carriage assembly 86AB comprises a motor support platform 87AB and a stationary base portion 88AB. The motor support platform is mounted upon the stationary base portion so that it can be incrementally translated (i.e., moved) in a horizontal direction in response to control signals C22 generated on the I/O board under the control of the main computer system. As shown, stationary base portion 88AB is fixedly mounted between support members 25Y and 25Z using conventional mounting techniques. On the inside of support members 25Y and 25ZA, a first gear mechanism 89A is mounted onto the end of support shaft 58A, and a second gear mechanism 89B is mounted onto the end of support shaft 58B.

As shown in FIG. 3, motor 85AB has a double-ended motor shaft 90AB, one end of which is provided with gearing 91A, and the other end of which is provided with gearing 91B. As shown, support shafts 55A and 55B and double-ended motor shaft 90AB are all co-axially aligned. When motor carriage 86AB is driven to its first drive position P1 indicated in FIG. 5, gearing 91B on motor shaft 90AB meshes with the gears of gear mechanism 89B, causing support shaft 58B to rotate in a direction determined by control signal C19 generated on the I/O board under the control of the main computer system. Then, when the motor carriage is driven to its second drive position P2 indicated in FIG. 5, gearing 91A on motor shaft 90AB meshes with the gears of gear mechanism 89A, causing support shaft 58A instead to rotate in a selected direction under the control of the main computer system. When neither of dispensing bins 36A and 36B about motor 85AB are to be selected for weighing, the gearing at the end of the double-ended motor shaft 90AB is automatically moved to an intermediate position P3, under the control of the main computer system.

In the illustrative embodiment, optical encoders 93AB are mounted on motor platform base 88AB in order to measure the position of the motor carriage between support members 25Y and 25Z, and produce position measurement signal S18 representative thereof. From position measurement signal S18, the main computer system determines whether the shaft motor has been translated to either drive position P1 or P2. Using feedback principles well known in the art, position measurement signal S18 can be used to generate motor control signal C18 to move motor 85AB to drive position P1 or P2.

As shown in FIG. 1 there are a number of system subcomponents mounted external to the machine housing of the illustrative embodiment. Specifically, dispensing tanks 7A and 7B are stored upon dispensing scales 6J and 6K, which for convenience reasons are closely located near, but outside of the machine housing. It is understood, however, that these dispensing tanks and their associated dispensing scales may be completely or partially enclosed by making apparent modifications to the machine housing.

As shown in FIG. 1, a pair of electronically controlled pumps 95 and 96 are used to pump liquid microingredients from dispensing tanks 7A and 7B directly into mixing tank 26 in the machine housing. To conduct the flow of liquid microingredients between these tanks, flexible tubing sections 97 and 98 are connected between the interiors of dispensing tanks 7A and 7B and the inlet ports of pumps 95 and 96, while flexible tubing sections(not shown) are connected between the outlet ports of pumps 95 and 96 and the reservoir portion of mixing tank 26, as shown. When a production schedule for a particular microingredient batch ("micro-batch") requires a specific amount of liquid microingredient contained in dispensing tank 7A, the I/O board generates control signal C25 which is provided to the control circuitry associated with dispensing pump 95. In response to these control signals, pump 95 causes liquid microingredient to flow from dispensing tank 7A to the mixing tank. During the pumping process, the main computer system reads an input register on the I/O board, with which dispensing scale 6J is uniquely associated. This allows the main computer system to monitor the decrease in weight of dispensing tank 7A and thus determine when the required amount of liquid microingredient has been dispensed into the mixing tank.

Similarly, when a production schedule also requires a specific amount of liquid microingredient contained in dispensing tank 7B, the I/O board generates control signals C26 which is provided to the control circuitry associated with dispensing pump 95. In response to these control signals, pump 96 causes liquid microingredient to flow from dispensing tank 7B to the mixing tank. During the pumping process, the main computer system reads an input register on the I/O board, with which platform storage scale 6K is uniquely associated. This allows the main computer system to monitor the decrease in weight of dispensing tank 7B and thus determine when the required amount of liquid microingredient has been dispensed into the mixing tank.

As shown in FIG. 1, a pair of liquid level sensors 99 and 100 are installed in dispensing tanks 7A and 7B, respectively, and produce electrical signals S21 and S22 which represent the level of liquid microingredient remaining in their respective dispensing tanks. These electrical signals are provided to associated interface circuitry on the I/O board for signal processing, and subsequent conversion into equivalent weight measurements by the main computer system. Whenever the level of liquid microingredient in either of these dispensing tanks falls below a particular weight level, the main computer system automatically detects this condition by analyzing signals S21 and S22. In response to the detected condition, the main computer system (or an associated device) generates an alarm signal which alerts the feedmill operator to manually fill the near-empty dispensing tanks with liquid microingredient obtained from their color-coded inventory storage scales. Notably, the alarm signal may be realized by the production of audible or visible energy, or a textually demonstrable report calculated to give notice to the feedmill operator or other personnel responsible for maintaining microingredient levels in the dispensing bins and tanks.

Having described the machinery of the present invention, it is appropriate to now describe in great detail the main computer system which automatically controls the operation of the above-described machinery and performs the continuous inventory accounting functions of the present invention.

As illustrated in FIG. 8, the main computer system of the illustrative embodiment comprises a number of integrated system components, namely: one or more central processing units 105 (e.g., microprocessors); program memory storage 106 for storing an operating system program, application programs, the Main System Control Routine, and the continuous inventory accounting subroutines of the present invention; random access data storage memory (e.g., RAM) 107 for storing information files illustrated in FIGS. 9 to 14E; a membrane type keyboard 108 an associated interface circuitry 109 therefor; an visual display device 110, e.g., LCD panel, and associated interface(logic)/driver circuitry 111 therefor; an external printer 112 and associated interface/driver circuitry 113 therefor; an I/O port 114 for interfacing processor with the auxiliary computer system 5; input port 115 for a pointing and selecting device 116, such as a mouse; and I/O board 117 containing logic circuitry, signal drivers, input registers and the like necessary to support the various electrical, electronic, and electro-optical components contained within the machinery of the present invention. As illustrated in FIG. 8, each of the above components is operably associated with processor 105 by way of one or more system buses 118 well known in the art. In the preferred embodiment, the operating system may be realized by Macintosh® System 7.0 operating system software from Apple Computer, Inc., Windows® operating system software from Microsoft Corporation, or Unix® X-Windows, allowing the processor(s) to support a plurality of input/output windows, and input port 115 for pointing and selecting device 116. It is understood, however, that other suitable operating system programs can be used with excellent results.

As shown in FIG. 8, I/O board 117 of the illustrative embodiment comprises a number of I/O structures, namely: interface/driver circuitry 119 for generating control signals C1 and C4 for display valve 27 and mixer motor 37, respectively; interface/driver circuitry 120 for generating control signals C2 for vibrator/motor 30 mounted on the weigh hopper; interface/driver circuitry 121 for generating control signals C5,C6 for slurry pump 27; interface/driver circuitry 122 for generating control signals C25 and C26 for pump motors 95 and 96 associated with dispensing tanks 7A and 7B; pre-amplifiers 123 and interface circuitry 124 for electro-optical position sensors 80A to 80F used to sense the elevation levels of dispensing bins 36A to 36B; pre-amplifiers 125 and interface circuitry 126 for electro-optical position sensors 93AB, 93CD and 93EF used for sensing the horizontal position of motor platforms 87AB, 87CD and 87EF, respectively; interface/driver circuitry 127 for generating control signals C19, C20, and C 21 for controlling support-shaft motors 85AB, 85CD and 85EF; analog and digital signal processing circuitry 128 for processing analog signals S13 to S16 produced from weigh hopper load cells 31A to 31D, respectively, and an input register 129 for buffering digitized weight information produced from circuitry 128; two input registers 130 and associated circuitry for buffering digitized weight signals S23 and 24 produced from dispensing scales 6J and 6K; analog and digital signal processing circuitry 131 for processing analog signals S9 to S12 produced from dispensing-bin weigh frame load cells 34A to 34D; an input register 132 for buffering digitized weight information produced from circuitry 131; interface/driver circuitry 133 for generating independent control signals C7 to C12 for dispensing valves 49A to 49F mounted on the dispensing outlets of dispensing bins 36A to 36F; pre-amplifiers 134 and interface circuitry 135 for processing signals S21 and S 22 produced from liquid level sensors 99 and 100 used to sense the level of liquid microingredient in dispensing tanks 7A and 7B; interface/driver circuitry 136 for generating control signals C13 to C18; six input registers and associated logic circuitry 137 for buffering digitized weight signal S1 to S8 produced from inventory storage scales 6K to 6H, respectively; preamplifiers 138 and interface circuitry 139 for processing signals S25 to S30 from bin elevation sensors 80A to 80 F, respectively; and preamplifiers 140 and interface circuitry 141 for processing signals S18 to S20 produced from electro-optical sensors 93AB, 93CD and 93EF, respectively. In the illustrative embodiment, the I/O board 117 is shown mounted within the machine housing. It is understood, however, that it may be physically located away from the machinery in other embodiments of the present invention.

Having described the apparatus of the present invention, it is appropriate at this juncture to described its use in carrying out the method of the present invention.

Upon installation of the system of the present invention in building associated with a feedmill, each "active" inventory storage scale, dispensing bin, and dispensing tank(scale) is registered with the main computer system. Preferably, this system configuration process is achieved using the System Configuration Procedure illustrated in the flow chart of FIG. 15. As indicated at Block A thereof, the first step of the system configuration method involves assigning a unique identifying code to each storage scale, dispensing bin (scale), and dispensing tank scale in the system. In the illustrative embodiment, each unique identifying code is realized by a unique bar code symbol sticker 141. These bar code symbol stickers are permanently affixed to the storage scales, dispensing bins, and dispensing tank (scales) in the configured system, as shown in FIG. 1.

Figure 15:
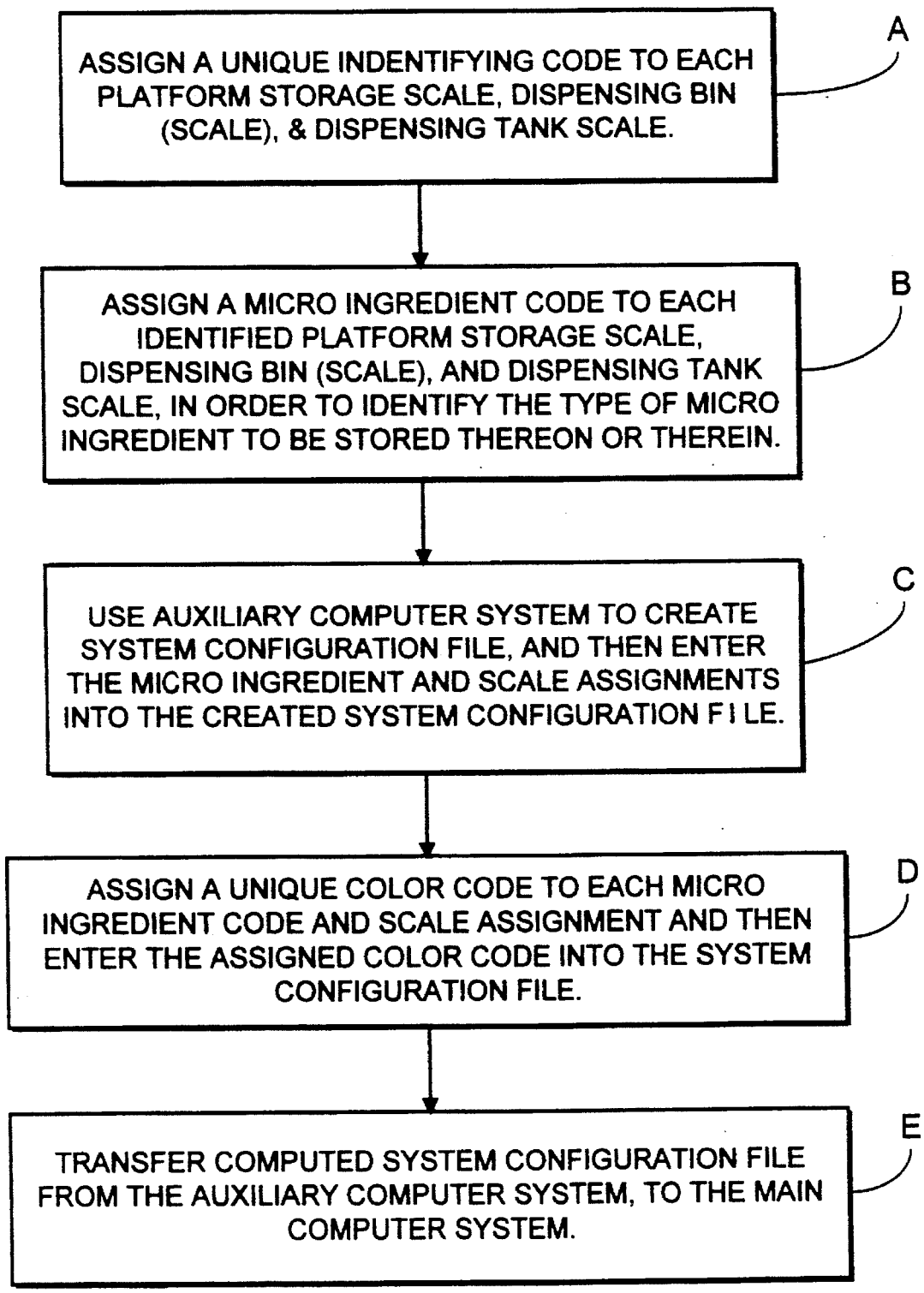
FIG. 15 is a flow chart illustrating the steps performed during the configuration of the system of the present invention.

As indicated at Block B in FIG. 15, each inventory storage scale, dispensing bin, and dispensing tank scale in the system is assigned a microingredient code representative of the type of microingredient to be stored and/or weighed thereby. Typically, each microingredient code is expressed in an alphabetical or numerical format. The number of microingredient codes will correspond to the number of microingredients (i.e., Q) needed to produce the various types of medicated feeds prescribed by the feedlot veterinarian or nutritionist. During this step of the system configuration process, more than one dispensing bin may be assigned a particular microingredient code in order to provide a sufficient reserve of a particular microingredient that is used in relatively large quantities. Also, at times there will be a need to assign more than one storage scale to a particular microingredient code in order to store a sufficient inventory of a particular microingredient frequently used in relatively large quantities. However, for each microingredient code called for in the feed ration regimen, there will be at least one preassigned platform storage scale for storing an inventory of the corresponding microingredient, and at least one preassigned dispensing bin or tank (scale) for dispensing a corresponding microingredient from the programmed machine.

As indicated at Block C in FIG. 15, the next step of the System Configuration Procedure is to use the auxiliary computer system 5 in order to create a System Configuration File, as shown in FIG. 9, and then to enter the microingredient code and scale assignments into the created System Configuration File. In the illustrative embodiment, the System Configuration File is created by executing a graphics-based program, called Create System Configuration File. The microingredient and scale assignments are entered into this file using auxiliary computer 5, bar code symbol reader 9 and a printed bar code menu 150. Preferably, the printed bar code menu 150 consists of one or more sheets of paper or flexible plastic bearing a unique bar code symbol for each storage scale, dispensing bin, and dispensing tank (scale) in the system. In addition, the printed bar code menu bears a unique bar code symbol for each microingredient (code) schedulable in the Feed Ration Ingredient File (not shown) of the feedlot. Using this printed bar code menu, the microingredient code and scale assignments can be entered into the created System Configuration File by simply reading the bar code symbols corresponding to the "microingredient code and scale assignments", while running the graphics-based program supporting this automated data-entry process.

As indicated at Block D in FIG. 15, each microingredient code and scale assignment is assigned a unique color code (e.g., blue, red, green, orange, purple, yellow, etc.). Preferably, each assigned color code is then entered into the System configuration File by reading preprinted bar code symbols on the bar code menu which represent corresponding color codes. This color-coding scheme minimizes the risk of (re)filling the dispensing bins and dispensing tanks with incorrect types of microingredients.

When the System Configuration File is completed, it is transmitted from the auxiliary computer to the main computer system for storage, as indicated at Block E in FIG. 15. Whenever there is a change of status of any of the registered inventory storage scales, dispensing bins, or dispensing tanks and associated scales (e.g., particular storage and/or dispensing scales are removed or added), the feedmill operator simply reperforms the above steps in order to create an updated System Configuration File, and then transmits this updated file to the main computer system for use in inventory accounting operations.

After the system of the present invention is installed and configured as described above, shipments of microingredients are delivered to the feedlot by various suppliers. Often, shipments of microingredient packages are delivered to a designated inventory storage area set up inside the feedmill. Typically, all units of microingredients in the received shipment have one or more bar code symbols 10 affixed to its packaging, typically at its place of manufacture. These bar code symbols encode several types of information which are utilized by the inventory accounting process of the present invention. In the preferred embodiment, a novel method is used to receive microingredient shipments into the inventory of the system. This method will now be described with reference to the flow chart in FIGS. 16A and 16B.

Figure 16A:
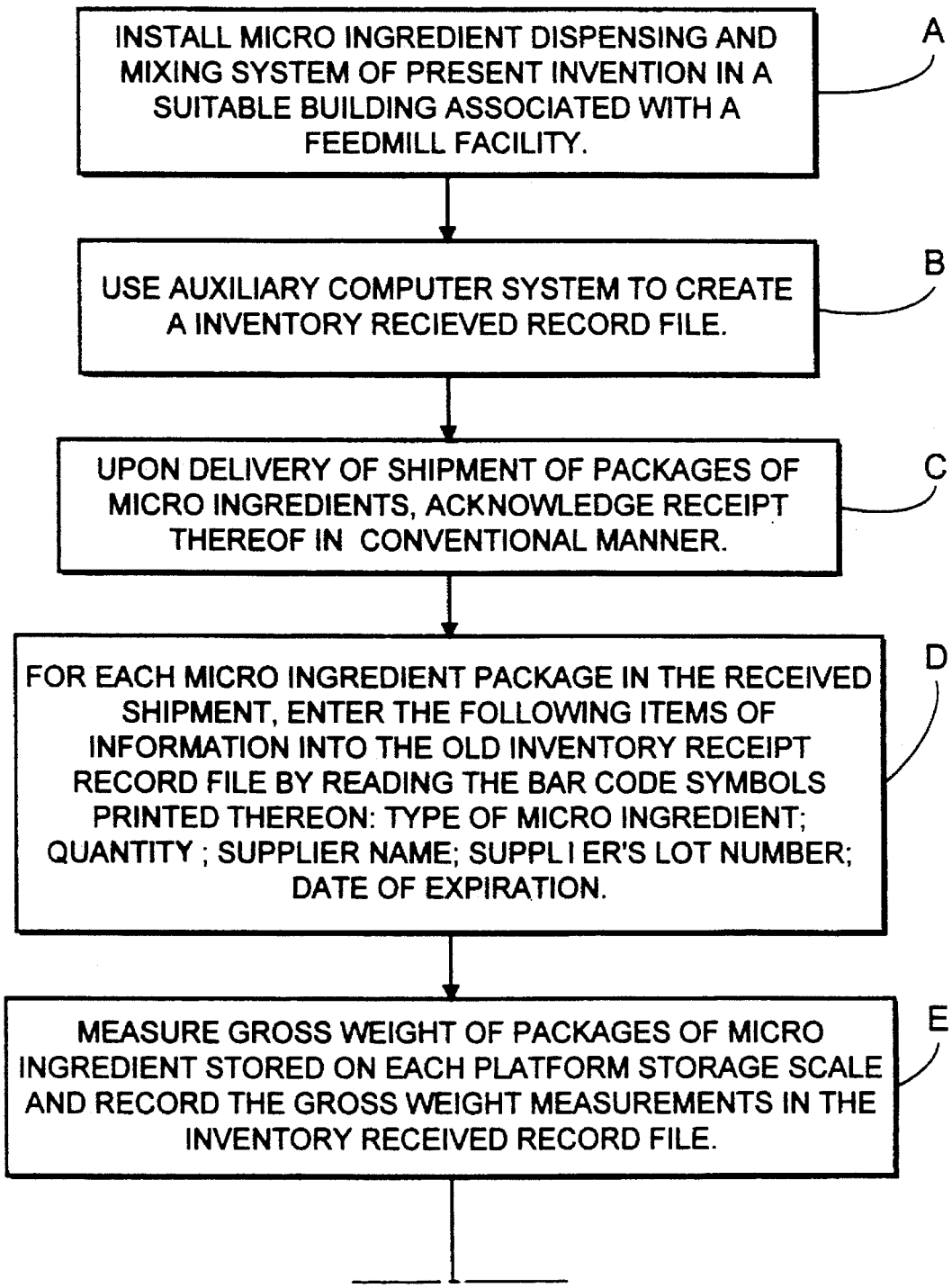
FIGS. 16A and 16B, taken together, set forth a flow chart illustrating the steps performed during the method of receiving a shipment of microingredient packages into the inventory of the system of the present invention.

As indicated at Block A of FIG. 16A, prior to receiving a shipment of packaged microingredients in either a bag or container, the microingredient dispensing and mixing system of the present invention is first installed in a suitable building associated with a feedmill facility, as schematically illustrated in copending U.S. application Ser. No. 07/973,450, supra.

As indicated at Block B in FIG. 16A, the auxiliary computer system is then used to execute a graphics-based program, called "Create Inventory Received Record File", in order to generate an Inventory Received Record File schematically illustrated in FIG. 10.

At Block C in FIG. 16A, when the shipment of microingredient packages are delivered to the feedmill, the feedmill operator or other assigned personnel acknowledges physical receipt of the shipment and attends to shipping documentation in a conventional manner.

As indicated at Block D in FIG. 16A, information identifying particular characteristics of each received microingredient package is then entered into the Inventory Received Record File. In the preferred embodiment of the present invention, this information entry process is carried out by reading the bar code symbols 10 printed on each delivered microingredient package by its manufacturer and/or supplier. Typically, two or more bar code symbols are printed on each such package. These bar code symbols are encoded to carry several types of information, namely: the identity or type of product (microingredient) contained in the package; the package size (i.e., net weight of microingredient contained therein); the quantity, e.g., 1 Stock Keeping Unit (SKU) or bag; the name of the supplier of the microingredient package; the lot number of the supplier; and the expiration date of the microingredient. The tare weight of each microingredient package can be read into this file by reading an encoded bar code symbol preprinted on printed bar code menu 150 or other bar code menu provided by the supplier.

In a conventional manner, the bar code symbol reading process of Block D is accomplished using bar code symbol reading device 9 to produce and repeatedly sweep a visible laser beam across each bar code symbol printed on each delivered microingredient package. The reflected light from the scanned bar code symbol is detected by the bar code reader and converted into an electrical signal. The electrical signal is subsequently decode processed in order to produce symbol character data representative of the identity of the delivered microingredient package, and other information items encoded by the bar code symbols. The produced symbol character data is transmitted to the auxiliary computer system and used to enter the above-identified information items into the Inventory Received Record File. After the above-described information items have been entered into the Inventory Received Record File and all packages in the received shipment "logged-in" with the main computer system, this information file is then transferred from the auxiliary computer to the main computer system using a conventional data communication technique known in the art.

At Block E in FIG. 16A, the main computer system executes the Storage Scale Weigh Routine of FIG. 19 in order to measure the gross weight of each type of microingredient package stored on its preassigned storage scale. The gross weight of these stored microingredient packages is then recorded in the Inventory Received Record File.

Figure 16B:
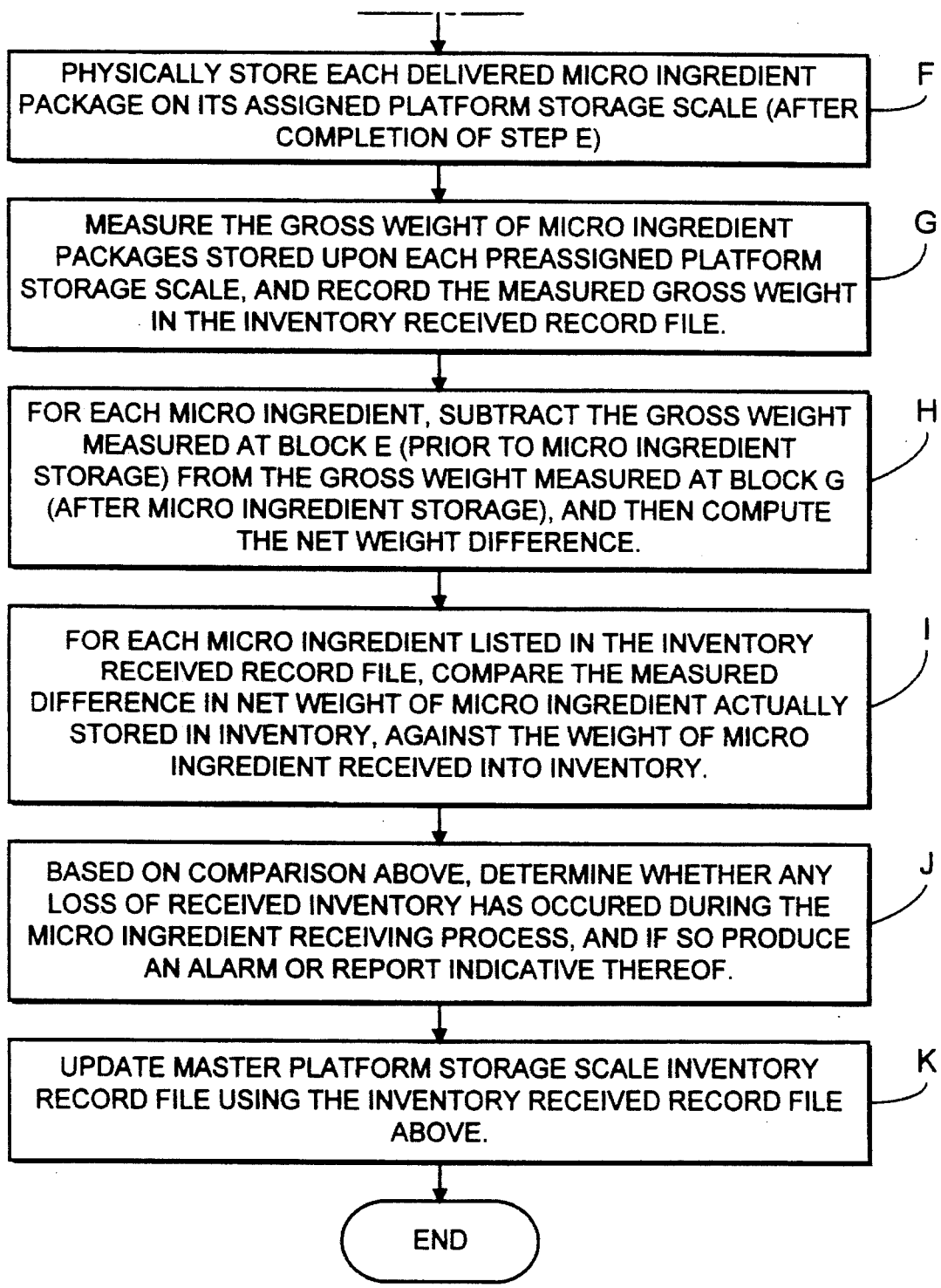

As indicated at Block F in FIG. 16B, each delivered microingredient package is then physically stored on its preassigned storage scale. Then at Block G, when the microingredient shipment has been physically stored upon the storage scales, the main computer system executes the Storage Scale Weigh Routine once again in order to measure the gross weight of the microingredient packages stored thereon. The gross weight of the packaged microingredient is again recorded by the main computer system executing the Storage Scale Weigh Routine of FIG. 19. Then at Block H, the gross weight measured at Block E for each microingredient is subtracted from the gross weight measured at Block G for that microingredient, and the difference therebetween is recorded as the gross weight of microingredient actually received into inventory. Using the tare weight of microingredient packages stored on the inventory storage scale, the difference in net weight of microingredient on the storage scales is computed. The computed net weight difference in microingredient is recorded in the main computer system.

At Block I in FIG. 16B, for each microingredient listed in the Inventory Received Record File, the main computer system compares (i) the measured difference in net weight of microingredient actually stored in inventory against (ii) the net weight of microingredient received for storage in inventory. Notably, the net weight of microingredient received for storage is computed from the net and tare weight information recorded in the Inventory Received Record File. Based upon this comparison, the main computer system determines, at Block J, whether any loss or gain in received inventory occurred during the microingredient receiving process, and if so, produces an alarm signal or report indicative thereof. Such losses may have occurred as a result of leakage of microingredient from a damaged package, physical storage upon an incorrect storage scale, or theft occasioned during the inventory receipt process.

After each shipment of microingredient has been logged into inventory and each received package has been physically stored upon its preassigned storage scale, the produced Inventory Received Record File is stored in a database maintained in the main computer system. Then as indicated at Block K in FIG. 16B, the Inventory Received Record File produced above is used to either start or update the Master Storage Scale Inventory Record File of FIG. 11, as the case may be. As shown in FIG. 11, the supplier's lot number, the product identity code, and the weight of each microingredient package received into inventory is entered into the its respective information field in this File. At any instant in time, the main computer system can refer to the Master Storage Scale Inventory Record File and determine the identity and number of the microingredient packages physically stored on any of the inventory storage scales in the configured system.

Prior to operating the system of the present invention, it is necessary to first collect information regarding the tare weight of the various storage vessels (e.g., bags, containers, dispensing bins, dispensing tanks, and weigh hopper) used in connection with the weighing mechanisms of system of the present invention. In order to obtain and utilize only net weight measures for microingredients in the system, gross weight measures thereof are adjusted by the tare weight measure of the vessel involved during the measurement. Accordingly, the main computer system is provided access to a file called Gross Weight-Correction Values File (not shown). Preferably, this file is created by the auxiliary computer system during a calibration procedure conducted from time to time as required, to ensure weight measurement accuracy, and is then transmitted to the main computer system for use during the continuous accounting process of the present invention.

After a shipment of microingredient is received into inventory as described above, it is necessary to (re)fill each scheduled dispensing bin and tank in the system. In accordance with the present invention, the flow chart of FIG. 17 sets forth the steps of a novel method of filling (and refilling) the scheduled dispensing bins and tanks with microingredient obtained from the inventory storage scales. The details of this method will be described below.

Figure 17:
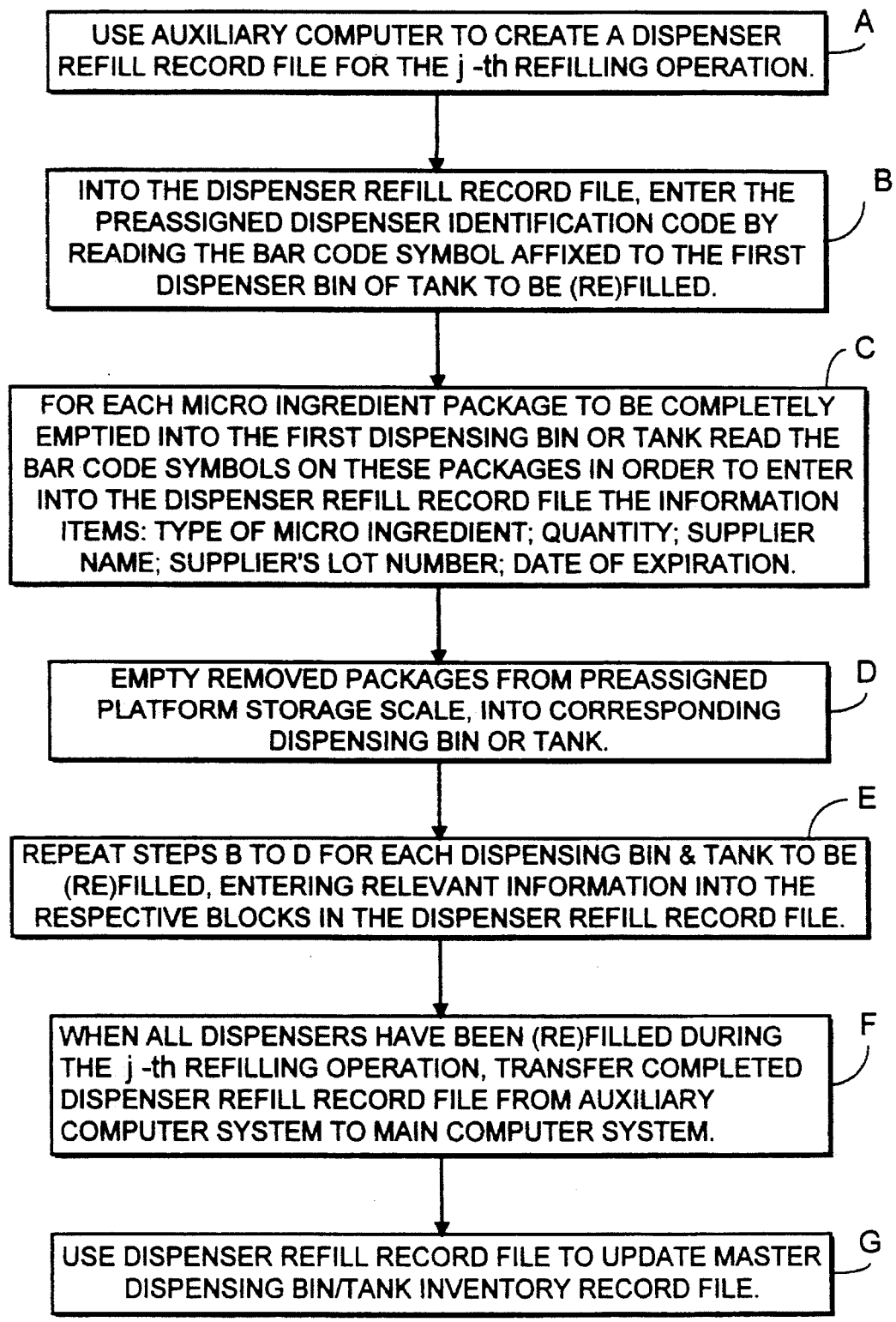
FIG. 17 is a flow chart illustrating the steps performed during the method of (re)filling the dispenser bins and tanks in the system of the present invention.

As indicated at Block A in FIG. 17, the first step in the dispensing bin/tank filling method involves using an interactive graphics-based program, called "Create Dispensing Bin/Tank Refill Record File", to generate a Dispensing Bin/Tank Refill Record File in the auxiliary computer. Preferably, the auxiliary computer is programmed to generate such a file by simply reading a predesignated bar code symbol preprinted upon bar code menu 150. As shown in FIG. 12, each Dispensing Bin/Tank Refill Record File maintained for the k-th dispenser refill index, comprises a number of information fields, organized by preassigned microingredient code, namely: the ingredient code q; the dispensing bin/tank number; the supplier-lot number k; the identification of the supplier of microingredient having supplier-lot number k; the net weight of microingredient from supplier-lot number k; the supplier-lot number k+1; the identification of the supplier of microingredient having supplier-lot number k+1; the net weight of microingredient from supplier-lot number k+1; etc.. As shown in FIG. 13, the originally generated Dispensing Bin/Tank Refill Record File has a sufficient number of blocks for recording information related to each dispensing bin and tank in the system.

As indicated at Block B in FIG. 17 the auxiliary computer 5 and portable bar code symbol reader 9 are used to record the above-described product related information in the Dispensing Bin/Tank Refill Record File created for the k-th dispenser filling operation. This is achieved by first reading the bar code symbol identifier 145 affixed to the dispensing bin (or tank) to be filled with its preassigned microingredient. Upon successfully reading this bar code symbol, the corresponding dispensing bin (or tank) code appears in the Dispensing Bin/Tank Refill Record File, along with the microingredient code and color code preassigned to the selected dispensing bin or dispensing tank scale.

As indicated at Block C in FIG. 17, the feedmill operator then reads the bar code symbols on each package of microingredient taken off its preassigned storage scale and to be emptied into the selected dispensing bin. This operation automatically enters the bar-encoded package related information into the Dispensing Bin/Tank Refill Record File. Then at Block D, the removed packages are emptied into their preassigned dispensing bins. When all of the microingredient packages have been emptied into the dispensing bin, an predesignated bar code symbol is read from the bar code menu 150 using the bar code symbol reader.

As indicated at Block E, steps B to D are repeated for each dispensing bin or tank that requires filling or refilling, as the case may be. When all dispensing bins and tanks have been filled in the manner described above, the completed Dispensing Bin/Tank Refill Record File is then transferred to the main computer system in order to update (i) the Master Storage Scale Inventory Record File shown in FIG. 11, and (ii) the Master Dispensing Bin/Tank Inventory Record File shown in FIG. 13. Notably, whenever a microingredient package has been removed from its preassigned storage scale, logged into Dispensing Bin/Tank Refilling Record File, and then emptied into its preassigned dispensing bin, information relating to the microingredient package will disappear from the Master Storage Scale Inventory Record File, and reappear in the Master Dispensing Bin/Tank Inventory Record File during the file updating operation.

Typically, the filled microingredient dispensing and mixing machine of the present invention will be instructed to prepare a specified batch of microingredient slurry a number of times each day. These instructions or commands issue from either the feedmill computer, which is interfaced with the main computer system, or from the feedmill operator by way of keyboard entry operations on the main computer system. In either case, the main computer system utilizes a Microingredient Batch Production File that corresponding to the received production command. This file is structured in a conventional manner and enables the main computer system to determine the scheduled types and relative quantities of microingredients that are to dispensed and mixed during the manufacture of a specified batch of microingredient.

In FIG. 14, the Master Inventory Record File is schematically represented. As shown, this file is built upon an information structure that is dynamically extended for each new "inventory recording period". In accordance with the principles of the present invention, each new inventory recording period is identified by an "inventory record index", designated by integer variable i. As will become apparent hereinafter, the inventory record index i is incremented by +1 upon the occurrence of any one of the following events, namely: receiving a shipment of microingredients into inventory; removing packages of microingredients from inventory and using them to fill dispensing bins and/or tanks of the machine; dispensing and mixing microingredients together during the manufacturing of a batch of microingredient slurry; or requesting the production of an Inventory Report to determine the state of microingredient inventory in the system.

As shown in FIG. 14, during each new inventory recording period i, the Master Inventory Record File is extended by one Inventory Record Block for each scheduled microingredient. If a request for an Inventory Received Discrepancy Report (e.g., made in response to the receipt of a new shipment of microingredients induces the extension of the Master Inventory Record File, then one Inventory Received Discrepancy Block is also added to each i-th Inventory Record Block in the extended Master Inventory Record File. If a request for a Dispensing Bin/Tank Refill Discrepancy Report (e.g., produced in response to the refilling of one or more dispensing bins and/or tanks) induces the extension of the Master Inventory Record File, then one Dispensing Bin/Tank Refill Discrepancy Block is also added to each i-th Inventory Record Block in the extended Master Inventory Record File. If a request for a Microingredient-Usage Discrepancy Report (e.g., produced in response to the production of a batch of microingredient slurry) induces the extension of the Master Inventory Record File was the, then one Microingredient-Usage Discrepancy Block is also added to each i-th Inventory Record Block in the extended Master Inventory Record File. If a request for an Inventory Report induced the extension of the Master Inventory Record File, then one Inventory Report Block is also added to each i-th Inventory Record Block in the extended Master Inventory Record File.

In general, between any two consecutive inventory recording periods, e.g., (i–1, i) or (i, i+1), one of at least three events can occur to disturb the state of inventory, namely: (1) receiving a shipment of microingredients for entry into inventory; (2) removal of microingredients from inventory to fill the dispensing bins and tanks of the machine; or (3) dispensing microingredients for use during the production of a batch of microingredient slurry. Each of these inventory recording events have been described in great detail above and require no further discussion.

In FIG. 14A, the information fields in each Inventory Record Block (IRB) are shown for an arbitrarily selected inventory recording period, i. Notably, the Inventory Record Block of the exemplary embodiment considers the case where primary and secondary dispensing bins and tanks are used for dispensing each scheduled microingredient identified by its preassigned microingredient code q. Also, primary and secondary inventory storage scales are used to store each of the scheduled microingredients. As shown, each Inventory Record Block comprises for each scheduled microingredient, specified information fields for storing the following items of information: the microingredient code q; the tare weight of primary dispensing bin; the gross weight of primary dispensing bin recorded at the i-th inventory recording period; the net weight of primary dispensing bin recorded at the i-th inventory recording period; tare weight of secondary dispensing bin; gross weight of secondary dispensing bin recorded at the i-th inventory recording period; net weight of secondary dispensing bin recorded at the i-th inventory recording period; the tare weight of packages on primary storage scale at the i-th inventory recording period, computed using the Master Storage Scale Inventory Record File; the gross weight of microingredient packages on the primary storage scale recorded at the i-th inventory recording period; the net weight of microingredient packages on the primary storage scale recorded at the i-th inventory recording period; tare weight of packages on secondary storage scale at the i-th inventory recording period, computed using the Master Storage Scale Inventory Record File; the gross weight of microingredient packages on the secondary storage scale at the i-th inventory recording period; and the net weight of microingredient packages on the secondary storage scale recorded at the i-th inventory recording period. As shown in FIG. 14A, each of the above information fields are provided for each microingredient q, ranging from q=0 to Q.

As shown in FIG. 14, after each j-th microingredient shipment received at the feedlot, an Inventory Received Discrepancy Block (IRDB) is created at the i-th inventory recording period for each scheduled microingredient. As shown in FIG. 14B, each i-th Inventory Received Discrepancy Block for microingredient q comprises information fields for storing the following information items, namely: the microingredient code q; the preassigned storage scale number; the net weight of microingredient q on the storage scale, recorded in the (i–1)th Inventory Record Block; the net weight of microingredient q on the storage scale, recorded in the i-th Inventory Record Block; the difference in net weight of microingredient q on the storage scale, measured at inventory recording periods i–1 and i; the net weight of microingredient q in the received shipment of packages, computed using the j-the Inventory Received Record File; and the discrepancy in net weight of microingredient q between the above-defined measures.

As shown in FIG. 14, after each k-th dispensing bin or tank (re)filling operation, a Dispensing Bin/Tank Refill Discrepancy Block (DRDB) is created at the i-th inventory recording period for each scheduled microingredient q. As shown in FIG. 14C, the i-th Dispensing Bin/Tank Refill Discrepancy Block for each microingredient q comprises information fields for storing the following information items, namely: microingredient code q; the dispensing bin or tank number; the storage scale preassigned to microingredient q; the gross weight of packaged microingredient q on storage scale recorded in (i–11)th Inventory Record Block; the gross weight of packaged microingredient q on storage scale recorded in the i-th Inventory Record Block; the difference in gross weight of packaged microingredient q on the storage scales, recorded in the (i–1)th and i-th Inventory Record Blocks; the tare weight of microingredient package removed from the storage scale (computed using the Dispensing Bin/Tank Refill Record File); the difference in net weight of microingredient q on the storage scales between the (i–1)th and i-th inventory recording periods; the gross weight of microingredient q in the dispensing bin recorded in (i–1)th Inventory Record Block; gross weight of microingredient q in the dispensing bin(s) recorded in the i-th Inventory Record Block; the difference in gross weight of microingredient q in the dispensing bin(s), recorded in (i–1)th and i-th Inventory Record Blocks; the tare weight of the dispensing bin(s); the difference in net weight of microingredient q in the dispensing bin(s); and the discrepancy in the net weight difference of microingredient q on the inventory storage scale and the net weight difference of microingredient q in the dispensing bin.

As shown in FIG. 14, after each l-th micro-batch production run, a Microingredient Usage Discrepancy Block (IUDB) is created at the i-th inventory recording period for each scheduled microingredient q. As shown in FIG. 14D, the i-th Microingredient Usage Discrepancy Block for each scheduled microingredient comprises information fields for storing the following information items, namely: the microingredient code q; the total net weight of microingredient q in dispensing bins, recorded in the (i–1)th Inventory Recording Block; the total net weight of microingredient q on storage scale, recorded in (i–1)th Inventory Recording Block; the total net weight of microingredient q in dispensing bins, recorded in i-th Inventory Recording Block; the total net weight of microingredient on platform storage scale, recorded in the i-th Inventory Recording Block; total net weight of macro feed ration produced during the l-th batch production run (i.e., during the inventory recording interval (i–1,i); the computed theoretical usage of microingredient q usable during the l-the batch production run (computed using the total net weight of the macro feed ration); and the net weight discrepancy in microingredient usage, computed for l-the batch production run.

As shown in FIG. 14E, after each arbitrarily requested Inventory Report, an Inventory Discrepancy Record Block (IDRB) is created for each scheduled microingredient q at the i-th inventory recording period. As shown in FIG. 14E, the i-th Inventory Discrepancy Block for each scheduled microingredient comprises information fields for storing the following information items, namely: the microingredient code q; the total net weight of microingredient q in dispensing bins or tanks, recorded in the arbitrary (i-r)th Inventory Record Block; the total net weight of microingredient q on the inventory storage scales, recorded in the (i-r)th Inventory Record Block; the total net weight of microingredient in dispensing bins or tanks, recorded in the i-th Inventory Record Block; the total net weight of microingredient q on the inventory storage scales, recorded in the i-th Inventory Record Block; the total net weight of macrofeed ration obtained from Dispensing/Mixing/Flushing Routine; the sum of computed theoretical usage of production runs during arbitrary inventory recording interal (i-r, i); the total net weight of microingredient q received during arbitrary inventory recording interval (i-r,i); and the inventory discrepancy computed for the arbitrary inventory recording interval (i-r, i).

Having described the information structures produced by system of the present invention, it is appropriate at this juncture to now describe the processes that use these information structures during the various modes of system operation.

In FIGS. $18_1$ to 18C, the Main System Control Routine is schematically represented using a high-level flow chart. This routine is executed by the processor of the main computer system whenever the system has been initialized by, for example, supplying power to the system. As will be described below, the Main System Control Routine embodies a significant level of intelligence which enables the system of the present invention to successfully account for the maintained inventory of microingredients on a continual basis. As will become apparent, the manner in which the Main System Control Routine achieves this "continuous inventory accounting" function is by automatically responding to each and every "inventory recording event" by inducing the system into a particular mode of programmed operation. While specifics of each particular mode of operation differ, each such mode of operation involves: (1) extending the Inventory Record File of FIG. 14; (2) measuring the weight of the different types of microingredients stored in the system; (3) recording such weight measurements; and (4) producing various types of discrepancy measures which indicate the particular type and amount of microingredient used, misused, and/or "lost" during the inventory recording event that induced the particular mode of operation.

For simplicity of exposition, the Main System Control Routine will be described in accordance with the order in which the above-described "inventory recording events" typically occur upon installating the system of the present invention. Notably, the following description is predicated on the following assumptions: the system has been configured (i.e., bins, tanks and storage scales have been identified and scheduled); the System Configuration File is stored in the main computer system; all scales have been properly calibrated; and the tare weights of all dispensing bins, tanks, and various types of microingredient packages are recorded with the main computer system.

As shown in FIG. $18_1$, after the system has been powered-up and all programming variables initialized, the processor in the main computer system proceeds to Block A and determines whether or not a request has been made to produce an Inventory Report. Upon completing the installation of the system of the present invention, there typically will be no microingredient present in any of the dispensing bins or tanks, nor any microingredient packages stored upon the platform storage scales. In order produce a batch of microingredient slurry, the scheduled dispensing bins and tanks must be sufficiently filled with their preassigned microingredients, which must be taken from color-coded inventory storage scales. However, for there to be microingredient packages stored upon the storage scales, there must first be a shipment of microingredient packages delivered to the animal feeding facility. Thus, at Block B of FIG. $18_1$, the processor will typically determine (immediately after system initializes) that, at the time, there is no request for the production of a microingredient slurry batch, and proceeds directly to Block C in FIG. $18A_1$.

At Block C in FIG. $18A_1$, the processor determines whether an Inventory Received Discrepancy Report Request has been made by the auxiliary computer. After completion of system installation, this request typically will be the first inventory recording event to occur. Notably, there are a number of ways this request can be made. For example, this request can be made by physically interfacing the auxiliary computer system with the main computer system, and then issuing the request to the main computer system through the auxiliary computer. Alternatively, this request can be made by making the request with the auxiliary computer, and upon interfacing the auxiliary computer with the main computer system, automatically passing the request on to the auxiliary computer.

In accordance with the present invention, after a shipment of microingredients is delivered to the feedlot, the auxiliary computer 5 and bar code symbol reader 9 are used to log microingredient packages into the inventory of the system using the inventory receiving method illustrated in FIGS. 16A to 16B. As described above, this method is interactive in nature, in that it requires both the main and auxiliary computer systems and a degree of involvement on behalf of the feedmill operator, or other delegated personnel, carrying out the inventory receiving method. The interactive nature Of this process is reflected in the portion of the control flow chart set forth in FIGS. $18A_1$ and $18A_2$.

During or after logging received microingredient packages into an Inventory Received Record File, the auxiliary computer is interfaced with the main computer system to establish a data communication link therebetween. Then, as described above, an Inventory Received Discrepancy Report Request is sent to the main computer system, preferably by way of the auxiliary computer. At Block D in FIG. $18A_1$, the processor in the main computer system determines whether the various scales in the system have been calibrated. This is achieved by analyzing calibration flags set for each calibrated scale in system memory during a Scale Calibration Routine carried out using the auxiliary computer. If the scales are not all calibrated, the processor sets the required calibration flag(s) at Block E, and automatically generates an alarm to alert the feedmill operator that one or more machine scales require calibration. After setting the necessary calibration flags, the processor returns to Block U in FIG. $18B_1$.

In the event that all calibration flags are set at Block D in FIG. $18A_1$ the processor proceeds to Block F and determines whether all of the microingredient packages in the received shipment have been recorded in the Inventory Received Record File in the auxiliary computer. If the auxiliary computer has not been informed by the feedmill operator that all received packages have been recorded in the Inventory Received Record File, then at Block G the processor prompts the feedmill operator (e.g., by displaying a visual message on the auxiliary computer) to log in all received microingredient packages. When all packages are logged into the Inventory Received Record File, then at Block H the processor determines whether any of the received packages have been physically stored on the inventory storage scales. If so, then at Block I in FIG. $18A_1$ the processor prompts the feedmill operator (e.g., by displaying a visual message on the auxiliary computer) to remove any newly received packages off the inventory storage scales. When the main computer system is advised that all such packages are not stored on the inventory storage scales, then at Block J the processor prompts auxiliary computer (e.g., by sending a command data packet) to transmit the completed Inventory Received Record File. Then at Block K FIG. $18A_1$, when the Inventory Received Record File is received by the main computer system, the processor proceeds to Block L in the main system control process.

At Block L in FIG. $18A_2$, the processor increments the inventory record index i by +1 and the inventory received index j by +1. Also at this control block, the processor extends the Master Inventory Record File of FIG. 14 by adding one Inventory Record Block and one Inventory Received Discrepancy Block for each scheduled microingredient q. Then at Block M, the processor prompts the feedmill operator to physically store each received package of microingredient upon its preassigned inventory storage scale. When, at Block N, the main computer system is informed that each package of microingredient in the received shipment has been physically stored on its preassigned storage scale (e.g., by sending a command via the auxiliary computer), then the processor proceeds to Block O in FIG. $18A_2$ and executes the Storage Scale Weigh Routine, shown in FIG. 19.

As illustrated in FIG. 19, the Storage Scale Weigh Routine comprises a number of steps carried out in sequence under the control of the main computer system. As indicated at Block A in FIG. 19, the processor first defines the storage scale index p as ranging from 1 to P, where P is the total number of storage scales scheduled in the System Configuration File. Then the processor initializes variable p by setting it to 1 (i.e., p=1). At Block B, the processor reads the input register on the I/O board, which is uniquely associated with the storage scale that corresponds to p=1, and then records this measurement in the i-th Inventory Record Block for the microingredient preassigned to this storage scale. At Block C the processor determines whether p=P, which indicates that the gross weight of packages upon the last storage scale in the System Configuration File has been measured and recorded. If p does not equal P, then the processor increments variable x by +1 and returns to Block B, as shown in FIG. 19. The operations set forth in Block B are reperformed for each of the remaining storage scales. When these operations are completed, the condition p=P is satisfied, the processor exits the Routine, and returns to the main control process, at Block P in FIG. 18A.

At Block P in FIG. $18A_2$, the processor records in the i-th Inventory Record Block, all of the gross weight measurements taken during the execution of the Storage Scale Weigh Routine at Block O. At Block Q, the processor execute the Inventory Received Discrepancy Computation Routine of FIG. 20, the details of which will be described below.

During the execution of the Inventory Received Discrepancy Computation Routine, the processor uses the i-th set of Inventory Received Discrepancy Blocks shown in FIG. 14. At Block A in FIG. 20, the processor first defines the microingredient code index q as ranging from 1 to Q, where Q is the total number of scheduled microingredients in the system. This index is initialized by setting it equal to 1 (i.e., q=1). At Block B, the processor accesses both the i-th and (i−1)th sets of Inventory Record Blocks from the Master Inventory Record File. Then at Block C the processor computes the j-th inventory received discrepancy measure $\Delta W'_{qrs}(j)$ for microingredient code q using the following formula:

$$\Delta W'_{qrs}(j) = W'_{qrsC}(i-1, i) - [W'_{qs}(i-1) - W'_{qs}(i)] - W'_{qsdC}(i-1,i)$$

wherein the first term in the above formula is the computed net weight of the microingredient (q) during the (i−1)th through i-th inventory periods; the second term in the above formula is the net weight of the microingredient (q) stored on the storage scale(s), recorded in the (i−1)th Inventory Recording Block; the third term in the above formula is the net weight of the microingredient (q) stored on the storage scale(s), recorded in the i-th Inventory Recording Block; the fourth term in the above formula is the computed net weight of the microingredient (q) removed off storage scale(s) and emptied into the preassigned dispensing bins or tanks during the (i−1)th and i-th inventory recording period. Notably, the fourth term in the above formula can be evaluated in different ways depending on which events have occurred during the inventory recording interval (i−1,i). For example, if indices k and l are constant during this interval, then $W_{qd}(i-1)$ and $W_{qd}(i)$ can be used to compute $W'_{qsd}(i-1),i)$. However, if indices k and l have been incremented during the (i−1)th and i-th inventory recording periods, indicative of dispenser refill and batch production operations, then the Dispensing Bin/Tank Refill Record File can be used to compute $W'_{qsd}(i-1,i)$.

After the inventory received discrepancy measure has been computed for microingredient code q, the processor at Block D in FIG. 20 buffers the computed discrepancy measure in the i-th Inventory Received Discrepancy Block corresponding to microingredient q. At Block G, the processor determines whether q=Q, which indicates that the last microingredient code has been considered in the inventory received discrepancy analysis. If q does not equal Q, then the processor increments variable q by +1 at Block F, and returns to Block C, as shown. The computation set forth in Block C is reperformed for each of the remaining scheduled microingredients. When an inventory received discrepancy measure has been computed for each scheduled microingredient, the condition q=Q is satisfied, the processor exits the Routine, and returns to the main control process, at Block R in FIG. 18A.

At Block R in FIG. $18A_2$, the processor records the computed inventory discrepancy measures in the i-th set of Inventory Received Discrepancy Blocks. Then at Block S, the processor uses the information entered in the i-th set of Inventory Received Discrepancy Blocks in order to produce the j-th Inventory Received Discrepancy Report.

As shown in FIG. 25, the jth Received Inventory Dispensing Report (e.g., "Reviewed Inventory Report") preferably contains a number of information items for each scheduled microingredient q, namely: the total net weight of microingredient q on the storage scales at the beginning of the i-th inventory recording period; the total net weight of microingredient q received into inventory during inventory recording interval (i−1, i); the total net weight of microingredient q removed off the storage scales and put into the dispensing bins/tanks during inventory recording interval (i−1, i); the total net weight of microingredient q on the storage scale(s) at the end of the i-th inventory recording period; and the discrepency in the total net weight of inventory received during inventory recording interval (i−1, i).

Figure 18I:
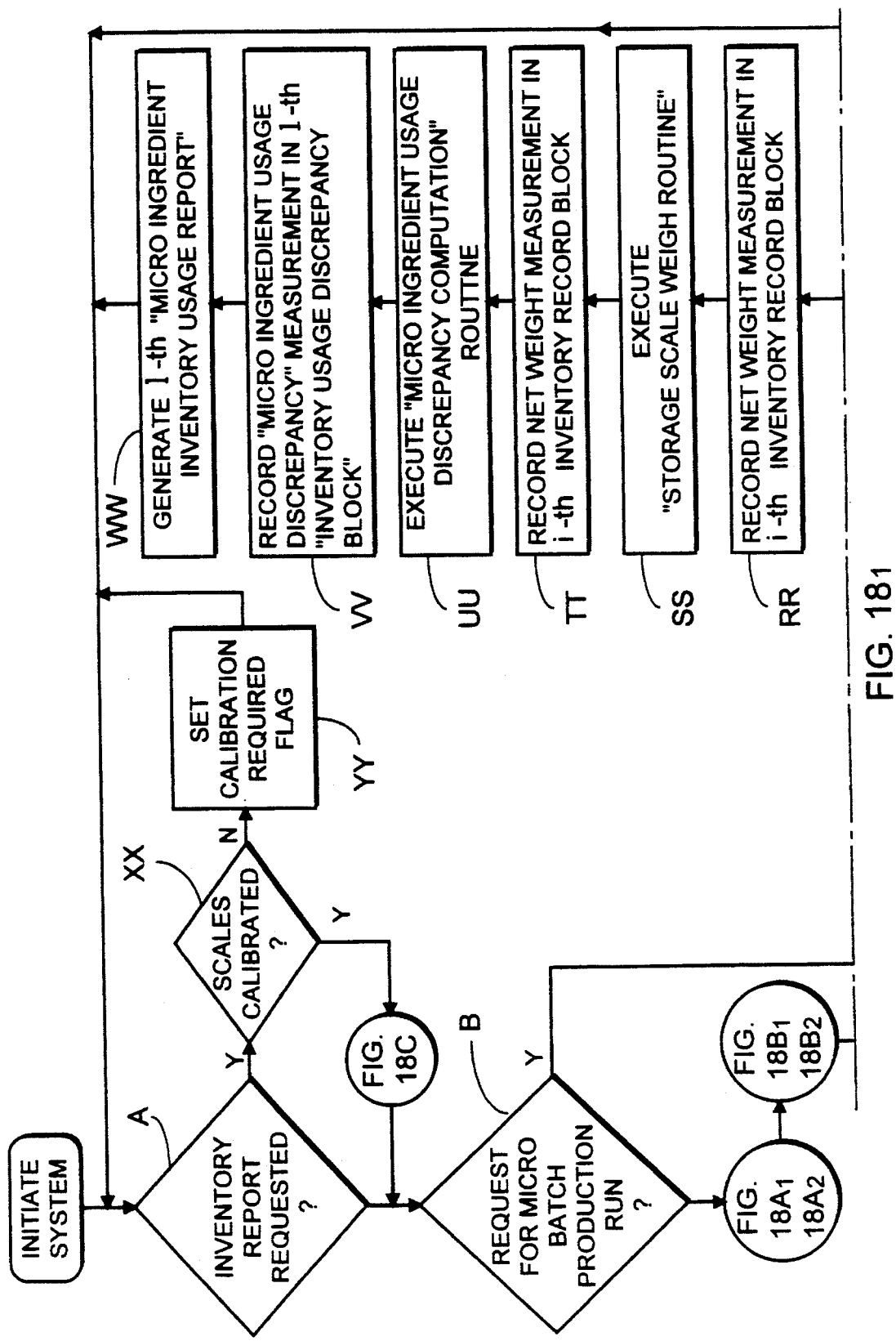

Then, at Block T in FIG. 18A$_2$, the processor uses the information recorded in the produced Inventory Received Record File to update the Master Storage Scale Record File, shown in FIG. 11. In essence, his file updating process entails using the information in the j-th Inventory Received Record File to increase (i) the number of microingredient packages of each particular supplier-lot numbers that are stored upon each preassigned storage scale, and (ii) the net weight of microingredient q in the stored packages having a particular supplier-lot number. Thereafter, the processor returns to Block C in FIG. 18A$_1$ to determine if another Inventory Received Discrepancy Report Request has been received since the previous progression through Blocks C to R.

When necessary, the feedmill operator is able to use the inventory of microingredients stored upon the storage scales of the system in order to fill scheduled dispensing bins and tanks with preassigned microingredients. Preferably, the dispenser refilling method of FIG. 17 is used by the feedmill operator to fill and refill dispensing bins and tanks alike. In the illustrative embodiment, when the feedmill operator carries out this process, the auxiliary computer and bar code symbol reader 9 are interfaced with the main computer system and the auxiliary computer system runs the graphics-based program "Create Dispensing Bin/Tank Refill Record," described above in connection with the method of FIG. 17.

When the main and auxiliary computer systems are interconnected, a data communication pathway is established therebetween. When the auxiliary computer begins running the "Create Dispensing Bin/Tank Refill Record", a data packet encoded as a "Dispensing Bin/Tank Refill Request" is transmitted from the auxiliary computer system to the main computer system. When this event occurs, the main computer system, at Block U in FIG. 18A affirms that a Dispensing Bin/Tank Refill Request has been made by the auxiliary computer. The main computer system responds to this request by entering a mode of operation described by the control flow process of FIG. 18B. While in this mode of operation, the auxiliary computer system typically is executing the Create Dispensing Bin/Tank Refill Record Routine. As illustrated in FIG. 17, this involves using bar code symbol reader 9 to record the identity of each microingredient package removed from one of the inventory storage scales and either emptied into its preassigned (color-coded) dispensing bin, or placed upon its dispensing tank scale. As described above, this method is interactive in nature, in that it requires both the main and auxiliary computer systems and a limited degree of involvement on behalf of the feedmill operator, or other delegated personnel, carrying out the inventory receiving method. The interactive nature of this process is reflected in the portion of the control flow chart set forth in FIGS. 18B$_1$ and 18B$_2$.

At Block V in FIG. 18B$_1$, the processor determines whether the various scales in the system have been calibrated. If the scales are not all calibrated, the processor sets the required calibration flag(s) at Block W and then proceeds to Block KK in FIG. 18$_2$. Otherwise, when all calibration flags are set, the processor proceeds to Block X and increments the inventory record index i by +1 and the dispenser refill index j by +1. At Block Y in FIG. 18B$_1$, the processor then extends the Master Inventory Record File by adding thereto one Inventory Record Block and one Dispensing Bin/Tank Refill Discrepancy Block for each microingredient scheduled in the System Configuration File. When at Block Z the processor receives a "Read Scales Command" from the auxiliary computer, it proceeds to Block AA in FIG. 18B$_2$ and executes the Dispensing Bin/Tank Weigh Routine, shown in FIGS. 21A and 21B.

As indicated in the flow chart of FIGS. 21A and 21B, the Dispensing Bin/Tank Weigh Routine comprises a number of steps carried out in sequence under the control of the main computer system. As indicated at Block A in FIG. 21A, the processor first determines whether the dispensing and mixing machine of the present invention is idle (i.e., not induced in any other mode of operation). If the machine is not idle, then the processor exits the routine, as illustrated. If, however, the machine is idle, then at Block B the processor defines the dispensing bin code index n as ranging from 1 to N, where N is the number of scheduled dispensing bins, and then initializes the dispensing bin code index n by setting it to 1 ( i.e., n=1).

At Block C in FIG. 21A, the processor then determines whether the dispensing bin corresponding to n=1 is scheduled in the System Configuration File. If it is not scheduled, then at Block D the processor determines whether the dispensing bin index n is equal to N. If this index is not equal to N, then at Block E this index is incremented by +1 and the processor returns to Block C, as shown. If, at Block C, the dispensing bin corresponding to dispensing bin code index n=1 is scheduled in the System Configuration File, then at Block F the processor generates the necessary control signals to lower the dispensing bin (corresponding to n=1), onto the dispensing-bin weigh frame. Then at Block G the processor reads the selected dispensing bin input register on the I/O board (corresponding to n=1) to obtain the.gross weight of the dispensing bin and the microingredient contained therein. At Block H, the processor computes the net weight of microingredient in the dispensing bin by subtracting the tare weight of the dispensing bin from the measured gross weight. At Block I the processor buffers the computed net weight of the microingredient.

At Block J in FIG. 21A, the processor generates the necessary control signals to elevate the dispensing bin off the dispensing-bin weigh frame. At Block D, the processor determines whether dispensing bin code index n is equal to N. If this index is not equal to N, then at Block E this index is incremented by +1 and the processor returns to Block C, as shown. Blocks C to J are reperformed for each scheduled dispensing bin in the system.

When n=N at Block D in FIG. 21A and all dispensing bins have been measured, the processor proceeds to Block K where the tank code index, also n, is defined and initialized, as described. Then at Block L, the processor determines whether the dispensing tank corresponding to n=1 is scheduled in the System Configuration File. If the corresponding dispensing tank is not scheduled, then the processor determines at Block M if n=N. If n is not equal to N, then the processor increments n by +1 at Block N and returns to Block L in FIG. 21A. If at Block L the processor determines that the dispensing tank is scheduled, then at Block O the processor reads the dispenser tank input register on the I/O board (corresponding to n=1) in order to obtain the gross weight of the dispensing tank and the liquid microingredient contained therein.

At Block P in FIG. 21B, the processor computes the net weight of microingredient in the dispensing tank by subtracting the known tare weight of the dispensing tank from the measured gross weight. At Block Q the processor buffers the computed net weight of the microingredient. At Block M, the processor determines whether or not the last scheduled dispensing tank (i.e., n=N) has been weighed and if not, increments index n by +1 and returns to Block L. The steps indicated at Blocks L through Q are performed for each scheduled dispensing tank and after the last scheduled dispensing tank is weighed, the processor exits the Dispensing Bin/Tank Weigh Routine and returns to the Main System Control Routine at Block BB in FIG. $18B_2$.

At Block BB in FIG. $18B_2$, the processor then records the gross weight measurements obtained above at Block AA, in the i-th set of Inventory Record Blocks. At Block CC, the processor executes the Storage Scale Weigh Routine of FIG. 19, as described above. This Routine returns net weight measurements of the microingredient contained in the packages stored upon the preassigned storage scales. At Block DD, the processor then records the net weight measurements obtained at Block CC, in the i-th set of Inventory Record Blocks. At Block EE in FIG. $18B_2$, the processor then executes the Dispensing Bin/Tank Refill Discrepancy Computation Routine set forth in FIG. 22.

During the execution of the Dispensing Bin/Tank Refill Discrepancy Computation Routine of FIG. 22, the processor uses the i-th set of Dispensing Bin/Tank Refill Discrepancy Record Blocks shown in FIGS. 14 and 14C. At Block A in FIG. 22, the processor defines and initializes the microingredient code index q (i.e., q=1). At Block B, the processor accesses the i-th and (i-1)th sets of Inventory Record Blocks from system memory. Then at Block C the processor computes the dispenser refill discrepancy measure $\Delta W'_{qsd}(k)$ for microingredient q. This computed measure is computed using the following formula:

$$\Delta W'_{qsd}(k)=[W'_{qs}(i-1)-W'_{qs}(i)]-[W'_{qd}(i)-W'_{qd}(i-1)]+W'_{qrs}(i-1,i)-W'_{qdh}(i-1,i)$$

wherein the first term in the above formula is the computed net weight of the microingredient (q) on the storage scale(s), recorded in the (i-1)th Inventory Record Block; the second term in the above formula is the computed net weight of the microingredient (q) on the storage scale(s), recorded in the i-th Inventory Record Block; the third term in the above formula is the computed net weight of the microingredient q) in the dispensing bin(s) or tank(s), recorded in the i-th Inventory Record Block; the fourth term in the above formula is the computed net weight of the microingredient q in the dispensing bin(s) or tank(s), recorded in (i−1)th Inventory Record Block; the fifth term in the above formula is the computed net weight of microingredient q received into inventory during the (i−1)th to the i-th inventory recording periods; and the sixth term in the above formula is the net weight of microingredient q used. during the (i−1)th to the i-th inventory recording periods. At Block D in FIG. 22, the processor records the computed dispenser refill discrepancy measure in the i-th Dispensing Bin/Tank Refill Discrepancy Block corresponding to microingredient q. At Block E, the processor determines whether q=Q, which indicates that the last microingredient has been considered in the inventory received discrepancy analysis. If q does not equal Q, then the processor increments variable q by +1 at Block F and returns to Block C, as shown. The computation set forth in Block C of FIG. 22 is reperformed for each of the remaining scheduled microingredients. When a dispensing refill discrepancy measure has been computed for each scheduled microingredient, the condition q=Q is satisfied, the processor exits the Routine, and proceeds to Block FF of FIG. $18B_2$ in the main system control process.

At Block FF in FIG. $18B_2$, the processor records the computed Dispenser Refill Discrepancy measures in the i-th set of Dispensing Bin/Tank Refill Discrepancy Blocks. Then at Block GG, the processor uses the i-th set of Dispensing Bin/Tank Refill Discrepancy Blocks to generate the k-th Dispensing Bin/Tank Refill Discrepancy Report.

As shown in FIG. 26, the kth Dispensing Bin/Tank Refill Discrepency Report (e.g., "Dispenser Refill Report") preferably contains a number of information items for each scheduled microingredient q, namely: the total net weight of microingredient q on the storage scales, recorded at the beginning of the i-th inventory recording period; the total net weight of microingredient q received into inventory during inventory recording interval (i−1, i); the total net weight of microingredient q removed off the storage scales and put into the dispensing bins/tanks during inventory recording interval (i−1, i); the total net weight of microingredient q dispensed during inventory recording interval (i−1, i); the total net weight of microingredient q on the storage scale(s), at the end of the i-th inventory recording period; and the discrepency in the total net weight of microingredient used to refill the dispensing bins/tanks during inventory recording interval (i−1, i).

At Block HH in FIG. $18B_2$, the processor prompts the auxiliary computer to transmit the completed Dispensing Bin/Tank Refill Record File. When this file is received at Block II, it is used at Block JJ to update the Master Dispensing Bin/Tank Inventory Record File of FIG. 13. In essence, this updating process involves using the net weight of microingredient q listed in the Dispensing Bin/Tank Refill Record File (with particular supplier-lot numbers), to decrease the weight of microingredient packages listed in the Master Dispensing Bin/Tank Inventory Record File (with corresponding supplier lot numbers). When this updating process is completed, the processor returns to Block U in FIG. $18B_1$ where another Dispensing Bin/Tank Refill Request may be received from the auxiliary computer.

If another Dispensing Bin/Tank Refill Request is not received upon returning to Block U in FIG. $18B_1$, then the processor proceeds to Block KK where any one of several accessory type routines may be requested for execution. Examples of accessory routines include, for example: the Scale Calibration Routine, Feed Formulation Routine, System Reconfiguration Routine, and Formula Printing Routine. If an accessory routine is requested at Block KK in FIG. $18_2$, then at Block U the processor executes the routine and thereafter returns to Block A in FIG. $18_1$, as shown. If an accessory routine is not requested, then the processor returns directly to Block A in FIG. $18_1$.

With microingredient stored on the storage scales and in scheduled dispensing bins and tanks, the system is prepared to produce a micro-batch when the system control process enters Block B in FIG. $18_1$. When a request for a micro-batch production run is received at Block B in FIG. $18_1$, and completed at Block NN in FIG. $18_2$, the system is automatically induced into yet another mode of operation, referred to as Microingredient Usage Discrepancy Analysis, which is reflected in the sequence of Blocks OO through VV in FIGS. $18A_1$ and $18A_2$. Unlike the above-described modes of operation, this mode does not require any participation on part of the feedmill operator, and thus may be thought of as non-interactive. The details of this mode of operation will be described below.

At Block MM in FIG. $18_2$, the processor determines whether all of the dispensing bin and tank scales are calibrated. If these scales are not all calibrated, then the processor sets a Calibration Required Flag for each scale requiring calibration, and then returns to Block A in FIG. $18_1$, as shown. If all dispensing scales are calibrated, then at Block O the processor executes the Dispensing/Mixing/Flushing Routine in a manner readily apparent from the disclosure set forth herein.

Thereafter at Block PP in FIG. $18_2$, the processor increments the inventory record index i by +1 and the microingredient usage index l by +1. At the same Block, the processor extends the Master Inventory Record File by adding thereto one Inventory Record Block and one Microingredient-Usage Discrepancy Block for each microingredient scheduled in the System Configuration File. At Block QQ, the processor executes the Dispensing Bin/Tank Weigh Routine as hereinbefore described. At Block RR, the processor then records in the i-th set of Inventory Record Blocks illustrated in FIG. 14, the gross weight measurements obtained at Block QQ. At Block SS in FIG. 18$_1$, the processor executes the Storage Scale Weigh Routine of FIG. 19, as described above. This routine returns gross weight measurements of the microingredient packages stored upon the preassigned storage scales. At Block TT, the processor then records the gross weight measurements obtained at Block SS, in the i-th set of Inventory Record Blocks. At Block UU in FIG. 18$_1$, the processor then executes the Microingredient-Usage Discrepancy Computation Routine set forth in FIG. 23.

In the Microingredient-Usage Discrepancy Computation Routine of FIG. 23, the processor utilizes the i-th set of Microingredient-Usage Discrepancy Record Blocks, shown in FIGS. 14 and 14D. At Block A in FIG. 23, the processor defines and initializes the microingredient code index q (i.e., q=1). At Block B, the processor accesses the i-th and (i−1)th sets of Inventory Record Blocks from system memory. Then at Block C the processor computes the net microingredient-usage discrepancy measure $W'_{qdh}$ for microingredient q. The net microingredient-usage discrepancy measure for microingredient q is computed using the following formula:

$$\Delta W'_{qdh}(1)=\Delta'_{q7}(i-1, i)-\Delta'_{qhu}(i-1,i)$$

wherein the first term in the above formula is the computed theoretical net weight of the microingredient q used during the (i−1)th through i-th inventory recording periods; and the second term in the above formula is the computed net weight of the microingredient q used during the (i−1)th through i-th inventory recording periods. Notably, the second term in the above formula can be determined in different ways depending on the events which have occurred between the (i−1)th through i-th inventory recording interval. For example, when at least one inventory receiving operation has occurred during this time interval (i.e., indices j, k, and l have each been incremented), the discrepancy measure $\Delta W'_{qsd}(i-1,i)$ can be determined by summing the total net weights of microingredient q recorded in the Dispensing Bin/Tank Refill Record File(s) created during this time interval. Also, when no inventory receiving operations have occurred between the (i−1)th and the i-th inventory recording periods (i.e., index j is constant and indices k and l are incremented), the discrepancy measure $\Delta W'_{qsd}(i-1,i)$ can be determined by computing the difference in net weight of microingredient q on the storage scales (i.e., $\Delta'_{qs}(i-1)-W'_{qs}(i)$ ).

At Block D in FIG. 23, the processor buffers the computed microingredient-usage discrepancy measure for microingredient q. At Block E, the processor determines whether q=Q, which indicates that the last microingredient has been considered in the microingredient-usage discrepancy analysis. If q does not equal Q, then the processor increments variable q by +1 at Block F and returns to Block C, as shown in FIG. 23. The computation set forth in Block C of FIG. 23 is reperformed for each of the remaining scheduled microingredients. When a microingredient-usage discrepancy measure has been computed for each scheduled microingredient, the condition q=Q is satisfied, the processor exits the Routine, and proceeds to Block VV of FIG. 18 in the main system control process.

Finally at Block VV in FIG. 18$_1$, the processor records the computed microingredient usage discrepancy measures in the i-th set of Microingredient Usage Discrepancy Blocks. Then at Block WW, the processor uses the i-th set of Microingredient-Usage Discrepancy Record Blocks to generate the l-the Microingredient-Usage Discrepancy Report. In general, this report contains As shown in FIG. 27, the l-th Microingredient-Usage Dispensing Report (e.g., End of Production Run Report) preferably contains a number of information items for each scheduled microingredient q, namely: the total net weight of microingredient q in inventory at the beginning of the i-th inventory recording period; the theoretical net weight of microingredient q that can be used with the total amount of feed ration produced during the l-th production period; the total net weight of microingredient q dispensed during inventory recording interval (i−1, i); the net weight difference between the theoretical amount and the dispensed amount of microingredient q; the total net weight of microingredient q in inventory at the end of the i-th inventory recording period; and the total net weight of microingredient q at the end of the i-th inventory recording period.

From time to time, the feedmill operator and/or the feedlot manager desire or require information regarding the state of microingredient inventory in the system. In accordance with the present invention, this information is automatically generated from the system in the form of Inventory Reports. Advantageously, these inventory reports may be requested at arbitrary times and may be organized in a format that best suits the interests of the feedmill operator or feedlot manager. By simply issuing an Inventory Report Request to the main computer system, preferably although not necessarily through the auxiliary computer system, the system of the present invention is induced into an Inventory Reporting mode which is reflected in the sequence of control blocks shown in FIG. 18C. Notably, the receipt of the Inventory Reporting Request by the main computer system is the "inventory recording event" which induces this particular mode of operation. This mode of operation will be described in detail below.

Figure 18C:
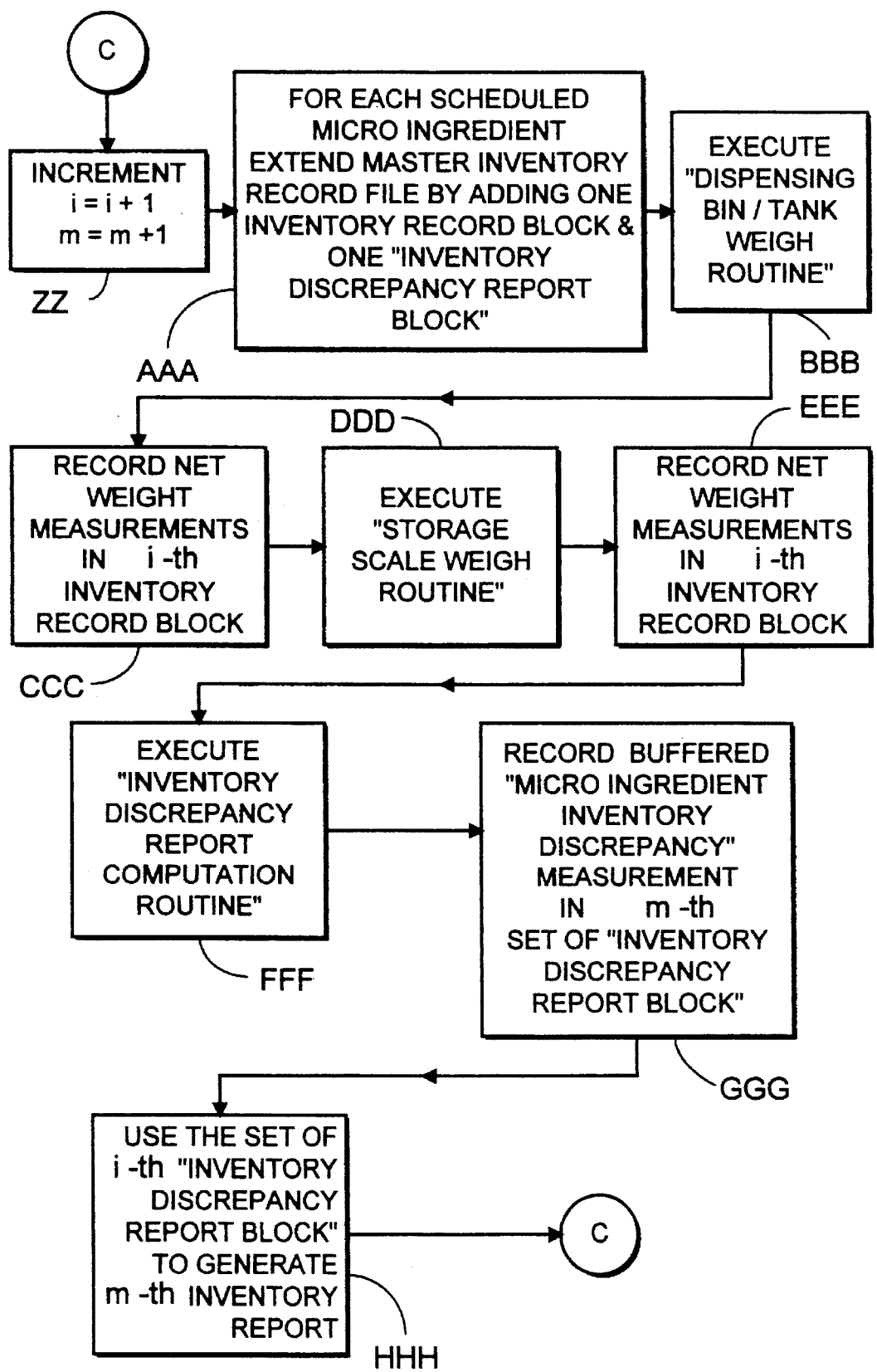

When an Inventory Report Request is received at Block A in FIG. 18$_1$, the processor determines whether all storage and dispensing scales are calibrated. If at Block XX in 18C the processor determines that some scales are not properly calibrated, then at Block YY the processor sets Calibration Required Flags as described above and returns to Block A in FIG. 18$_1$. If all storage and dispensing scales are properly calibrated, then the processor enters Block ZZ shown in FIG. 18C.

At Block ZZ in FIG. 18C, the processor increments the inventory record index i by +1 and the inventory report index l by +1. At Block AAA, the processor then extends the Master Inventory Record File by adding thereto one Inventory Record Block and one Inventory Record Block for each microingredient scheduled in the System Configuration File.

At Block BBB in FIG. 18C, the processor executes the Dispensing Bin/Tank Weigh Routine of FIG. 21, as described above. At Block CCC, the processor then records in the i-th set of Inventory Record Blocks of FIG. 14, the gross weight measurements obtained at Block BBB. At Block DDD, the processor executes the Storage Scale Weigh Routine of FIG. 19, as described above. This Routine returns net weight measurements of the microingredient contained in the packages stored upon the preassigned storage scales. At Block EEE, the processor then records in the i-th set of Inventory Record Blocks of FIG. 14, the net weight measurements obtained at Block DDD. At Block EEE, the processor then executes the Inventory Discrepancy Computation Routine set forth in FIG. 24.

During the execution of the Inventory Discrepancy Computation Routine of FIG. 24, the processor uses information contained in Inventory Record and Discrepancy Blocks created between the (i-r)th and i-th inventory recording periods. At Block A in FIG. 24A, the processor defines and initializes the microingredient code index q (i.e., q=1). At Block B, the processor defines the inventory history index r as any arbitrary integer greater that or equal to 1 and less than or equal to integer R. At Block C the processor prompts the feedmill operator or feedlot manager to select inventory history index r, and at remains at Block D in FIG. 24B until this index value is received. At Block E the processor accesses the i-th through the (i-r)th Inventory Record and related Blocks from memory. Then at Block F the processor computes the net inventory weight discrepancy measure $\Delta W'_{qsh}(m)$ for microingredient q using the following formula:

$$\Delta W'_{qsh}(m) = [W'_{qs}(i-r) - W'_{qs}(i)] - [W'_{qd}(i) - W'_{qd}(i-r)] - W'_{qdh}(i-r,i) + W'_{qrs}(i-r,i)$$

wherein the first term in the above formula is the computed net weight of the microingredient q on the storage scale(s), recorded in the (i-r)th Inventory Record Block; the second term in the above formula is the computed net weight of the microingredient q on the storage scale(s), recorded in the i-th Inventory Record Block; the third term in the above formula is the computed net weight of the microingredient q in the dispensing bins (or tanks), recorded in the (i)th Inventory Record Block; the fourth term in the above formula is the computed net weight of the microingredient q in the dispensing bins (or tanks), recorded in the (i-r)-th Inventory Record Block; the fifth term in the above formula is the computed net weight of the microingredient q used during the (i-r)th through i-th inventory recording periods; and the sixth term in the above formula is the computed net weight of the microingredient q received into inventory during the (i-r)th through i-th inventory recording periods.

At Block G in FIG. 24, the processor records the computed inventory discrepancy measure in the i-th Inventory Discrepancy Block corresponding to microingredient q. At Block H, the processor determines whether q=Q, which indicates that the last microingredient has been considered in the inventory discrepancy analysis. If q does not equal Q, then the processor increments variable q by +1 at Block I and returns to Block F, as shown in FIG. 24. The computation set forth in Block F of FIG. 24 is reperformed for each of the remaining scheduled microingredients. When an inventory discrepancy measure has been computed for each scheduled microingredient, the condition q=Q is satisfied, the processor exits the Routine, and proceeds to Block GGG of FIG. 18C in the main control process flow.

At Block GGG in FIG. 18C, the processor records the buffered inventory discrepancy measures in the i-th Inventory Discrepancy Block. Finally, at Block HHH in FIG. 18C the processor uses the i-th set of Inventory Discrepancy Blocks to generate the m-th Inventory Report.

As shown in FIG. 28, the mth Inventory Report (e.g., "End of Production Period Run Report") preferably contains a number of information items for each scheduled microingredient q, namely: the total net weight of microingredient q in inventory at the beginning of the (i-th) inventory recording period; the total net weight of microingredient q received into inventory during inventory recording interval (i−1, i); the total net weight of microingredient q removed off the storage scales and put into the dispensing bins/tanks during inventory recording interval (i−1, i); the total net weight of microingredient q dispensed during inventory recording interval (i−1,i); the total net weight of microingredient q in inventory at the end of the i-th inventory recording period; and the discrepency in the total net weight of microingredient q in inventory during inventory recording interval (i−1, i).

Having completed the Detailed Description of the Illustrative Embodiment of the Present Invention, several modifications readily come to mind.

For example, in accordance with the present invention, conventional multi-tasking programming techniques can be used to realize the system control process illustrated in FIGS. 18 to 18C. Such programming techniques can be used to simultaneously support multiple modes of operation, such as production run control, inventory receiving support, and dispensing bin and tank refilling operations. In such alternative embodiments of the present invention, it will be desirable for the main computer system to produce reports that contain two or more of the above-described discrepancy measures for an arbitrarily selected inventory reporting interval extending inventory recording interval (i-r, i).

Several modifications to the illustrative embodiment have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A programmable microingredient dispensing and mixing machine, comprising:

a housing of rugged construction; programmed control means for controlling the operation of various components of said machine in accordance with a control program;

an information storage and processing means for storing and processing information relating to the measured weight of microingredients in said machine;

a plurality of dispensing bins disposed in said housing, each said dispensing bins including means for storing a supply of a preassigned type of microingredient, and means for dispensing a specified amount of said preassigned type of microingredient from said dispensing bin for weight measurement under the control of said programmed control means;

first weight measuring means for independently measuring the weight of microingredient stored in each one of said dispensing bins under the control of said programmed control means, and producing first weight information for storage in said programmed information storage and processing means, said first transmitted weight information being representative of the measured weight of the microingredients stored in each one of said dispensing bins;

a weigh hopper, disposed within said housing, and for temporarily storing an amount of microingredient dispensed from one of said dispensing bins, into said weigh hopper, said weigh hopper including means for discharging said measured amount of microingredient under the control of said programmed control means;

second weight measuring means, disposed in said housing, for measuring the amount of microingredient stored in said weigh hopper and producing second weight information for storage in said information storage and processing means, said second weight information being representative of the weight of said measured amount of microingredient stored in said weigh hopper; and a mixing tank for containing one or more types of microingredient discharged from said weigh hopper under the control of said programmed control means, said mixing tank including means for mixing said discharged microingredients with a specified amount of consumptive fluid carrier, such as water, to form a microingredient slurry mixture, and means for transporting said microingredient slurry mixture away from said mixing tank under the control of said programmed control means, for subsequent usage.

2. The programmable microingredient dispensing and mixing system of claim 1, which further comprises:

a plurality of storage scales, each said storage scale having a storage surface for supporting one or more packages of said preassigned assigned type of microingredient in said inventory, and third weight measuring means for measuring the weight of said one or more packages of said preassigned type of microingredient supported by said storage surface, and providing third weight information for storage in said information storage and processing means, said third weight information being representative of the measured weight of said one or more packages of said preassigned type of microingredient.

3. The programmable microingredient dispensing and mixing system of claim 1, which further comprises:

a plurality of dispensing tanks, each said dispensing tank including means for storing a supply of a preassigned type of liquid microingredient;

means for dispensing an specified amount of said preassigned type of liquid microingredient into said weigh hopper for measurement and subsequent discharge into said mixing tank under the control of said programmed control means; and fourth weight measuring means for independently measuring the weight of liquid microingredient stored in each one of said dispensing tanks under the control of said programmed control means, and providing fourth weight information for storage in said information storage and processing means, said fourth weight information being representative of the measured weight of the liquid microingredients stored in each one of said dispensing tanks.

4. The programmable microingredient dispensing and mixing system of claim 1, wherein said information storage and processing means comprises a first programmed computer system.

5. The programmable microingredient dispensing and mixing system of claim 4, wherein said programmed control means comprises said first programmed computer system.

6. The programmable microingredient dispensing and mixing system of claim 5, wherein each of said one or more packages of microingredient bears a bar code symbol encoded to identify the type and amount of microingredient contained in said package.

7. The programmable microingredient dispensing and mixing system of claim 6, which further comprises a portable computer system, interfacable with said first programmed computer system, and operably connected to a hand-supportable bar code symbol reading device for reading bar code symbols applied to each of said one or more packages of microingredient.

8. The programmable microingredient dispensing and mixing system of claim 4, wherein after the production of a microingredient mixture batch, said first programmed computer system is programmed to produce a microingredient inventory record by automatically measuring the weight of the preassigned microingredient stored on each said storage scale, in each said dispensing bin, and in each said dispensing tank.

9. The programmable microingredient dispensing and mixing system of claim 1, wherein said first weight measuring means comprises a weigh frame operably connected to a plurality of load cells mounted within said housing, and wherein said each said dispensing bin is independently supported from a support. shaft rotatable about an axis of rotation by a motor operated under the control of said programmed control means.

10. The programmable microingredient dispensing and mixing system of claim 9, wherein each id dispensing bin is independently supported from said rotatable support shaft by wa of a pair of support elements, each of which is pivotally connected at one thereof at a radial distance from the axis of rotation of said support shaft.

11. The programmable microingredient dispensing and mixing system of claim 9, wherein said programmed control means is programmed to lower only one said dispensing bin at a time upon said weigh frame in order to measure the weight of microingredient in said lowered dispensing bin.

12. A programmable microingredient dispensing and mixing machine, comprising:

a housing of rugged construction;

programmed control means for controlling the operation of various components of said machine in accordance with a control program;

an information processing means for creating and managing information files, including an inventory record file, relating to the management of an inventory of microingredients for dispensing in said machine;

a plurality of storage scales, each said storage scale having a storage surface for supporting one or more packages a preassigned assigned type of microingredient in said inventory, first weight measuring means for measuring the weight said one or more packages of said preassigned type of microingredient supported by said storage surface, and providing first weight information for storage in said inventory record file, said first weight information being representative of the measured weight of said one or more packages of said preassigned type of microingredient;

a plurality of dispensing bins disposed in said housing each said dispensing bin including means for storing a supply of a preassigned type of microingredient, and means for dispensing a specified amount of said preassigned type of microingredient from said dispensing bin for measurement under the control of said programmed control means;

second weight measuring means for independently measuring the weight of microingredient stored in each one of said dispensing bins under the control of said programmed control means, and providing second weight information for storage in said inventory record file, said second weight information element being representative of the measured weight of the microingredients stored in each one of said dispensing bins;

a weigh hopper, disposed within said housing, and for temporarily storing an amount of microingredient dispensed from one of said dispensing bins, into said weigh hopper, said weigh hopper including means for discharging said measured amount of microingredient under the control of said programmed control means;

third weight measuring means, disposed in said housing, for measuring said amount of microingredient stored in said weigh hopper and producing a third weight information element for recording in said inventory record file, said third weight information element being representative of the weight of said measured amount of microingredient stored in said weigh hopper; and a mixing tank for containing one or more types of microingredient discharged from said weigh hopper under the control of said programmed control means, said mixing tank including means for mixing said discharged microingredients with a specified amount of consumptive fluid carrier, such as water, to form a slurry mixture, and means for transporting said slurry mixture to a storage tank for subsequent usage under the control of said programmed control means.

13. The programmable microingredient dispensing and mixing system of claim 12, which further comprises:

a plurality of dispensing tanks, each said dispensing tank including means for storing a supply of a preassigned type of liquid microingredient, and means for dispensing a specified amount of said preassigned type of liquid microingredient into said weigh hopper for measurement and subsequent discharge into said mixing tank under the control of said programmed control means; and fourth weight measuring means for independently measuring the weight of liquid microingredient stored in each one of said dispensing tanks under the control of said programmed control means, and producing fourth weight information for recording in said inventory record file, said fourth weight information being representative of the measured weight of the liquid microingredients stored in each one of said dispensing tanks.

14. The programmable microingredient dispensing and mixing system of claim 13, which further comprises a second programmed computer system having a portable construction and being selectively interfaced with said first computer system.

15. The programmable microingredient dispensing and mixing system of 12, which further comprises a portable computer system operably connected to a hand-supportable bar code symbol reading device.

16. The programmable microingredient dispensing and mixing system of claim 12, wherein said programmed control means comprises a first programmed computer system.

17. The programmable microingredient dispensing and mixing system of claim 16, wherein after the production of a microingredient mixture batch, said first programmed computer system is programmed to automatically measure the weight of the preassigned microingredient stored on each said storage scale, in each said dispensing bin, and in each said dispensing tank.

18. The programmable microingredient dispensing and mixing system of claim 12, wherein said second weight measuring means comprises a weigh frame operably connected to a plurality of load cells mounted within said housing, and wherein said each said dispensing bin is independently supported from a support shaft rotatable about an axis of rotation by a motor operated under the control of said programmed control means.

19. The programmable microingredient dispensing and mixing system of claim 18, wherein each said dispensing bin is independently supported from said rotatable support shaft by way of a pair of support elements, each of which is pivotally connected at one end thereof at a radial distance from the axis of rotation of said support shaft.

20. The programmable microingredient dispensing and mixing system of claim 18, wherein said programmed control means is programmed to lower only one said dispensing bin at a time upon said weigh frame in order to measure the weight of microingredient in said lowered dispensing bin.

21. A programmable microingredient dispensing and mixing machine, comprising:

a housing of rugged construction;

programmed control means for controlling the operation of various components of said machine in accordance with a control program;

an information storage and processing means for storing and processing information relating to the measured weight of microingredients in said machine;

a plurality of dispensing bins disposed in said housing, each said dispensing bin including means for storing a supply of a preassigned type of microingredient, and means for dispensing a specified amount of said preassigned type of microingredient from said dispensing bin under the control of said programmed control means;

first weight measuring means for measuring the weight of microingredient stored in each one of said dispensing bins under the control of said programmed control means, and producing first weight information to said information storage and processing means for storage, said first weight information being representative of the measured weight of the microingredients stored in each one of said dispensing bins;

weigh hopper, disposed within said housing, for temporarily storing an amount of microingredient dispensed into said weigh hopper from one of said dispensing bins, said weigh hopper including means for discharging said measured amount of microingredient under the control of said programmed control means;

second weight measuring means, disposed in said housing, for measuring the amount of microingredient stored in said weigh hopper and producing second weight information to said information storage and processing means for storage, said second weight information being representative of the weight of said measured amount of microingredient stored in said weigh hopper; and a mixing tank for containing one or more types of microingredient discharged from said weigh hopper under the control of said programmed control means, said mixing tank including means for mixing said discharged microingredients with a specified amount of consumptive fluid carrier, such as water, to form a microingredient slurry mixture, and means for transporting said microingredient slurry mixture away from said mixing tank under the control of said programmed control means, for subsequent usage.

22. The programmable microingredient dispensing and mixing system of claim 21, which further comprises:

a plurality of storage scales, each said storage scale having a storage surface for supporting one or more packages of said preassigned assigned type of microingredient in said inventory, third weight measuring means for measuring the weight of said one or more packages of said preassigned type of microingredient supported by said storage surface, and producing third weight information for storage in said information storage and processing means, said third weight information being representative of the measured weight of said one or more packages of said preassigned type of microingredient.

23. The programmable microingredient dispensing and mixing system of 22, wherein each of said one or more packages of microingredient bears a bar code symbol encoded to identify the type and amount of microingredient contained in said package.

24. The programmable microingredient dispensing and mixing system of claim 23, which further comprises a portable computer system, interfacable with said information storage and processing means, and operably connected to a hand-supportable bar code symbol reading device for reading bar code symbols applied to each of said one or more packages of microingredient.

25. The programmable microingredient dispensing and mixing system of claim 21, which further comprises:

a plurality of dispensing tanks, each said dispensing tank including means for storing a supply of a preassigned type of liquid microingredient, and means for dispensing a specified amount of said preassigned type of microingredient into said mixing tank for measurement and subsequent discharge into said mixing tank under the control of said programmed control means; and fourth weight measuring means for independently measuring the weight of liquid microingredient stored in each one of said dispensing tanks under the control of said programmed control means, and providing fourth weight information for storage in said information storage and processing means, said fourth weight information being representative of the measured weight of the liquid microingredients stored in each one of said dispensing tanks.

26. The programmable microingredient dispensing and mixing system of claim 25, wherein after the production of a microingredient mixture batch, said first programmed computer system is programmed to produce a microingredient inventory report by automatically measuring the weight of the preassigned microingredient stored on each said storage scale, in each said dispensing bin, and in each said dispensing tank.

27. The programmable microingredient dispensing and mixing system of claim 21, wherein said information storage and processing means comprises a first programmed computer system.

28. The programmable microingredient dispensing and mixing system of claim 27, wherein said programmed control means comprises said first programmed computer system.

29. The programmable microingredient dispensing and mixing system of claim 21, wherein said first weight measuring means comprises a weigh frame operably connected to a plurality of load cells mounted within said housing, and wherein said each said dispensing bin is independently supported from a support shaft rotatable about an axis of rotation by a motor operated under the control of said programmed control means.

30. The programmable microingredient dispensing and mixing system of claim 29, wherein each said dispensing bin is independently supported from said rotatable support shaft by way of a pair of support elements, each of which is pivotally connected at one thereof at a radially distance from the axis of rotation of said support shaft.

31. The programmable microingredient dispensing and mixing system of claim 28, wherein said programmed control means is programmed to lower only one said dispensing bin at a time upon said weigh frame in order to measure the weight of microingredient in said lowered dispensing bin.

32. Method of receiving a shipment of microingredient packages into the inventory of an animal feeding facility, said method comprising the steps of:

(a) installing a microingredient dispensing and mixing system in said animal feeding facility, said microingredient dispensing and mixing system including a plurality of storage scales and an information storage and processing system operably connected a bar code symbol reading device, each said storage scale being operably connected to said information storage and processing system and having a storage surface for supporting one or more packages of microingredient, and weight measuring means for measuring the weight of said one or more packages of microingredients supported on said storage surface;

(b) using said information storage and processing system to create a microingredient [receipt] received record file for storing information regarding the particular type and weight of microingredient preassigned for storage upon each one of said storage scales;

(c) delivering to said animal feeding facility, a shipment of microingredient packages, each said microingredient package containing a particular type and quantity of microingredient and bearing a bar code symbol representative of the type and quantity of microingredient contained in said package;

(d) using said bar code symbol reading device to re the bar code symbol on each delivered microingredient package said shipment and produce symbol character data representative of the type and quantity of microingredient stored in said delivered package of microingredient;

(e) storing produced symbol character data in said microingredient received record file in order to register the type and weight of each microingredient package microingredient delivered in said shipment;

(f) prior to commencing step (g), measuring the weight of microingredient upon each said storage scale and recording in said microingredient received record file, weight measurement information representative of the weight of the microingredient upon each said storage scale;

(g) physically storing each delivered microingredient package upon the storage scale preassigned to the type of microingredient contained in said delivered microingredient package;

(h) after completing step (g), measuring the weight of microingredient upon each said storage scale and recording in said microingredient received record file, weight measurement information representative of the weight of the microingredient upon each said storage scale; and (i) analyzing the weight measurement information and the symbol character data recorded in said microingredient received record file, in order to detect any discrepancies between the amount of microingredient contained in said shipment of microingredient packages registered during step (d), and any increase or decrease in amount of microingredient stored upon said storage scales upon completion of step (h).

33. Method of receiving a shipment of microingredient packages into the inventory of an animal feeding facility, said method comprising the steps of:

(a) installing a microingredient dispensing and mixing system in said animal feeding facility, said microingredient dispensing and mixing system including a plurality of storage scales and an information storage and processing system operably connected a bar code symbol reading device, each said storage scale being operably connected to sail information storage and processing system and having a storage surface for supporting one or more packages of microingredient, and weight measuring means for measuring the weight of said one or more packages of microingredients supported on said storage surface;

(b) using said information storage and processing system to create a microingredient received record file for storing information regarding the particular type, weight, supplier and supplier's lot number of microingredient preassigned for storage upon each one of said storage scales;

(c) delivering to said animal feedlot, a shipment of microingredient packages, each said microingredient package containing a particular type and quantity of microingredient and bearing one or more bar code symbols encoded with information representative of the type, quantity, supplier and supplier's lot number of microingredient contained in said package;

(d) using said bar code symbol reading device to read said one or more bar code symbols on each delivered microingredient package in said shipment and produce symbol character data representative of the type, quantity, supplier and supplier's lot number of microingredient stored in said delivered package of microingredient;

(e) storing produced symbol character data in said microingredient received record file in order to register the type, weight, supplier and supplier's lot number of each microingredient package microingredient delivered in said shipment;

(f) prior to commencing step (g), measuring the weight of microingredient upon each said platform storage scal and recording in said microingredient received record file, weight measurement information representative of the weight of the microingredient upon each said storage scale;

(g) physically storing each delivered microingredient package upon the storage scale preassigned to the type of microingredient contained in said delivered microingredient package;

(h) after completing step (g), measuring the weight of microingredient upon each said storage scale and recording in said microingredient received record file, weight measurement information representative of the weight of the microingredient upon each said storage scale; and (i) analyzing the weight measurement information and the symbol character data recorded in said microingredient received record file, in order to detect any discrepancies between the amount of microingredient contained in said shipment of microingredient packages registered during step (d), and any increase or decrease in amount of microingredient stored upon said storage scales upon completion of step (h).

34. Method of filling a programmable microingredient dispensing and mixing machine with microingredients stored in the microingredient inventory of an animal feedlot, said method comprising the steps of:

(a) installing a microingredient dispensing and mixing system in said animal feedlot, said microingredient dispensing and mixing system including (1) an information processing means for creating and managing an inventory record file relating to the inventory of microingredients for dispensing in said machine, (2) a plurality of storage scales, each said storage scale having a storage surface supporting one or more microingredient packages, each containing a preassigned assigned type and particular quantity of microingredient, first weight measuring means for measuring the weight of said one or more packages of said preassigned type of microingredient supported by said storage surface, and producing a first weight information for recording in said inventory record file, said first weight information being representative of the measured weight of said one or more packages of said preassigned type of microingredient, (3) a weigh hopper, disposed within said housing, and for temporarily storing an amount of microingredient dispensed into said weigh hopper from one of said dispensing bins, said weigh hopper including means for discharging said measured amount of microingredient under the control of said programmed control means, (4) second weight measuring means, disposed in said housing, for measuring said amount of microingredient stored in said weigh hopper and producing a second weight information for recording in said inventory record file, said second weight information being representative of the weight of said measured amount of microingredient stored in said weigh hopper, (5) a plurality of dispensing means, each said dispensing means including means for storing a supply of a preassigned type of microingredient, and means for dispensing a specified amount of said preassigned type of microingredient into said weigh hopper for measurement under the control of said programmed control means, (6) third weight measuring means for independently measuring the weight of microingredient stored in each one of said dispensing means under the control of said programmed control means, and producing third weight information for recording in said inventory record file, said third weight information being representative of the measured weight of the microingredients stored in each one of said dispensing means, and (7) a mixing tank for containing one or more types of microingredient discharged from said weigh hopper under the control of said programmed control means, said mixing tank including
  means for mixing said discharged microingredients with a specified amount of consumptive fluid carrier, such as water, to form a slurry mixture, and
  means for transporting said slurry mixture to a storage tank for subsequent usage under the control of said programmed control means;

(b) using said information storage and processing system to create a inventory record file for recording information regarding the particular type of microingredient preassigned for storage upon each one of said storage scales, the weight of microingredient stored upon each said storage scale, and the weight of microingredient stored in each said dispensing means;

(c) measuring the weight of microingredient upon each said storage scale, producing first weight measurement information representative of the weight of the microingredient upon each said storage scale, and recording the produced first weight measurement information in said inventory record file;

(d) measuring the weight of microingredient in each said dispensing means, producing second weight measurement information representative of the weight of the microingredient in each said dispensing means, and recording the produced second weight measurement information in said inventory record file;

(e) removing one or more said microingredient packages from one or more of said storage scales, and emptying the microingredient contents of said one or more microingredient packages into one or more of said preassigned dispensing means;

(f) measuring the weight of microingredient upon each said storage scale, producing third weight measurement information representative of the weight of the microingredient stored upon each said storage scale, and recording the produced third weight measurement information in said inventory record file;

(g) measuring the weight of microingredient in each said dispensing means, producing fourth weight measurement information representative of the weight of the microingredient stored in each said dispensing means, and recording the produced fourth weight measurement information in said inventory record file; and (h) analyzing the first, second, third and fourth weight measurement information recorded in said inventory record file, in order to detect any discrepancies between the amount of microingredient removed from said one or more storage scales and the amount of microingredient emptied into said one or more dispensing means, and producing information indicative of any such discrepancies for recordation in said inventory record file.

35. Method of managing an inventory of microingredient packages stored in an animal feedlot, said method comprising the steps of:

(a) installing a microingredient dispensing and mixing machine in said animal feedlot, said microingredient dispensing and mixing system including
  (1) an information processing means for creating and managing an inventory record file relating to the inventory of microingredients for dispensing in said machine,
  (2) a plurality of storage scales, each said storage scale having
    a storage surface for supporting one or more packages of a preassigned assigned type of microingredient in said inventory,
    first weight measuring means for measuring the weight of said one or more packages of said preassigned type of microingredient supported by said storage surface, and producing a first weight information for recording in said inventory record file, said first weight information being representative of the measured weight of said one or more packages of said preassigned type of microingredient,
  (3) a plurality of dispensing means, each said dispensing means including
  means for storing a supply of a preassigned type of microingredient, and
    means for dispensing a specified amount of said preassigned type of microingredient from said dispensing means under the control of said programmed control means,
  (4) second weight measuring means for independently measuring the weight of microingredient stored in each one of said dispensing means under the control of said programmed control means, and producing second weight information for recording in said inventory record file, said second weight information being representative of the measured weight of the microingredients stored in each one of said dispensing means,
  (5) a weigh hopper, disposed within said machine, and for temporarily storing an amount of microingredient discharged into said weigh hopper, said weigh hopper including means for discharging said measured amount of microingredient under the control of said programmed control means,
  (6) third weight measuring means, disposed in said housing, for measuring said amount of microingredient stored in said weigh hopper and producing a third weight information for recording in said inventory record file, said third weight information being representative of the weight of said measured amount of microingredient stored in said weigh hopper, and
  (7) a mixing tank for containing one or more types of microingredient discharged from said weigh hopper under the control of said programmed control means, said mixing tank including
    means for mixing said discharged microingredients with a specified amount of consumptive fluid carrier, such as water, to form a slurry mixture, and
    means for transporting said slurry mixture to a storage tank for subsequent usage under the control of said programmed control means;

(c) using said information storage and processing system to create a inventory record file for recording information regarding the particular type of microingredient preassigned for storage upon each one of said storage scales, the weight of the amount of microingredient stored upon each said storage scale, and the amount of the theoretical usage of each said type of microingredients;

(d) delivering to said animal feedlot, a shipment of microingredient packages, each said microingredient package containing a particular type and quantity of microingredient;

(e) physically storing each delivered microingredient package upon the storage scale preassigned to the type of microingredient contained in said delivered microingredient package;

(f) after completing step (e), measuring the weight of microingredient upon each said storage scale, producing first weight measurement information representative of the weight of the microingredient upon each said storage scale, and recording the produced first weight measurement information in said inventory record file;

(g) dispensing a prespecified type and amount of microingredient from one or more of said dispensing means into said mixing tank, producing second weight measurement information representative of the weight of the microingredient dispensing from said preassigned dispensing means, and recording the produced second weight measurement information in said inventory record file;

(h) after completing step (g), measuring the weight of microingredient upon each said storage scale, producing third weight measurement information representative of the weight of the microingredient upon each said storage scale, and recording the produced third weight measurement information in said inventory record file; and (i) analyzing the first, second and third weight measurement information recorded in said inventory record file in order to detect any discrepancies between the amount of microingredient dispensed from said dispensing means and the theoretical usage amount, and producing information indicative of any such discrepancies for recordation in said inventory record file.

36. Method of managing an inventory of microingredient packages stored in an animal feedlot, said method comprising the steps of:

(a) installing a microingredient dispensing and mixing system in said animal feedlot, said microingredient dispensing and mixing system including a plurality of storage scales, a plurality of dispensing means, each dispensing means including means for storing a supply of a preassigned type of microingredient, and means for dispensing a specified amount of said preassigned type of microingredient into a weigh hopper, a mixing tank for containing one or more types of microingredients discharged from said weigh hopper, and an information storage and processing system operably connected to each said storage scale, and each said storage scale having a storage surface for supporting one or more packages of microingredient, and producing weight measurement information for recording in said information storage and processing system;

(b) using said information storage and processing system to create an inventory record file for recording information regarding the particular type of microingredient preassigned for storage upon each one of said storage scales, the weight of the amount of microingredient stored upon each said storage scale, and the amount of the theoretical usage of each said type of microingredients;

(c) delivering to said animal feedlot, a shipment of microingredient packages, each said microingredient package containing a particular type and quantity of microingredient;

(d) physically storing each delivered microingredient package upon the storage scale preassigned to the type of microingredient contained in said delivered microingredient package;

(e) after completing step (d), measuring the weight of microingredient upon each said storage scale, producing first weight measurement information representative of the weight of the microingredient upon each said storage scale, and recording the produced first weight measurement information in said inventory record file;

(f) dispensing a prespecified type and amount of microingredient from one or more of said dispensing means into said mixing tank, producing second weight measurement information representative of the weight of the microingredient dispensing from said dispensing means, and recording the produced second weight measurement information in said inventory record file;

(g) after completing step (f), measuring the weight of microingredient upon each said storage scale, producing first weight measurement information representative of the weight of the microingredient upon each said storage scale after completion of step (f), and recording the produced first weight measurement information in said inventory record file; and (h) analyzing the weight measurement information recorded in said inventory record file in order to detect any discrepancies between the amount of microingredient dispensed from said dispensing means and the theoretical usage amount, and producing information indicative of any such discrepancies for recordation in said inventory record file.

\* \* \* \* \*